US010036941B2

(12) United States Patent
Takahashi et al.

(10) Patent No.: US 10,036,941 B2
(45) Date of Patent: Jul. 31, 2018

(54) BEZEL BODY INCLUDING A LIGHT GUIDE MEMBER AND VEHICULAR DISPLAY DEVICE INCLUDING THE BEZEL BODY

(71) Applicant: YAZAKI CORPORATION, Tokyo (JP)

(72) Inventors: Nobuyuki Takahashi, Shizuoka (JP); Go Nakamura, Shizuoka (JP)

(73) Assignee: YAZAKI CORPORATION, Tokyo (JP)

(*) Notice: Subject to any disclaimer, the term of this patent is extended or adjusted under 35 U.S.C. 154(b) by 0 days.

(21) Appl. No.: 15/346,319

(22) Filed: Nov. 8, 2016

(65) Prior Publication Data

US 2017/0052368 A1 Feb. 23, 2017

Related U.S. Application Data

(63) Continuation of application No. PCT/JP2015/064300, filed on May 19, 2015.

(30) Foreign Application Priority Data

Jun. 12, 2014 (JP) .................................. 2014-121230
Jun. 12, 2014 (JP) .................................. 2014-121231
(Continued)

(51) Int. Cl.
G03B 21/14 (2006.01)
B60K 35/00 (2006.01)
(Continued)

(52) U.S. Cl.
CPC ............ *G03B 21/145* (2013.01); *B60K 35/00* (2013.01); *G02B 6/10* (2013.01); *G02B 27/0018* (2013.01);
(Continued)

(58) Field of Classification Search
CPC ............ B60K 35/00; B60K 2350/2052; B60K 2350/2078; B60K 2350/2082;
(Continued)

(56) References Cited

U.S. PATENT DOCUMENTS 6,100,943 A * 8/2000 Koide .................... B60K 37/02
345/7
7,952,808 B2 * 5/2011 Hotta ..................... G02B 27/01
340/425.5
(Continued)

FOREIGN PATENT DOCUMENTS

JP 61-176028 U 11/1986
JP 62-283388 A 12/1987
(Continued)

OTHER PUBLICATIONS

International Search Report and Written Opinion of the International Search Report for PCT/JP2015/064300 dated Jul. 28, 2015.
Japanese Office Action for the related Japanese Patent Application No. 2014-149632 dated Apr. 24, 2018.
(Continued)

Primary Examiner — Sultan Chowdhury
Assistant Examiner — Magda Cruz
(74) Attorney, Agent, or Firm — Kenealy Vaidya LLP

(57) ABSTRACT

Provided are a bezel body and a vehicular display device that effectively reduces a sense of discomfort provided to a passenger by making reflection on a windshield less visible. Since a reflection portion is formed in a predetermined area on a lower surface of a light guide member at the rear side, the guided external light is easy to reflect upward, whereby light can efficiently be emitted from the light guide member toward a descending wall. Therefore, this configuration can prevent the descending wall from being darkly reflected on a windshield, thereby making the reflection less visible and effectively reducing a sense of discomfort provided to the passenger.

18 Claims, 36 Drawing Sheets

(30) Foreign Application Priority Data

| Jun. 12, 2014 | (JP) | 2014-121232 |
|---|---|---|
| Jun. 12, 2014 | (JP) | 2014-121235 |
| Jun. 12, 2014 | (JP) | 2014-121236 |
| Jul. 23, 2014 | (JP) | 2014-149632 |
| Jul. 23, 2014 | (JP) | 2014-149633 |

(51) Int. Cl.
*G02B 27/01* (2006.01)
*G02B 6/10* (2006.01)
*G02B 27/00* (2006.01)
*G03B 21/28* (2006.01)

(52) U.S. Cl.
CPC ............ *G02B 27/01* (2013.01); *G03B 21/28* (2013.01); *B60K 2350/2052* (2013.01); *B60K 2350/2078* (2013.01); *B60K 2350/2082* (2013.01); *G02B 2027/012* (2013.01); *G02B 2027/0118* (2013.01)

(58) Field of Classification Search
CPC ...... G02B 27/0018; G02B 27/01; G02B 6/10; G02B 2027/0118; G02B 2027/012; G03B 21/145; G03B 21/28
See application file for complete search history.

(56) References Cited

U.S. PATENT DOCUMENTS

| 8,950,868 B2 | 2/2015 | Aoki et al. | |
| 2010/0067118 A1* | 3/2010 | Takahashi | G02B 27/01 |
| | | | 359/633 |
| 2013/0176335 A1 | 7/2013 | Sugiyama et al. | |
| 2014/0253821 A1* | 9/2014 | Takatoh | B60K 35/00 |
| | | | 349/11 |

FOREIGN PATENT DOCUMENTS

| JP | H11-081813 A | 3/1999 |
| JP | H11-350844 A | 12/1999 |
| JP | 2000-142176 A | 5/2000 |
| JP | 2006-076633 A | 3/2006 |
| JP | 2006-171168 A | 6/2006 |
| JP | 2007-148092 A | 6/2007 |
| JP | 2008-76633 A | 4/2008 |
| JP | 2008-149957 A | 7/2008 |
| JP | 2012-56335 A | 3/2012 |
| WO | 2011/074679 A1 | 6/2011 |

OTHER PUBLICATIONS

Japanese Office Action for the related Japanese Patent Application No. 2014-149633 dated Apr. 24, 2018.

* cited by examiner

BEZEL BODY INCLUDING A LIGHT GUIDE MEMBER AND VEHICULAR DISPLAY DEVICE INCLUDING THE BEZEL BODY

TECHNICAL FIELD

The present invention relates to a bezel body provided on an instrument panel of a vehicle, and a vehicular display device provided with the same.

BACKGROUND ART

First Invention

The first invention will be described below. Conventionally, a vehicular display device serving as a head-up display device for projecting an image onto a windshield of a vehicle has been mounted in an instrument panel (see Patent Literature 1, for example). As illustrated in FIGS. 4 and 13, a vehicular display device 700 described in Patent Literature 1 is mounted in an instrument panel I which has an opening H formed on an opposed wall A facing a windshield F so as to project an image onto the windshield F through the opening H. The vehicular display device 700 described above may have a transparent cover C that closes the opening H in order to prevent intrusion of dust or water into the opening H. However, external light such as the sunlight is reflected on the cover C to be directed to an eyepoint EP of a passenger, which may provide a sense of discomfort.

In view of this, a vehicular display device 800 illustrated in FIGS. 5 and 14 is considered as the configuration for preventing external light from being directed to the eyepoint EP of the passenger. The vehicular display device 800 is mounted in an instrument panel I. The instrument panel I has an opening H formed on an opposed wall A facing a windshield F, and a forward bezel portion W formed at the front of the opening H is provided with a translucent descending wall Wa that gradually descends from the front side to the rear side of the vehicle (from left to right in FIGS. 5 and 14). A cover C that gradually ascends from the front side to the rear side of the vehicle is provided on the opening H, and the vehicular display device 800 projects an image on the windshield F through the opening H. The configuration in which the descending wall W is provided and the portion of the cover C at the front side of the vehicle is lower than the portion thereof at the rear side makes it difficult to allow external light to reach the cover C, and prevents external light reflected on the cover C from being directed to the eyepoint EP of the passenger.

CITATION LIST

Patent Literature

Patent Literature 1: JP 2007-148092 A

SUMMARY OF INVENTION

Technical Problem

In the above configuration, external light is not impinged on the vicinity of the descending wall Wa of the forward bezel portion W, so that the contrast is increased between the descending wall Wa and its peripheral portion. Thus, the problem in which reflection on the windshield F becomes visible may arise. In view of this, it is considered that the descending wall Wa is formed from a translucent material, and a light guide member 802 is disposed below the descending wall Wa to illuminate the descending wall Wa from the inner surface. This configuration makes the reflection less visible because light passing through the descending wall Wa is directed to the windshield, thereby being capable of reducing a sense of discomfort provided to the passenger.

However, in the vehicular display device 800, it is likely that light cannot sufficiently be guided to the vicinity of the descending wall Wa by the light guide member 802, or when the guided light is emitted from the light guide member 802, the guided light cannot efficiently be directed to the descending wall Wa. Therefore, the descending wall Wa is likely to be reflected more darkly than the peripheral portion.

The first object of the present invention is to provide a bezel body and a vehicular display device that effectively reduce a sense of discomfort provided to a passenger by making reflection on a windshield less visible.

In another aspect, in the vehicular display device 800, an end face (light incidence surface 802a) of the light guide member 802 at the front side of the vehicle is exposed from the instrument panel I in order to allow external light to be incident on the light guide member 802 as illustrated in FIG. 15, and thus, it is feared that dust enters from a gap between the light guide member 802 and the descending wall W. Therefore, the light guide function is deteriorated due to the deposition of dust on the light guide member 802, resulting in that the amount of light guided to the descending wall W by the light guide member 802 might be reduced. In addition, since external light such as the sunlight enters the light incidence surface 802a of the light guide member 802 from above, an incidence angle i of light which enters the light incidence surface 802a and reaches a lower surface 802b of the light guide member 802 becomes small, and the light is not totally reflected on the lower surface 802b but a part of the light might be emitted to the outside of the light guide member 802. With this, the amount of light guided to the descending wall W by the light guide member 802 might be reduced. If the amount of light guided to the descending wall W is reduced, it is impossible to make the descending wall W bright to reduce the contrast, and thus, the reflection on the windshield F may not be sufficiently made less visible.

The second object of the present invention is to provide a bezel body that effectively makes reflection on a windshield less visible, and a vehicular display device provided with the bezel body.

Solution to Problem

In order to solve the foregoing problems and achieve the objects, the invention described in a first aspect is a bezel body including a bezel member that is fitted to an opposed wall, which faces a windshield, of an instrument panel of a vehicle to constitute a part of or all of the perimeter of an opening through which an image is projected onto the windshield by an image projector provided in the instrument panel, the bezel body comprising: a plate-like light guide member, wherein the bezel member has a forward bezel portion disposed at the front side of the vehicle with respect to the opening, the forward bezel portion is disposed such that an end at the front side of the vehicle is lifted from the opposed wall to form a gap with the opposed wall, the forward bezel portion including a translucent descending wall that gradually descends from the front side to the rear side of the vehicle to reach the opening, and the light guide member is disposed below the forward bezel portion, guides light entering an end face at the front side of the vehicle toward the descending wall, and is provided with a reflection portion on a predetermined area on a lower surface at the rear side of the vehicle, the reflection portion reflecting light by changing an advancing direction to a thickness direction.

The invention described in a second aspect is characterized in that, in the bezel body described in the first aspect, a diffusion portion that diffuses light emitted upward is provided on the top surface of the light guide member.

The invention described in a third aspect is characterized in that the bezel body described in the first and second aspects further comprises a support member that supports the light guide member from below and reflects light from above.

The invention described in a fourth aspect is a vehicular display device comprising: an image projector that is disposed in an instrument panel of a vehicle; and a bezel body including a bezel member that is fitted to an opposed wall, which faces a windshield, of the instrument panel to constitute a part of or all of the perimeter of an opening through which an image is projected onto the windshield by the image projector, wherein the bezel body is composed of the bezel body according to any one of the first to third aspects.

The invention described in a fifth aspect is a bezel body including a bezel member that is fitted to an opposed wall, which faces a windshield, of an instrument panel of a vehicle to constitute a part of or all of the perimeter of an opening through which an image is projected onto the windshield by an image projector provided in the instrument panel, wherein the bezel member has a forward bezel portion disposed at the front side of the vehicle with respect to the opening, and the forward bezel portion is disposed such that an end at the front side of the vehicle is lifted from the opposed wall to form a gap with the opposed wall, the forward bezel portion including a translucent descending wall that gradually descends from the front side to the rear side of the vehicle to reach the opening, the bezel body comprising: a light guide member that is formed into a plate-like shape, disposed to be overlapped with an inner surface of the forward bezel portion, and guides light entering an end face at the front side of the vehicle toward the descending wall; a case member that is disposed with a space from the inner surface of the forward bezel portion so as to form a storage space for the light guide member between the forward bezel portion and the case member, the storage space being open at the gap; and a lighting window member that is provided between the forward bezel portion and the case member so as to close the opening of the storage space and to introduce light from the gap into the storage space, the light guide member being stored in the storage space with the end face at the front side of the vehicle facing the lighting window member, the lighting window member having an optical deflection portion that deflects light introduced from the gap to be directed to the end face of the light guide member at the front side of the vehicle.

The invention described in a sixth aspect is characterized in that, in the bezel body described in the fifth aspect, the lighting window member has a plate-like window body, and the optical deflection section has multiple projections or recesses which are formed on either one of an inner surface and an outer surface of the window body to extend in the widthwise direction of the vehicle and have a wedge-shaped cross-section.

The invention described in a seventh aspect is a vehicular display device comprising: an image projector that is disposed in an instrument panel of a vehicle; and a bezel body including a bezel member that is fitted to an opposed wall, which faces a windshield, of the instrument panel to constitute a part of or all of the perimeter of an opening through which an image is projected onto the windshield by the image projector, wherein the bezel body is composed of the bezel body according to the fifth or sixth aspect.

Advantageous Effects of Invention

According to the invention described in the first aspect, the end of the forward bezel portion at the front side is disposed to be lifted to form a gap with the opposed wall, and the light guide member is disposed below the forward bezel portion, whereby external light emitted to the inside of the vehicle from the front side through the windshield is introduced from the end face of the light guide member at the front side, and this external light can be guided toward the descending wall by the light guide member. In addition, since the reflection portion is formed in the predetermined area on the lower surface of the light guide member at the rear side of the vehicle, the guided external light is easy to reflect upward with its advancing direction being changed to the thickness direction, whereby light can efficiently be emitted from the light guide member toward the descending wall. Therefore, this configuration makes the reflection of the descending wall onto the windshield less visible and effectively reduces a sense of discomfort provided to the passenger.

According to the invention described in the second aspect, since the diffusion portion for diffusing light is formed on the top surface of the light guide member, the concentration of light emitted from the top surface of the light guide member on a specific portion is prevented, and thus, the occurrence of unevenness in the reflection of the descending wall on the windshield can be prevented.

According to the invention described in the third aspect, the support member that supports the light guide member from below reflects light from above, whereby light which may be emitted downward from the light guide member can be reflected and again returned to the light guide member. Thus, light introduced into the light guide member can effectively be utilized. Accordingly, there is no need to vertically increase the size of the forward bezel portion or to provide another member in order to increase an amount of introduced light.

According to the invention described in the fourth aspect, the reflection portion formed on the light guide member makes the reflection of the descending wall on the windshield less visible and effectively reduces a sense of discomfort provided to a passenger.

According to the inventions described in the fifth and seventh aspects, the storage space that is open at the gap between the opposed wall of the instrument panel and the forward bezel portion of the bezel member for storing the light guide member is formed between the forward bezel portion and the case portion. The lighting window member is provided between the forward bezel portion and the case member to close the opening of the storage space and to introduce light from the gap into the storage space. The light guide member is stored in the storage space with the end face at the front side of the vehicle facing the lighting window member, and the lighting window member includes the optical deflection portion that deflects light introduced from the gap toward the end face of the light guide member at the front side of the vehicle. With this configuration, since the opening of the storage space for storing the light guide member is closed by the lighting window member, intrusion of dust into the storage space can be prevented. Further, since light introduced from the gap is deflected toward the end face of the light guide member at the front side of the vehicle by the optical deflection portion of the lighting window member, the light directed to the end face advances in the direction orthogonal to or nearly orthogonal to the end face to be incident on the end face, whereby the amount of light reaching the end of the light guide member at the rear side of the vehicle can be ensured. Accordingly, the reduction in the amount of light guided to the descending wall is suppressed, whereby the descending wall can be made bright to reduce the contrast, and thus, the reflection on the windshield can be effectively made less visible.

According to the invention described in the sixth aspect, the lighting window member has a plate-like window body, and the optical deflection portion has multiple projections or recesses which are formed on either one of an inner surface and an outer surface of the window body to extend in the widthwise direction of the vehicle and have a wedge-shaped cross-section. According to this configuration, the optical deflection portion can be formed with a simple shape, and the deflection direction of light can easily be adjusted by changing the cross-sectional shape of the projections or recesses. Accordingly, the reduction in the amount of light guided to the descending wall is suppressed, whereby the descending wall can be made bright to reduce the contrast, and thus, the reflection on the windshield can be effectively made less visible.

DESCRIPTION OF EMBODIMENTS

First Embodiment

Figure 1:
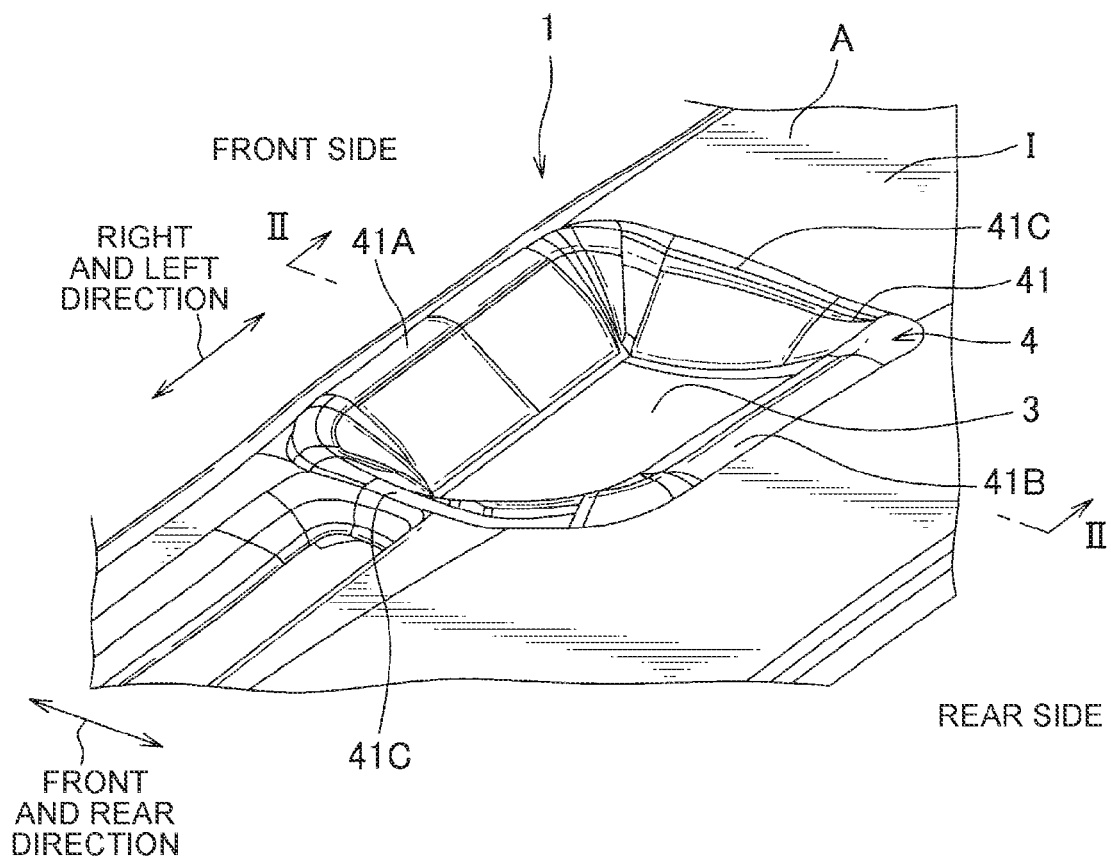
FIG. 1 is a perspective view illustrating a vehicular display device according to a first embodiment of the first invention.
Figure 2:
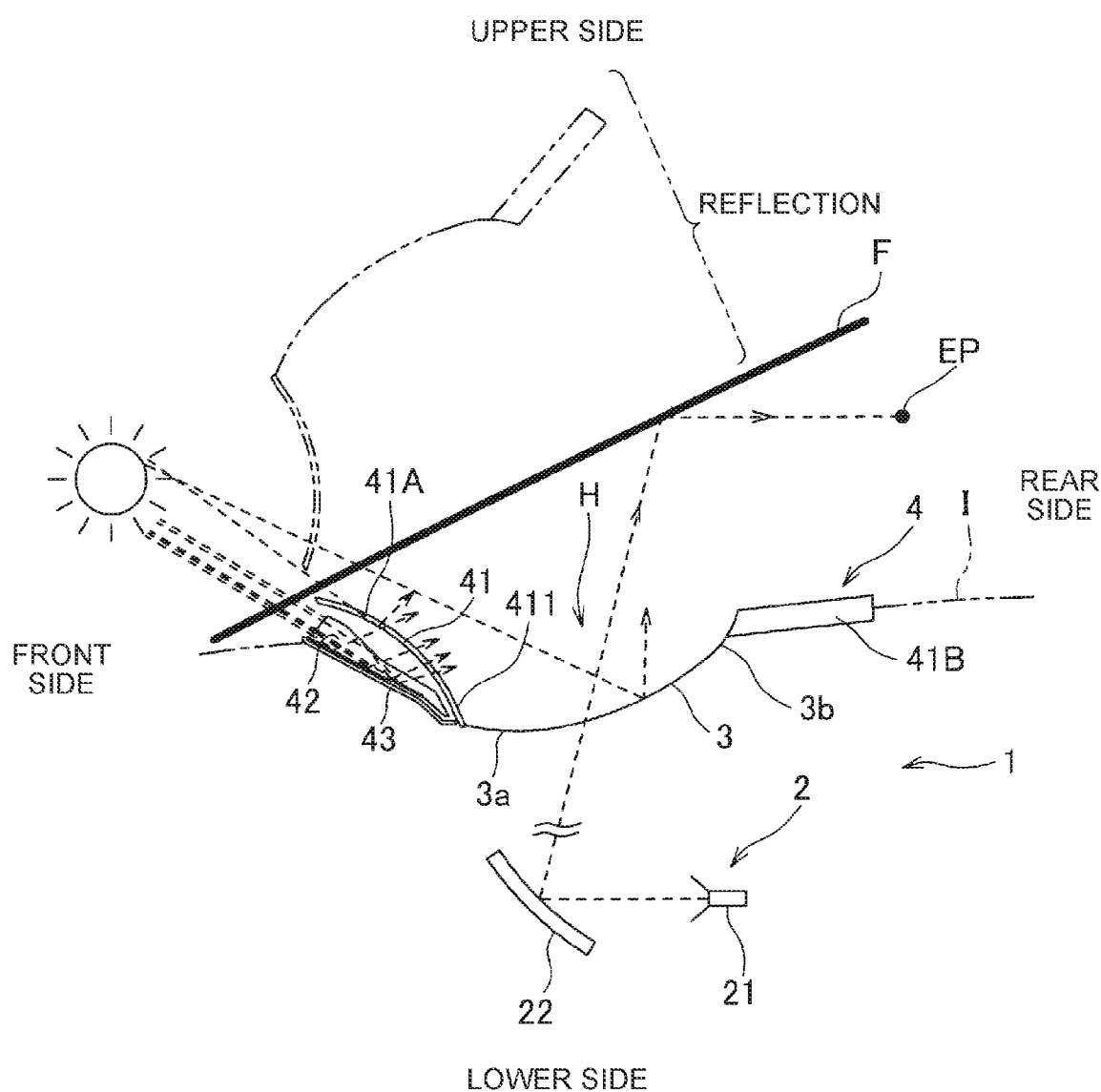
FIG. 2 is a sectional view along a line II-II of the vehicular display device.

The first embodiment of the present invention will be described below with reference to the drawings. As illustrated in FIGS. 1 and 2, a vehicular display device 1 according to the present embodiment includes an image projector 2 disposed in an instrument panel I of a vehicle, a cover 3 provided on an opening H formed on an opposed wall A, which faces a windshield F, of the instrument panel I, and a bezel body 4 provided around the cover 3, and the vehicular display device 1 is a device for projecting a vehicle running state such as a speed or a road condition on the windshield F as an image. Note that a front and rear direction, a right and left direction, a front side and a rear side in the front and rear direction, an upper side, and a lower side of the vehicle in the present embodiment are as illustrated in FIGS. 1 and 2.

The image projector 2 includes a projector body 21 and a mirror 22, and projects an image toward the windshield F through the opening H. In this case, the image projector 2 forms an image at a distant location from a passenger in order that the passenger can naturally recognize the image even if he/she focuses on a distant location.

The cover 3 is formed from a transparent resin or glass, for example. It transmits light radiated from the image projector 2, and protects the image projector 2 against dust or water. In addition, a forward end 3a of the cover 3 is located lower than a rearward end 3b (that is, the cover 3 is provided with its front part declining) to prevent external light from being reflected and reaching an eyepoint EP of the passenger.

The bezel body 4 includes a bezel member 41 constituting the perimeter of the opening H, a light guide member 42 provided below a forward bezel portion 41A described later, and a support member 43 that supports the light guide member 42 from below.

The bezel member 41 is formed from a resin with a color substantially same as the color of the opposed wall A, includes the forward bezel portion 41A at the front side, a rearward bezel portion 41B at the rear side, and left and right bezel portions 41C provided between the forward bezel portion 41A and the rearward bezel portion 41B at both ends in the right and left direction, is fitted to the opposed wall A, and supports the cover 3. Each of the bezel portions 41A, 41B, and 41C may be separately formed, or may be integrally formed.

The forward bezel portion 41A is disposed such that the end thereof at the front side is lifted from the opposed wall A to form a gap between the end at the front side and the opposed wall A, and has a descending wall 411 that gradually descends from the front side toward the rear side to reach the opening H. That is, the forward bezel portion 41A is configured to support the forward end 3a of the cover 3 at the lower end (rear end) of the descending wall 411.

The descending wall 411 has translucency, and its top surface has substantially the same color as the opposed wall A. The descending wall 411 is configured to transmit light from below upward and configured such that the transmitted light has substantially the same color as the reflection light on the top surfaces of the opposed wall A and the bezel member 41. Notably, the forward bezel portion 41A may be entirely formed as the descending wall 411. Alternatively, only a part of the forward bezel portion 41A on which external light is hardly impinged may be specified as the descending wall 411, and other part may be non-transparent.

Figure 3:
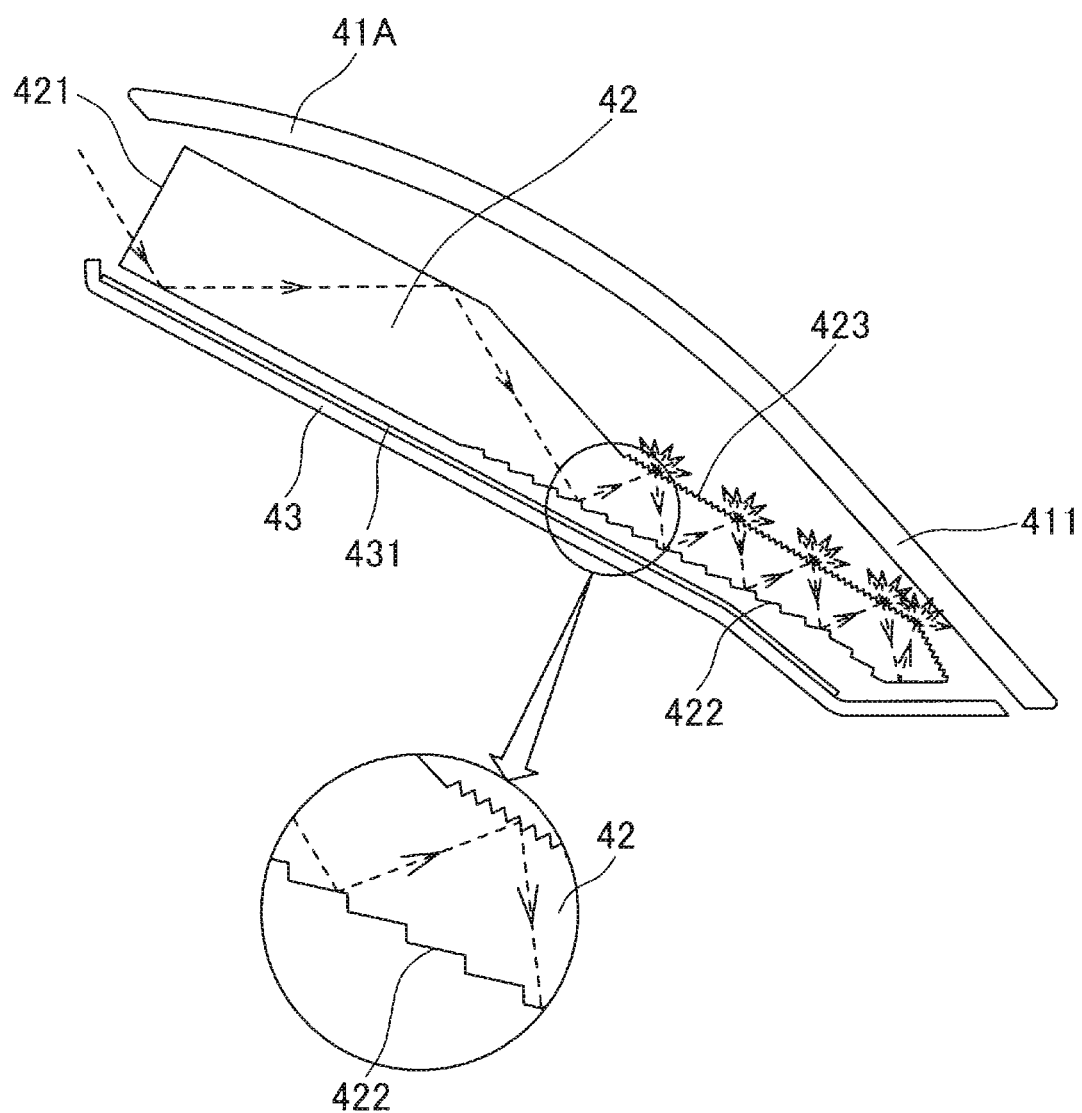
FIG. 3 is a sectional view illustrating a main part of the vehicular display device as enlarged.
Figure 4:
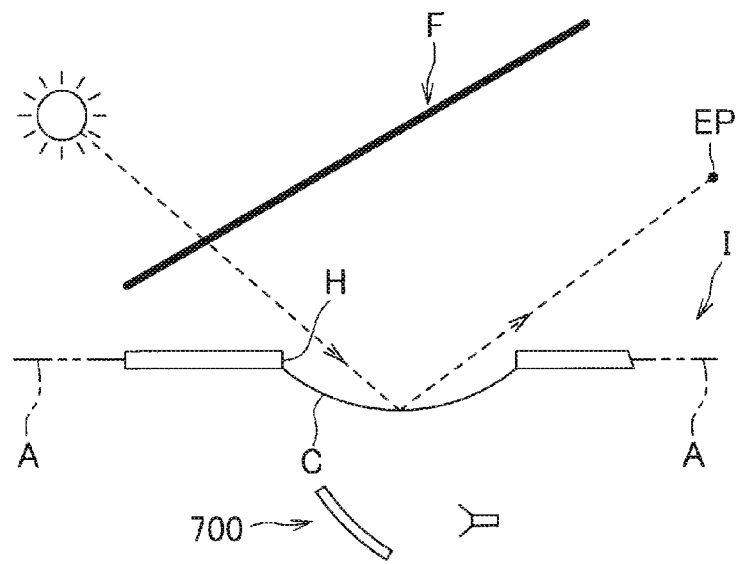
FIG. 4 is a sectional view illustrating a vehicular display device according to a conventional art.
Figure 5:
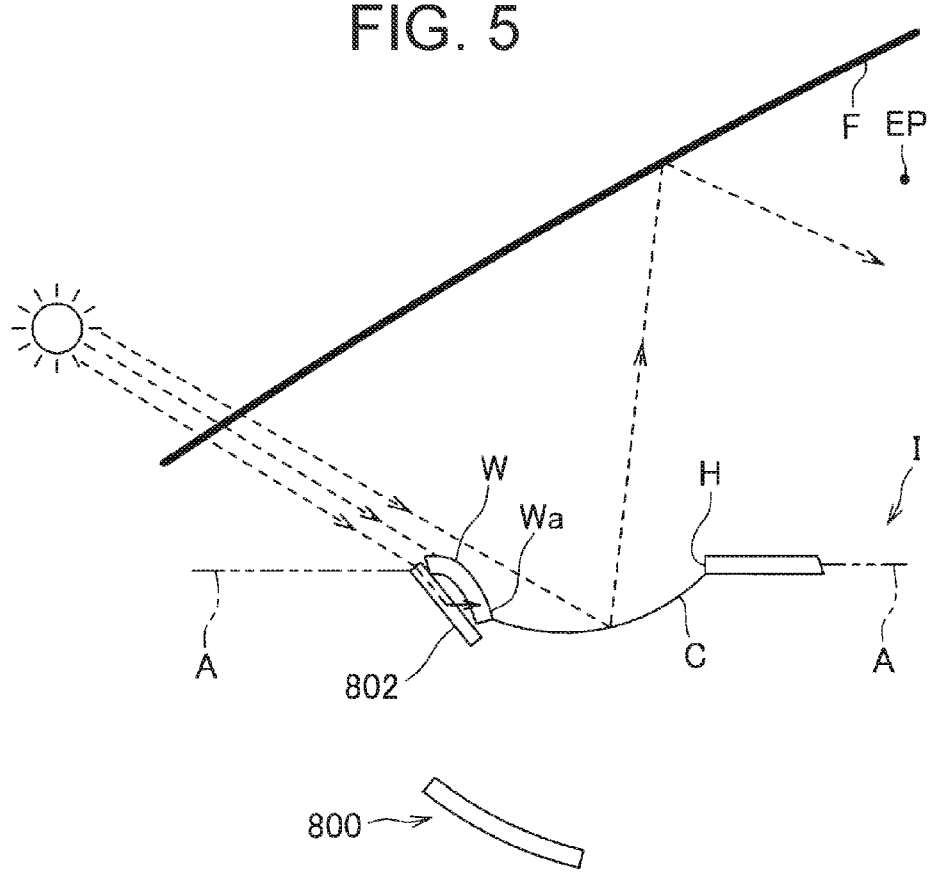
FIG. 5 is a sectional view illustrating a vehicular display device according to another conventional art.

The light guide member 42 is formed from a material that is transparent and has high refractive index, such as a glass or resin. As illustrated in FIG. 3 as enlarged, the light guide member 42 is formed into a plate-like shape extending in the front and rear direction between the forward bezel portion 41A and the support member 43, and is configured such that light entering from the end face 421 at the front side toward the rear is totally reflected on the inner side and is directed toward the rear side. In addition, the light guide member 42 is formed such that the thickness thereof is decreased toward the rear side from the front side.

A reflection portion 422 having a wedge-shaped cross-section and composed of projections extending in the right and left direction is formed in a predetermined area on the lower surface of the light guide member 42 at the rear side. The light guide member 42 reflects light reaching the reflection portion 422 by changing its advancing direction to the thickness direction (i.e., upward). It should be noted that the reflection portion 422 is only necessarily formed in at least an appropriate area at the rear side according to the refractive index or shape of the light guide member 42, and it may be formed on the entire lower surface. In addition, a diffusion portion 423 having a microscopic uneven shape is formed in an area, facing the reflection portion 422, on the top surface of the light guide member 42 for diffusing light emitted upward from the light guide member 42. Notably, the diffusion portion 423 may be formed entirely on the top surface of the light guide member 42.

The support member 43 is supported by the bezel member 41 while supporting the light guide member 42. The support member 43 is provided with a reflection member 431 on its top surface for reflecting light from above. In addition, the end of the support member 43 at the front side is on substantially the same level as the top surface of the opposed wall A, and constitutes a lighting portion 44 with the forward bezel portion 41A at the front side. With this configuration, external light emitted from the front side through the windshield F can be introduced into the end face 421 of the light guide member 42 at the front side through the lighting portion 44. Note that the lighting portion 44 may be provided with a window or the like that transmits light.

Next, the process in which external light introduced into the light guide member 42 is emitted upward will be described. Firstly, external light passing through the windshield F and directed to the lighting portion 44 is incident on the end face 421 of the light guide member 42 at the front side. After reaching the top surface or the lower surface, this light is emitted from the end face, if the incidence angle is smaller than a predetermined value. If the incidence angle is equal to or larger than the predetermined value, this light is totally reflected with a part thereof being emitted from the end face, and advances in the light guide member 42 toward the rear side. Light emitted from the top surface is diffused by the diffusion portion 423 to be directed to the upper forward bezel portion 41A, while light emitted from the lower surface is reflected upward by the reflection member 431 on the support member 43 to be again incident on the light guide member 42. When the light advancing in the light guide member 42 toward the rear side reaches the reflection portion 422 on the lower surface, this light is reflected in the thickness direction to reach the top surface, and then, emitted while diffused by the diffusion portion 423 or advances toward the rear side while being totally reflected.

As described above, external light is guided from the front side toward the rear side by the light guide member 42, and emitted toward the upper forward bezel portion 41A. Light reaching the descending wall 411 of the forward bezel portion 41A passes through the descending wall 411 to be directed to the windshield, and causes the reflection of the descending wall 411.

The present embodiment described above provides the following effects. Specifically, since the reflection portion 422 is formed in the predetermined area on the lower surface of the light guide member 42 at the rear side, the guided external light is easy to reflect upward, whereby light can efficiently be emitted from the light guide member 42 toward the descending wall 411. Therefore, this configuration can prevent the descending wall 411 from being darkly reflected on the windshield F, thereby making the reflection less visible and effectively reducing a sense of discomfort provided to the passenger.

Further, since the diffusion portion 423 is formed on the top surface of the light guide member 42, the concentration of light emitted from the top surface of the light guide member 42 on a specific portion is prevented, and thus, the occurrence of unevenness in the reflection of the descending wall 411 on the windshield F can be prevented.

In addition, since the support member 43 has the reflection member 431, light introduced into the light guide member 42 can be effectively used. Accordingly, it is unnecessary to vertically increase the lighting portion 44 or the end face 421 of the light guide member 42 at the front side in order to increase an amount of light to be introduced into the light guide member 42.

In addition, since the thickness of the light guide member 42 is decreased toward the rear side from the front side, light advancing in the light guide member 42 is collected in the thickness direction (that is, in the vertical direction), and thus is easy to guide toward the lower end of the descending wall 411. Accordingly, the reflection of the descending wall 411 on the windshield F can be made much less visible.

It is to be noted that the present invention is not limited to the above embodiment, and includes other configurations by which the object of the present invention is achieved, and the modifications described below are included in the present invention. For example, in the present embodiment, the diffusion portion 423 is formed in the area facing the reflection portion 422 on the top surface of the light guide member 42. However, the diffusion portion may be formed on the entire top surface of the light guide member. Alternatively, the diffusion portion may not be provided on the light guide member but may be provided on the lower surface of the descending wall, for example.

Further, in the embodiment described above, the bezel body 4 includes the support member 43, and the reflection member 431 is provided on the support member 43. However, the reflection member may be eliminated, and mirror finishing may be performed on the top surface of the support member to reflect light from above. Further, if the lower surface of the light guide member is configured to be capable of sufficiently reflecting light, the support member may be configured not to reflect light, and if the bezel member is configured to be capable of supporting the light guide member, the support member may be eliminated.

Further, in the embodiment described above, the thickness of the light guide member 42 is decreased toward the rear side from the front side. However, it is only necessary that the light guide member extends in the front and rear direction with an appropriate thickness and shape.

Second Embodiment

A bezel body and a vehicular display device according to the second embodiment of the present invention will be described with reference to FIGS. 6 to 12.

Figure 6:
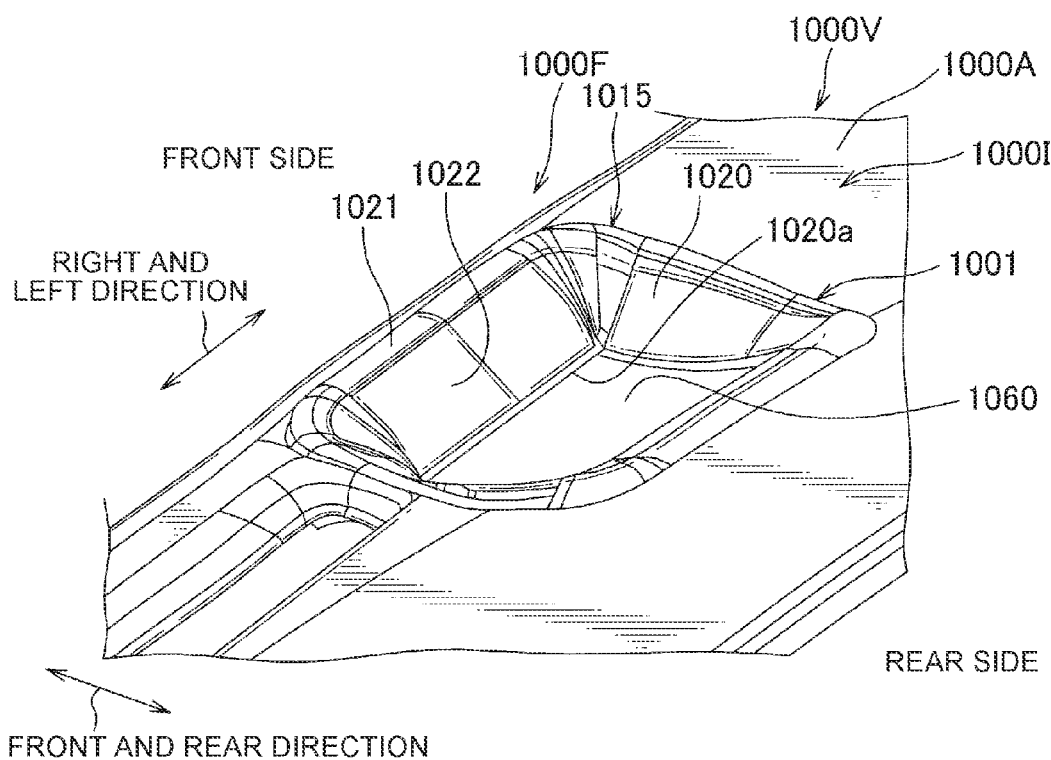
FIG. 6 is a perspective view illustrating that a vehicular display device according to a second embodiment of the first invention is assembled to an instrument panel.
Figure 7:
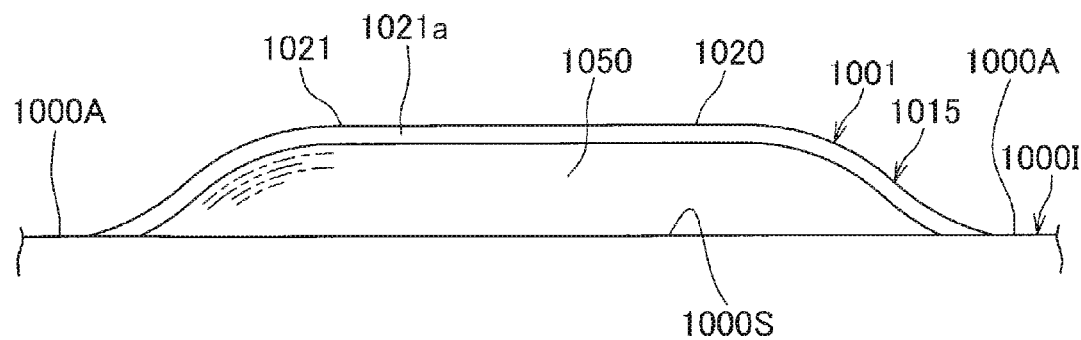
FIG. 7 is a view of the vehicular display device illustrated in FIG. 6 viewed from the front of the vehicle.
Figure 8:
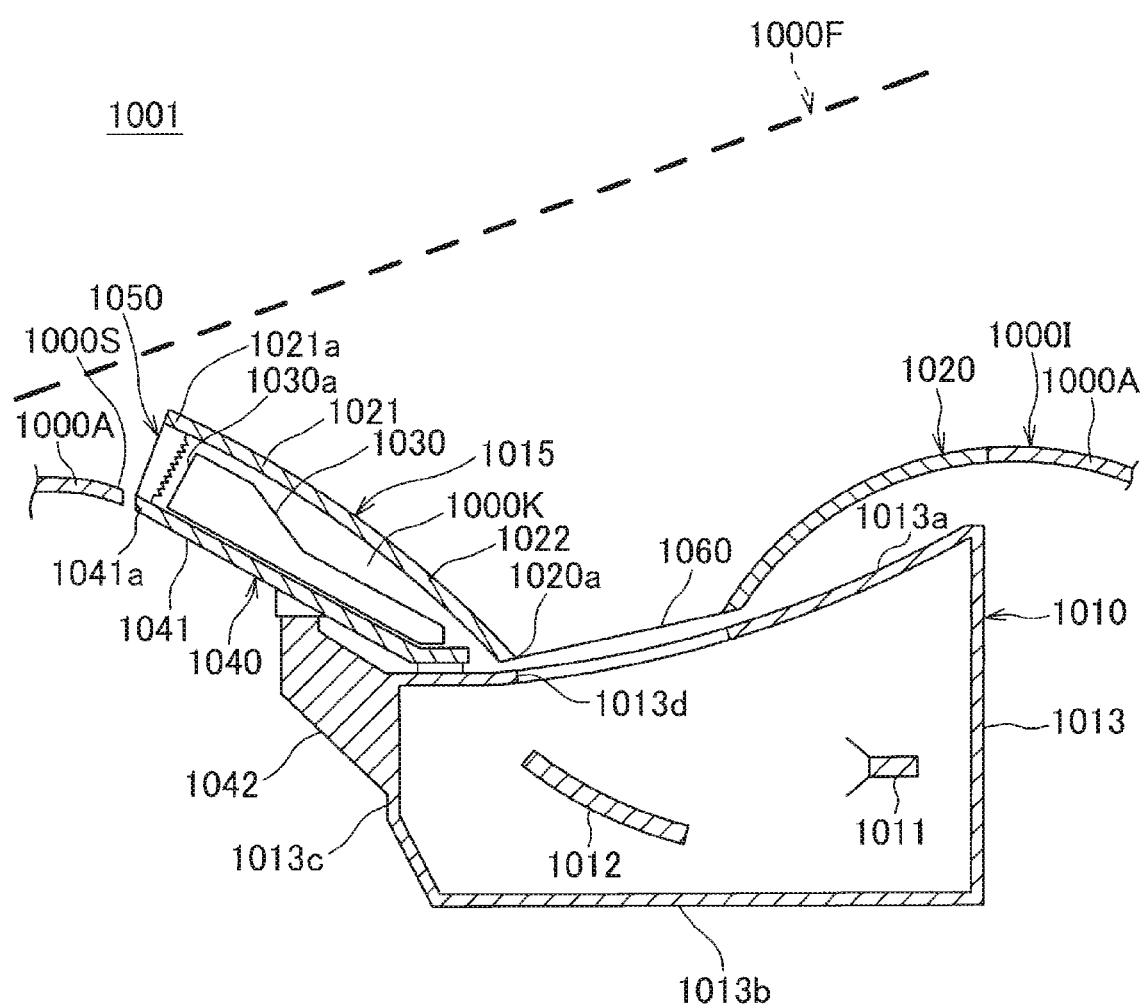
FIG. 8 is a sectional view of the vehicular display device illustrated in FIG. 6.
Figure 9:
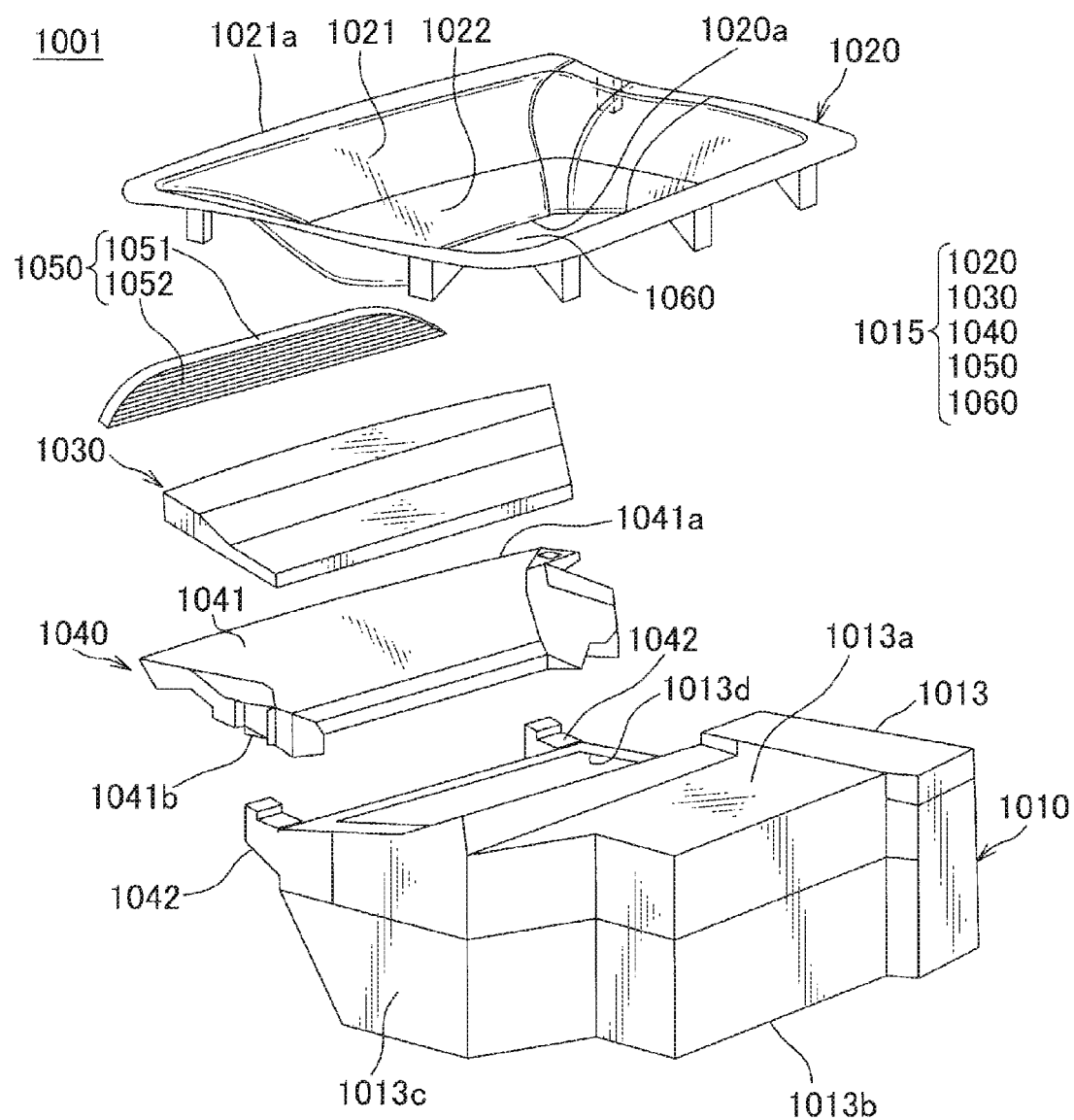
FIG. 9 is an exploded perspective view of the vehicular display device illustrated in FIG. 6.
Figure 10A:
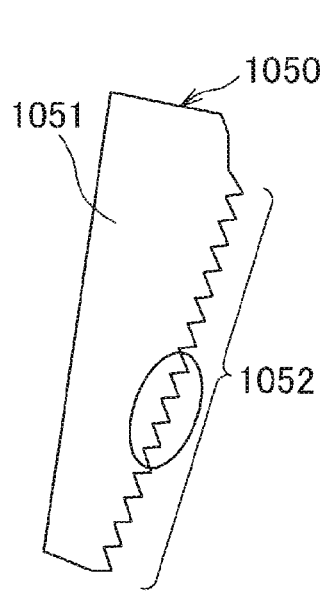
FIGS. 10A to 10C are diagrams for describing a lighting window member provided to the vehicular display device illustrated in FIG. 6.
Figure 10B:
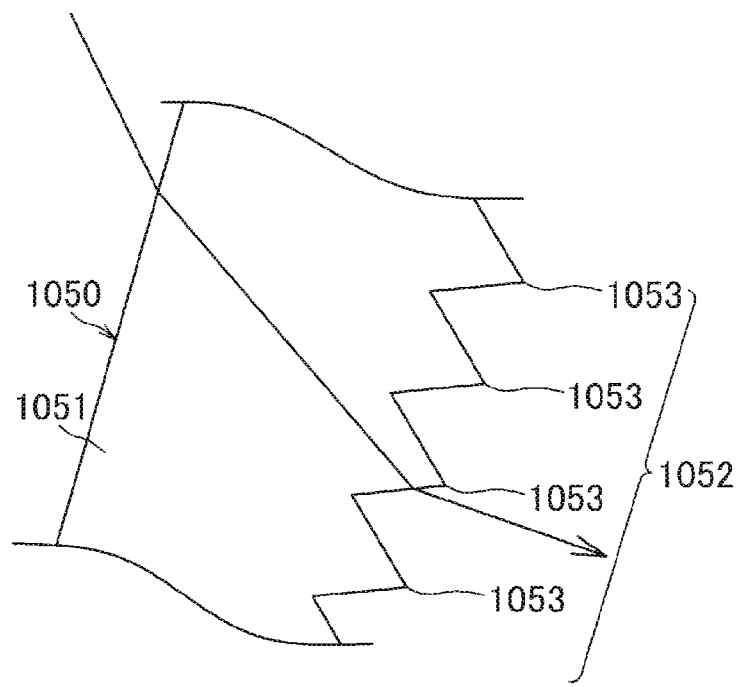
Figure 10C:
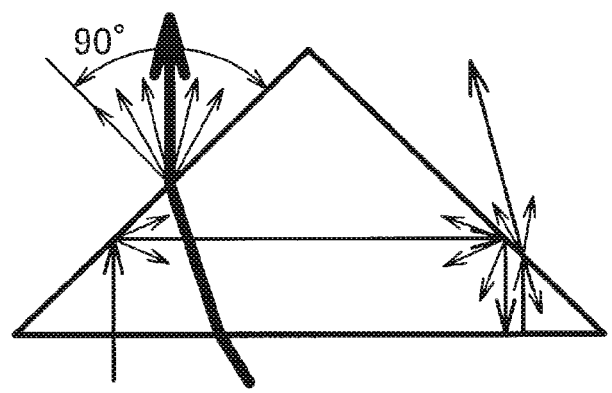
Figure 11:
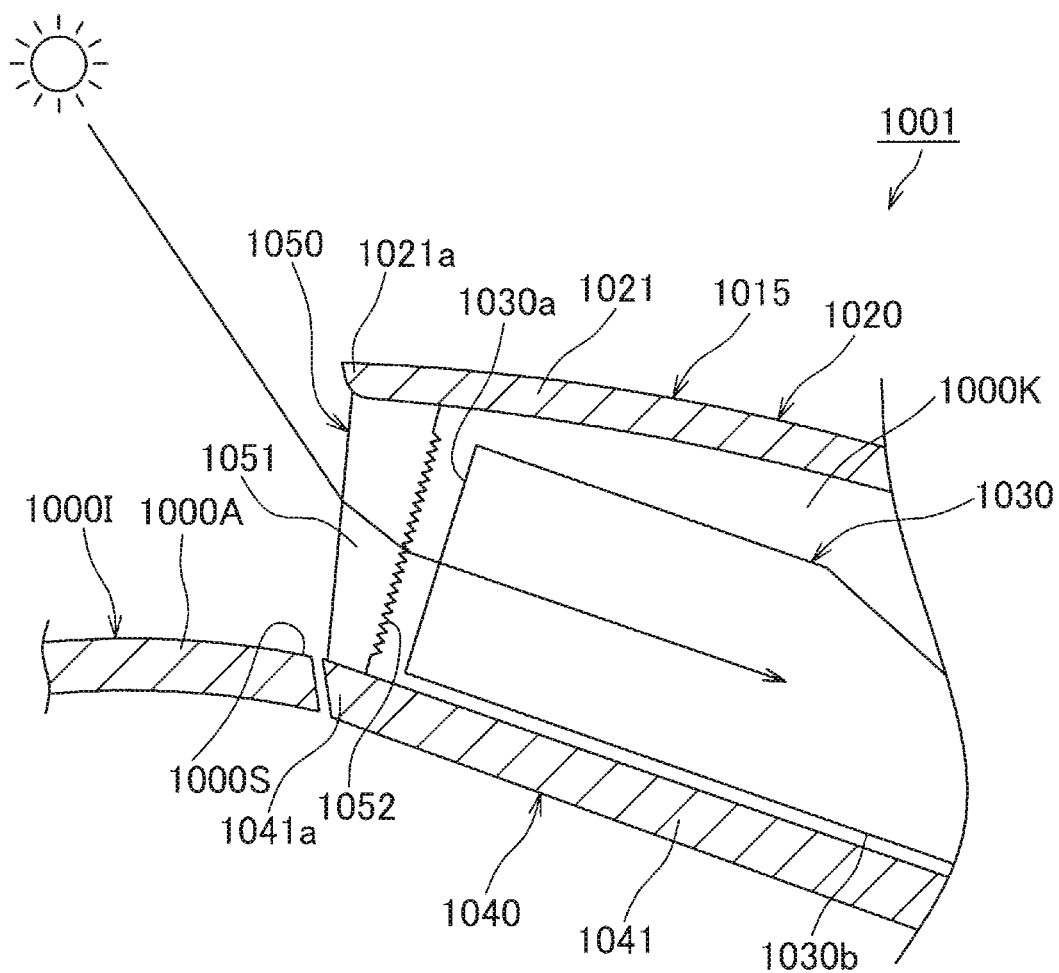
FIG. 11 is an enlarged sectional view for describing the progress of light in the light guide member of the vehicular display device illustrated in FIG. 6.
Figure 12:
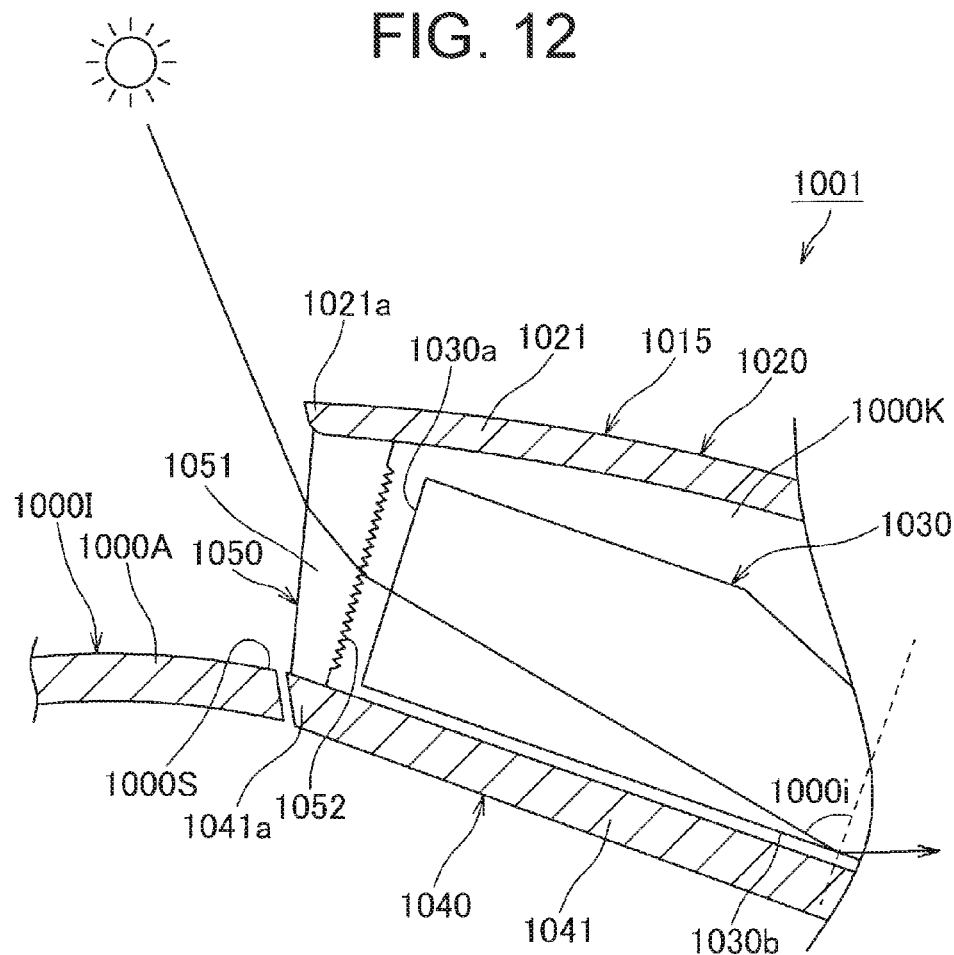
FIG. 12 is an enlarged sectional view for describing the progress of light in the light guide member of the vehicular display device illustrated in FIG. 6.
Figure 13:
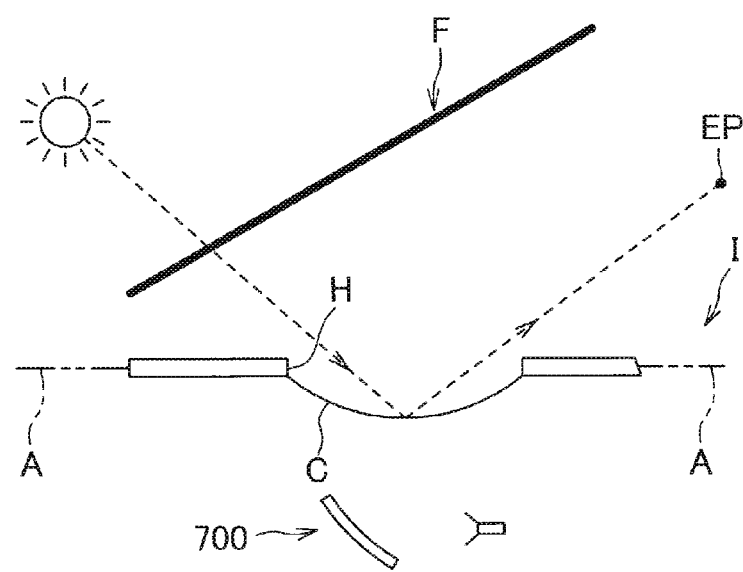
FIG. 13 is a sectional view schematically illustrating a conventional vehicular display device concerning the first invention.
Figure 14:
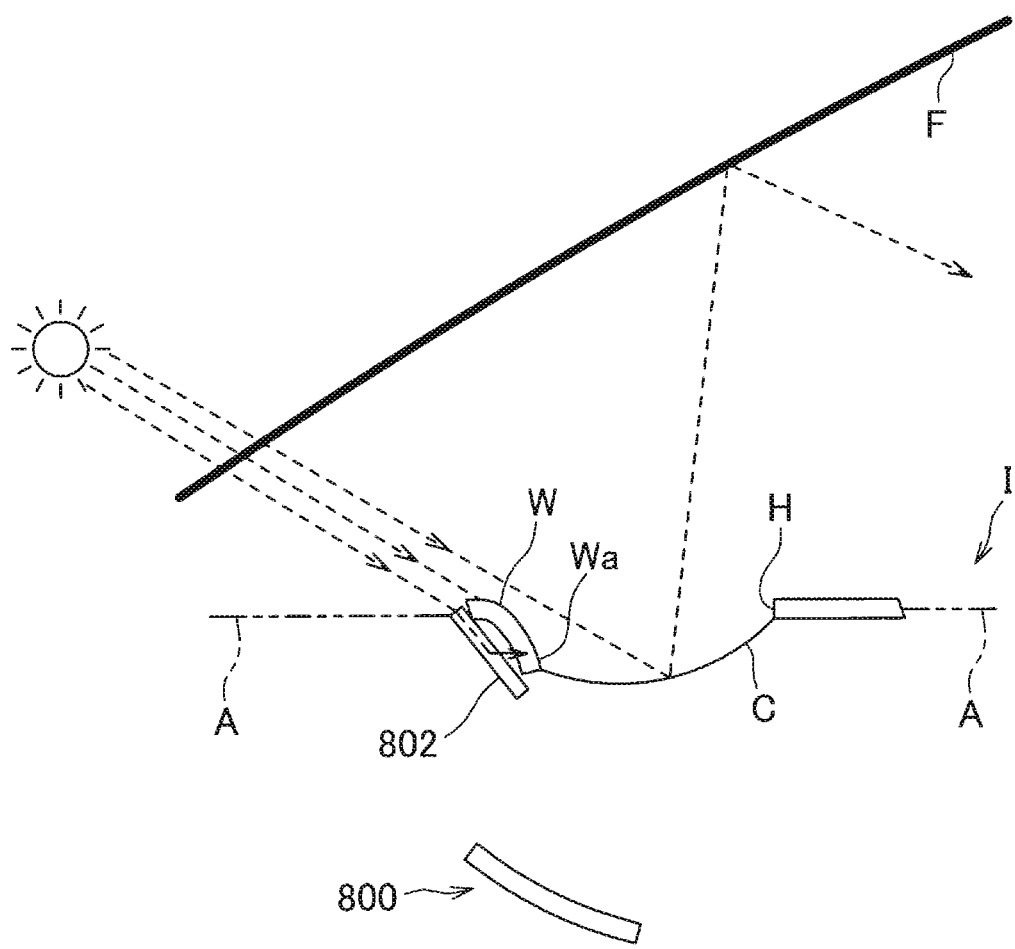
FIG. 14 is a sectional view schematically illustrating another conventional vehicular display device concerning the first invention.
Figure 15:
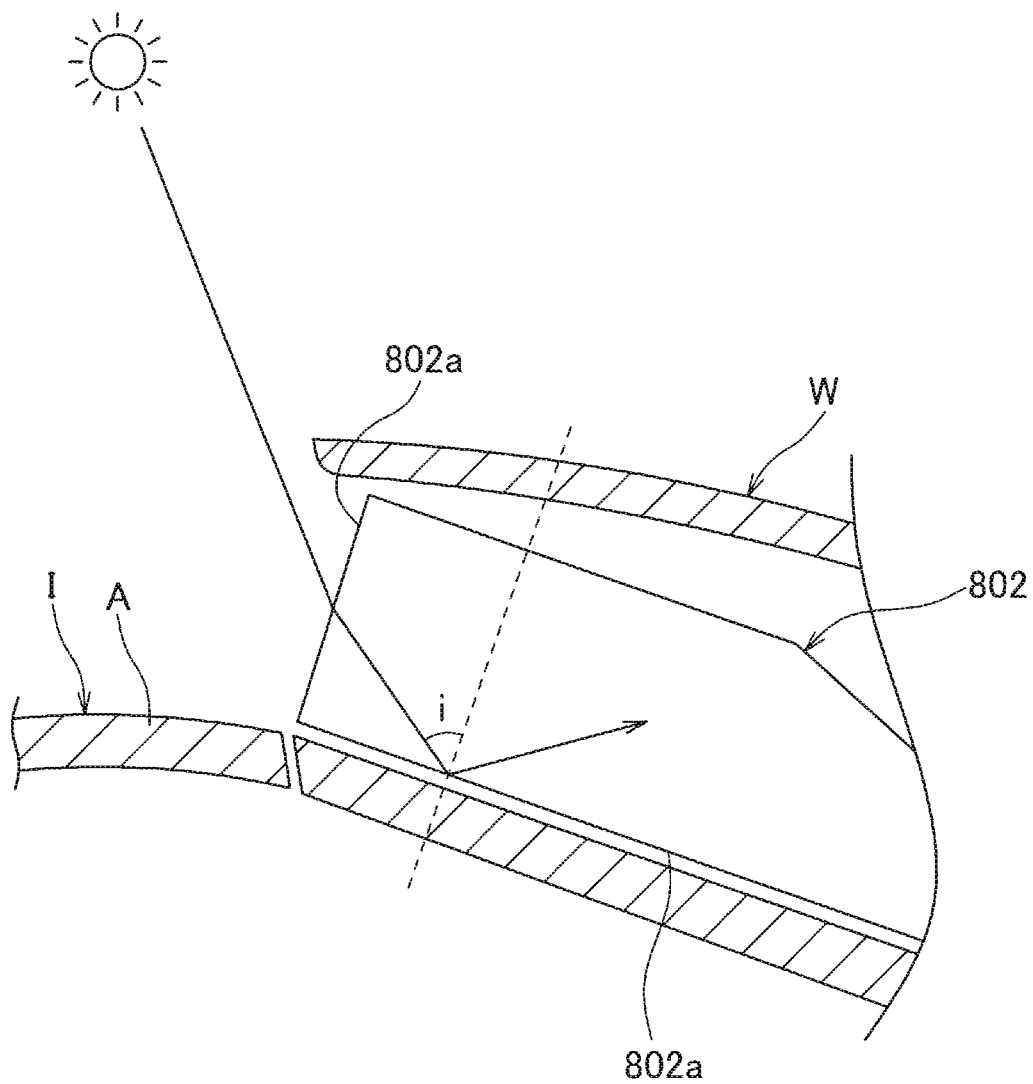
FIG. 15 is an enlarged sectional view for describing the progress of light in the light guide member of the vehicular display device illustrated in FIG. 14.

FIG. 6 is a perspective view illustrating that the vehicular display device according to the present embodiment is assembled to an instrument panel. FIG. 7 is a view of the vehicular display device illustrated in FIG. 6 viewed from the front of the vehicle. FIG. 8 is a sectional view of the vehicular display device illustrated in FIG. 6. FIG. 9 is an exploded perspective view of the vehicular display device illustrated in FIG. 6. FIGS. 10A to 10C are diagrams for describing a lighting window member provided to the vehicular display device illustrated in FIG. 6. FIG. 11 is an enlarged sectional view for describing the progress of light in a light guide member of the vehicular display device illustrated in FIG. 6, and illustrates the case where the sun is located at a relatively low position. FIG. 12 is an enlarged sectional view for describing the progress of light in a light guide member of the vehicular display device illustrated in FIG. 6, and illustrates the case where the sun is located at a relatively high position. In the description below, "front, rear, top, bottom, left, and right" correspond to the front, rear, top, bottom, left, and right of a vehicle V.

As illustrated in FIGS. 6 and 7, a vehicular display device 1 according to the present embodiment is used as a head-up display device that is mounted to an instrument panel 1000I of the vehicle 1000V for projecting an image onto a windshield 1000F.

As illustrated in FIGS. 8 and 9, the vehicular display device 1001 includes an image projector 1010 and a bezel body 1015.

The image projector 1010 includes a display source 1011 for projecting an image, a reflection portion 1012 for reflecting an image from the display source 1011, and a housing 1013 that is formed from a synthetic resin for storing the display source 1011 and the reflection portion 1012. The housing 1013 includes a top wall 1013a, a bottom wall 1013b facing the top wall 1013a, and a peripheral wall 1013c continuously formed on the perimeter of the top wall 1013a and the bottom wall 1013b. An opening 1013d that is disposed to be overlapped with an opening 1020a on a later-described bezel member 1020 is formed on the top wall 1013a. The image projector 1010 reflects an image projected by the display source 1011 on the reflection portion 1012, and projects the image onto the windshield 1000F through the opening 1013d. Thus, an occupant in the vehicle 1000V can visually recognize the image displayed on the windshield 1000F.

The bezel body 1015 includes a bezel member 1020, a light guide member 1030, a support member 1040 serving as a case member, a lighting window member 1050, and a cover 1060.

The bezel member 1020 is formed from semi-translucent (transparent) synthetic resin, has an annular shape with an opening 1020a formed at the center in a plan view, and gradually descends from an outer peripheral edge to an inner peripheral edge. In other words, the bezel member 1020 has a shape formed by turning upside down substantially a hollow frustum of square pyramid having an open upper end face and an open lower end face. The bezel member 1020 is fitted into a hole formed on an opposed wall 1000A of the instrument panel 1000I facing the windshield 1000F. Specifically, the bezel member 1020 is fitted to the opposed wall 1000A to constitute the entire perimeter of the opening 1020a from which an image is projected onto the windshield 1000F by the image projector 1010 disposed in the instrument panel 1000I.

The bezel member 1020 has a forward bezel portion 1021 that is disposed at the front side of the vehicle 1000V when being fitted to the opposed wall 1000A. The forward bezel portion 1021 is disposed such that an end 1021a at the front side of the vehicle 1000V is lifted upward from the opposed wall 1000A (that is, disposed above the opposed wall 1000A) to form a gap 1000S with the opposed wall 1000A. In addition, the forward bezel portion 1021 has a descending wall 1022 that gradually descends from the front side toward the rear side of the vehicle 1000V to reach the opening 1020a.

When being fitted to the opposed wall 1000A, the bezel member 1020 is disposed such that apart of the outer peripheral edge of the bezel member 1020 at the front side (i.e., the end 1021a of the forward bezel portion 1021 at the front side of the vehicle 1000V) is lifted upward from the opposed wall 1000A (FIG. 7), and the other part of the outer peripheral edge other than the part is disposed such that the outer surface (top surface) of the bezel member 1020 and the outer surface of the opposed wall A are smoothly contiguous (FIG. 6). Further, in this case, the opening 1020a of the bezel member 1020 and the opening 1013d of the image projector 1010 are disposed to be overlapped with each other in the vertical direction. In addition, a tint control or a surface treatment to make the bezel member 1020 look alike the opposed wall 1000A is performed to the bezel member 1020 in order to make the difference in reflection onto the windshield 1000F between the bezel member 1020 and the opposed wall 1000A of the instrument panel 1000I less visible.

For example, the light guide member 1030 is formed from a material having high transparency, such as a glass or a synthetic resin including acryl and polycarbonate, formed into a shape of a substantially rectangular plate in a plan view (FIG. 9), and disposed to be overlapped with the inner surface of the forward bezel portion 1021 with a little space therefrom (that is, disposed along the inner surface of the forward bezel portion 1021). The light guide member 1030 is formed such that the front portion is thick and the rear portion is thin, and the portion between the thick portion and the thin portion is formed to be gradually thinner from the front portion toward the rear portion as illustrated in the cross-sectional view (FIG. 8) in the front and rear direction. Specifically, the surface of the light guide member 1030 facing downward is flat, and the surface facing upward and facing the descending wall 1022 has a tilt surface that gradually descends from the front portion toward the rear portion at the middle in the front and rear direction.

The light guide member 1030 is formed to guide light entering a light incidence surface 1030a that is an end face at the front side of the vehicle 1000V to an end at the rear side, and emit this light from the surface facing the descending wall 1022. Specifically, the light guide member 1030 guides light in the light guiding direction from the end at the front side where the light incidence surface 1030a is present toward the opposite end at the rear side. Thus, light can be guided toward the translucent descending wall 1022, thereby being capable of illuminating the vicinity of the opening 1020a on the descending wall 1022.

The support member 1040 includes a placing portion 1041 and a pair of legs 1042, which are formed from a synthetic resin.

The placing portion 1041 is a portion on which the light guide member 1030 is placed, and has a planar shape formed into a substantially plate shape slightly larger than the planar shape of the light guide member 1030. The placing portion 1041 is disposed with a space from the inner surface of the forward bezel portion 1021, and disposed such that an end 1041a at the front side of the vehicle 1000V and the end 1021a of the forward bezel portion 1021 are arranged substantially in a vertical direction with a space therebetween, and both ends opposite to each other in the right and left direction are in contact with the inner surface of the bezel member 1020. With this, the placing portion 1041 forms a storage space 1000K for storing the light guide member 1030 with the forward bezel portion 1021. The storage space 1000K is open at the gap 1000S. The light guide member 1030 is stored in the storage space 1000K in such a manner that the light incidence surface 1030a faces the gap 1000S through the opening of the storage space 1000K.

A pair of legs 1042 connects the placing portion 1041 and the housing 1013 of the image projector 1010, and extends forward and upward from both ends of the front surface of the peripheral wall 1013c of the housing 1013 in the right and left direction (FIG. 9). The base end of each of the legs 1042 is integrally fixed to the housing 1013, and a fixing portion 1041b formed on the lower surface of the placing portion 1041 is fixed on the tip.

The lighting window member 1050 is formed from a material having high transparency, such as a glass or a synthetic resin including acryl and polycarbonate. The lighting window member 1050 is provided to close the opening of the storage space 1000K and to introduce light from the gap 1000S into the storage space 1000K. As illustrated in FIGS. 10A to 10C, the lighting window member 1050 includes a window body 1051 and an optical refraction portion 1052 serving as an optical deflection portion.

The window body 1051 is formed into a substantially trapezoidal plate-like shape identical to the opening of the storage space 1000K in a plan view (FIGS. 7 and 9). The window body 1051 is disposed between the end 1021a of the forward bezel portion 1021 at the front side and the end 1041a of the placing portion 1041 of the support member 1040 at the front side so as to close (seal) the opening of the storage space 1000K into which the light guide member 1030 is stored, and the end face of the window body 1051 is in close contact with the inner surface of the bezel member 1020 and the top surface of the placing portion 1041 throughout the entire circumference. An outer surface 1051a (a surface facing the front side of the vehicle) of the window body 1051 has a flat plate shape, and an optical refraction portion 1052 that deflects light with refraction is provided on an inner surface 1051b (a surface facing the rear side of the vehicle).

The optical refraction portion 1052 is formed on the inner surface 1051b of the window body 1051, and has multiple projections 1053 with a wedge-shaped (prism-shaped) cross-section extending entirely in the right and left direction on the inner surface 1051b of the window body 1051. The multiple projections 1053 are arranged vertically to form a prism pattern. The shape of the projections 1053 on the optical refraction portion 1052 is set to refract light incident on the outer surface 1051a of the window body 1051 toward the light incidence surface 1030a of the light guide member 1030, that is, to refract light in the direction orthogonal to or nearly orthogonal to the light incidence surface 1030a of the light guide member 1030. In the present embodiment, the optical refraction portion 1052 has multiple projections 1053 with a wedge-shaped cross-section provided on the inner surface of the window body 1051. However, it is not limited thereto. The optical refraction portion 1052 may be provided on the outer surface 1051a of the window body 1051. Alternatively, the optical refraction portion 1052 may have recesses with a wedge-shaped cross-section instead of a part of or all of the projections 1053. In addition, all of the multiple projections 1053 may have the same shape, or the multiple projections 1053 may include projections having different shapes (i.e., having different refraction directions of light). Further, the optical refraction portion 1052 deflects light with refraction. However, it is not limited thereto. An optical diffraction portion for deflecting light with deflection may be provided in place of the optical refraction portion 1052. FIG. 10C schematically illustrates an example of a path through which light incident on a prism-shaped translucent member advances. It is considered that light passes through the similar path in the projections 1053 on the lighting window member 1050.

The cover 1060 is formed on a thin plate using a material having high transparency, such as a glass or a synthetic resin including acryl and polycarbonate, and mounted to be fixed to the perimeter of the opening 1020a of the bezel member 1020 to close the opening 1020a. The cover 1060 is disposed to extend upward from the front side toward the rear side of the vehicle 1000V (FIG. 8). This prevents light impinged on the cover 1060 from directly advancing to the eyepoint of the passenger.

Next, one example of an operation of the vehicular display device 1001 described above will be described with reference to FIGS. 11 and 12.

As illustrated in FIG. 11, when external light is incident on the outer surface 1051a of the lighting window member 1050 of the vehicular display device 1001 from a light source such as the sun, the external light is refracted on the outer surface 1051a as indicated by an arrow in the figure, and further refracted by the optical refraction portion 1052 in the direction orthogonal to the light incidence surface 1030a of the light guide member 1030, thereby reaching the light incidence surface 1030a. Thus, the light incident on the light incidence surface 1030a passes through the light incidence surface 1030a and advances in the light guide member 1030 in parallel to the light guiding direction toward the end of the light guide member 1030 at the rear side. Accordingly, the amount of light emitted from the end of the light guide member 1030 at the rear side can be ensured.

Further, as illustrated in FIG. 12, when external light is incident on the outer surface 1051a of the lighting window member 1050 of the vehicular display device 1001 from a light source such as the sun which is higher than the case in FIG. 11, the external light is refracted on the outer surface 1051a as indicated by an arrow in the figure, and further refracted by the optical refraction portion 1052 in the direction nearly orthogonal to the light incidence surface 1030a of the light guide member 1030, thereby reaching the light incidence surface 1030a. Thus, the light incident on the light incidence surface 1030a passes through the light incidence surface 1030a and advances in the light guide member 1030 obliquely with respect to the light guiding direction to reach the lower surface 1030b of the light guide member 1030. In this case, the incidence angle of the light to the lower surface 1030b becomes relatively large, so that the light is totally reflected on the lower surface 1030b to be directed toward the end of the light guide member 1030 at the rear side. Accordingly, the amount of light emitted from the end of the light guide member 1030 at the rear side can be ensured.

As described above, according to the present embodiment, the storage space 1000K that is open at the gap 1000S between the opposed wall 1000A of the instrument panel 1000I and the forward bezel portion 1021 of the bezel member 1020 for storing the light guide member 1030 is formed between the forward bezel portion 1021 and the placing portion 1041 of the support member 1040. The lighting window member 1050 is provided between the forward bezel portion 1021 and the placing portion 1041 to close the opening of the storage space 1000K, and to introduce light from the gap 1000S into the storage space 1000K. The light guide member 1030 is stored in the storage space 1000K with the light incidence surface 1030a facing the lighting window member 1050, and the lighting window member 1050 includes the optical refraction portion 1052 that refracts light introduced from the gap 1000S toward the light incidence surface 1030a of the light guide member 1030. With this configuration, since the opening of the storage space 1000K for storing the light guide member 1030 is closed by the lighting window member 1050, intrusion of dust into the storage space 1000K can be prevented. Further, since light introduced from the gap 1000S is refracted toward the light incidence surface 1030a of the light guide member 1030 by the optical refraction portion 1052 of the lighting window member 1050, the light directed to the light incidence surface 1030a advances in the direction orthogonal to or nearly orthogonal to the light incidence surface 1030a, whereby the amount of light reaching the end of the light guide member 1030 at the rear side of the vehicle 1000V can be ensured. Accordingly, the reduction in the amount of light guided to the descending wall 1022 can be suppressed, whereby the descending wall 1022 can be made bright to reduce the contrast, and thus, the reflection on the windshield 1000F can be effectively made less visible.

In addition, the lighting window member 1050 includes the plate-like window body 1051, and the optical refraction portion 1052 has multiple projections 1053 with a wedge-shaped cross-section, the projections 1053 being provided on the inner surface 1051b of the window body 1051 and extending in the widthwise direction of the vehicle 1000V. According to this configuration, the optical refraction portion 1052 can be formed with a simple shape, and the refraction direction of light can easily be adjusted by changing the cross-sectional shape of the projections 1053. Accordingly, the reduction in the amount of light guided to the descending wall 1022 can be suppressed, whereby the descending wall 1022 can be made bright to reduce the contrast, and thus, the reflection on the windshield 1000F can be effectively made less visible.

While the present invention has been described above with respect to the preferred embodiment thereof, the bezel body and the vehicular display device according to the present invention are not limited to the configuration of the above embodiment.

In the above embodiment, the bezel member 1020 has an annular shape in a plan view, and includes the forward bezel portion 1021. However, it is not limited thereto. For example, the bezel member 1020 may be composed of only the forward bezel portion 1021 to constitute only the perimeter of the opening 1020a at the front side of the vehicle 1000V, and the remaining perimeter of the opening 1020a may be constituted by the opposed wall of the instrument panel 1000I.

In addition, in the above embodiment, the bezel member 1020 is entirely formed from a translucent synthetic resin. However, it is not limited thereto. It is only necessary that at least the descending wall 1022 is translucent.

While the best configuration and method to carry out the present invention have been described above, the present invention is not limited thereto. Specifically, while the present invention has mainly been illustrated and described particularly with respect to the specific embodiment, various modifications in shapes, materials, quantities, and any other detailed configurations may be made to the above-described embodiment by those of ordinary skill in the art without departing from the technical scope and spirit of the present invention. Therefore, the description that limits the shapes, materials, and the like is only an example to facilitate the understanding of the present invention, and is not intended to limit the present invention, so that the present invention includes the description using a name without a part of or all of the limitation on the shapes, materials, etc.

Second Invention

Figure 22:
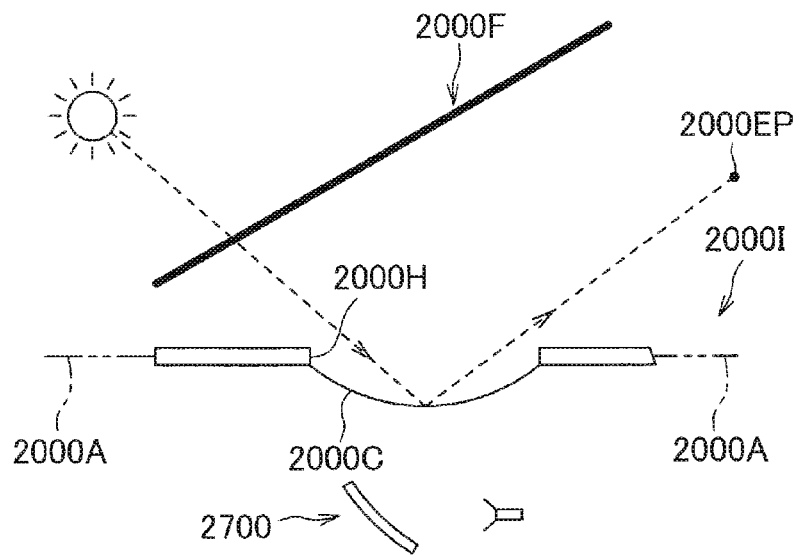
FIG. 22 is a sectional view illustrating a vehicular display device according to a conventional art concerning the second invention.

The second invention will be described below. Conventionally, a vehicular display device serving as ahead-up display device for projecting an image onto a windshield of a vehicle has been mounted in an instrument panel (see JP 2007-148092 A, for example). As illustrated in FIG. 22, a vehicular display device 2700 described in this patent literature is mounted in an instrument panel 2000I which has an opening 2000H formed on an opposed wall 2000A facing a windshield 2000F so as to project an image onto the windshield 2000F through the opening 2000H. The vehicular display device 2700 described above may have a transparent cover 2000C that closes the opening 2000H in order to prevent intrusion of dust or water into the opening H. However, external light such as the sunlight is reflected on the cover 2000C to be directed to an eyepoint 2000EP of a passenger, which may provide a sense of discomfort.

Figure 23:
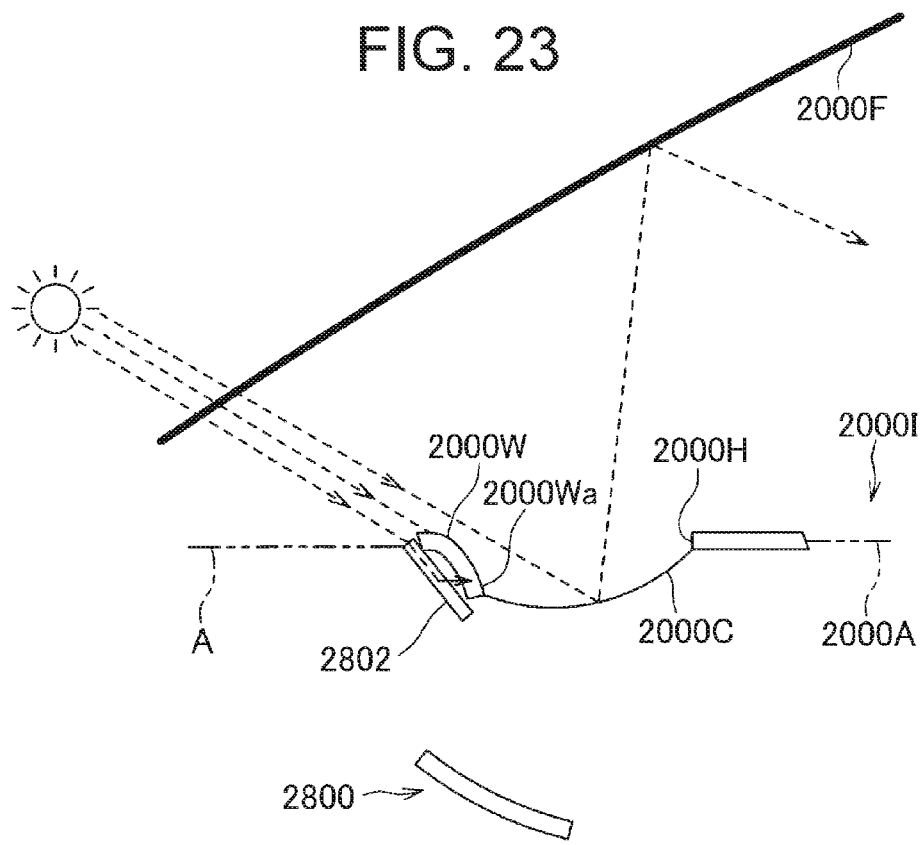
FIG. 23 is a sectional view illustrating a vehicular display device according to another conventional art concerning the second invention.

In view of this, a vehicular display device 2800 illustrated in FIG. 23 is considered as the configuration for preventing external light from being directed to the eyepoint 2000EP of the passenger. The vehicular display device 2800 is mounted in an instrument panel 2000I. The instrument panel 2000I has an opening 2000H formed on an opposed wall 2000A facing a windshield 2000F, and a forward bezel portion 2000W formed at the front of the opening 2000H is provided with a translucent descending wall 2000Wa that gradually descends from the front side to the rear side of the vehicle (from left to right in FIG. 23). A cover 2000C that gradually ascends from the front side to the rear side of the vehicle is provided on the opening 2000H, and the vehicular display device 2800 projects an image on the windshield 2000F through the opening 2000H. The configuration in which the descending wall 2000Wa is provided and the portion of the cover 2000C at the front side of the vehicle is lower than the portion thereof at the rear side makes it difficult to allow external light to reach the cover 2000C, and prevents external light reflected on the cover 2000C from being directed to the eyepoint 2000EP of the passenger.

In the above configuration, external light is not impinged on the vicinity of the descending wall 2000Wa of the forward bezel portion 2000W, so that the contrast is increased between the descending wall 2000Wa and its peripheral portion. Thus, the problem in which reflection on the windshield 2000F becomes visible may arise. In view of this, it is considered that the descending wall 2000Wa is formed from a translucent material, and a light guide member 2802 is disposed below the descending wall 2000Wa to illuminate the descending wall 2000Wa from the inner surface. This configuration makes the reflection less visible because light passing through the descending wall 2000Wa is directed to the windshield 2000F, thereby being capable of reducing a sense of discomfort provided to the passenger.

However, when the shape of the upper surface of the light guide member 2802 and the shape of the lower surface of the descending wall 2000Wa are different from each other in the vehicular display device 2800, the distance between the upper surface of the light guide member 2802 and the lower surface of the descending wall 2000Wa varies. Therefore, light incident on the descending wall 2000Wa from the light guide member 2802 also varies, entailing a problem of occurrence of color unevenness on the descending wall 2000Wa.

The object of the present invention is to provide a bezel body and a vehicular display device that effectively reduces a sense of discomfort provided to a passenger by making reflection on a windshield less visible.

In order to solve the above problem and achieve the object, the invention {1} of the present invention is a bezel body including: a bezel member that is fitted to an instrument panel of a vehicle to constitute a part of or all of the perimeter of an opening through which an image is projected onto a windshield by an image projector provided in the instrument panel; and a plate-like light guide member disposed below a forward bezel portion of the bezel member, the forward bezel portion being disposed at the front side of the vehicle with respect to the opening, wherein the forward bezel portion is disposed such that an end at the front side of the vehicle is disposed above the instrument panel to form a gap with the instrument panel, the forward bezel portion including a translucent descending wall that gradually descends from the front side to the rear side of the vehicle to reach the opening, and the light guide member guides light incident from the gap to illuminate the descending wall, and has the top surface having a shape along the lower surface of the descending wall.

The invention {2} is the bezel body described in the invention {1}, wherein a reflection portion that reflects light by changing an advancing direction to a thickness direction of the light guide member is provided in a predetermined area on the lower surface of the light guide member at the rear side of the vehicle.

The invention {3} is the bezel body described in the invention {1} or {2}, the bezel body comprising a brightness increasing film provided on the top surface of the light guide member and having multiple prisms arranged thereon.

The invention {4} is the bezel body described in the invention {1}, the bezel body comprising a brightness increasing film provided on the top surface of the light guide member and having multiple prisms which are arranged thereon to extend in the front and rear direction of the vehicle, wherein a reflection portion on which multiple prisms extending in the right and left direction of the vehicle are arranged is formed in a predetermined area on the lower surface of the light guide member at the rear side of the vehicle.

The invention {5} is a vehicular display device comprising: an image projector that is disposed in an instrument panel of a vehicle; and a bezel body including a bezel member that is fitted to the instrument panel to constitute a part of or all of the perimeter of an opening through which an image is projected onto a windshield by the image projector, wherein the bezel body is composed of the bezel body described in any one of the inventions {1} to {4}.

According to the inventions {1} and {5}, the end of the forward bezel portion at the front side is disposed above the instrument panel so as to form the gap with the instrument panel, and the light guide member is disposed below the forward bezel portion, whereby the light guide member can guide the light incident from the gap through the windshield to illuminate the descending wall. Further, since the top surface of the light guide member has the shape along the lower surface of the descending wall, the distance between the top surface of the light guide member and the lower surface of the descending wall becomes constant to reduce color unevenness on the descending wall. Therefore, this configuration makes the reflection of the descending wall onto the windshield less visible and effectively reduces a sense of discomfort provided to the passenger.

According to the invention {2}, since the reflection portion which reflects light by changing the advancing direction to the thickness direction of the light guide member is formed in the predetermined area on the lower surface of the light guide member at the rear side of the vehicle, the guided external light is easy to reflect toward the descending wall, whereby light can efficiently be emitted from the light guide member toward the descending wall. Therefore, this configuration makes the reflection of the descending wall onto the windshield much less visible and effectively reduces a sense of discomfort provided to the passenger.

According to the invention {3}, the brightness increasing film including multiple prisms arranged thereon is formed on the top surface of the light guide member, whereby light can more efficiently be emitted from the light guide member toward the descending wall.

According to the invention {4}, the reflection portion on which multiple prisms are arranged to extend in the right and left direction of the vehicle is formed in the predetermined area on the lower surface of the light guide member at the rear side. In addition, the brightness increasing film on which multiple prisms extending in the front and rear direction of the vehicle are arranged is provided on the top surface of the light guide member. Accordingly, light spreading in the right and left direction and the front and rear direction of the vehicle can be efficiently emitted toward the descending wall with its advancing direction being changed to the thickness direction of the light guide member.

Figure 16:
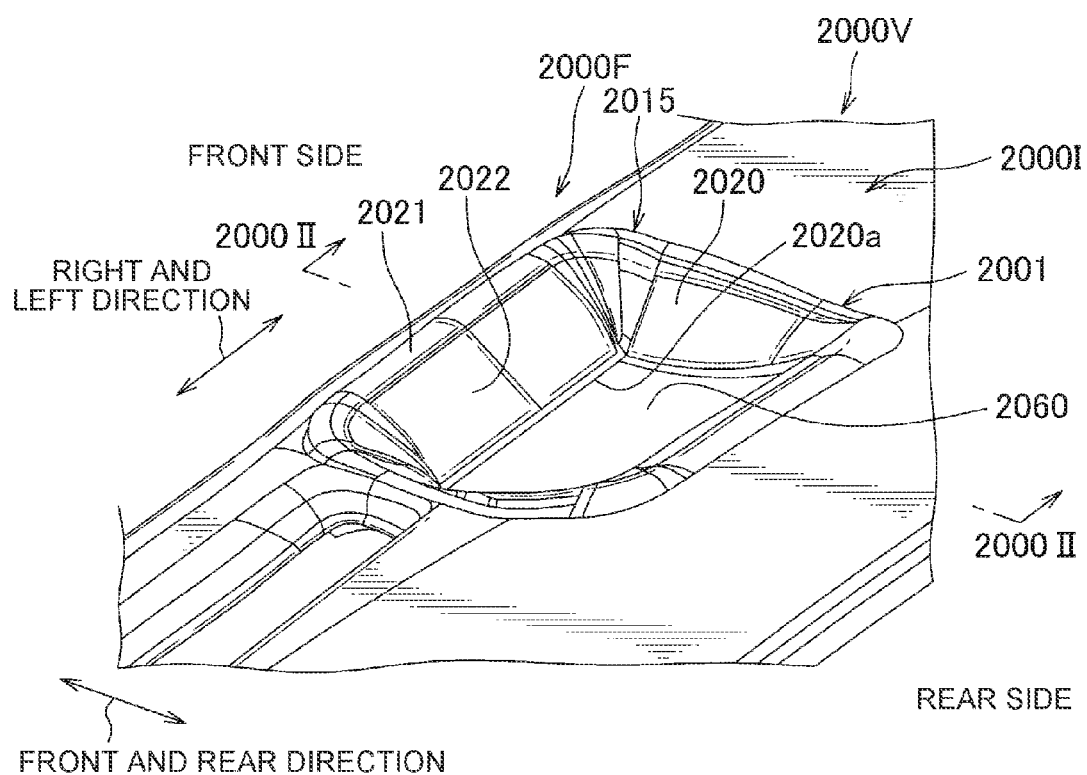
FIG. 16 is a perspective view illustrating that a vehicular display device according to one embodiment of the second invention is assembled to an instrument panel.
Figure 17:
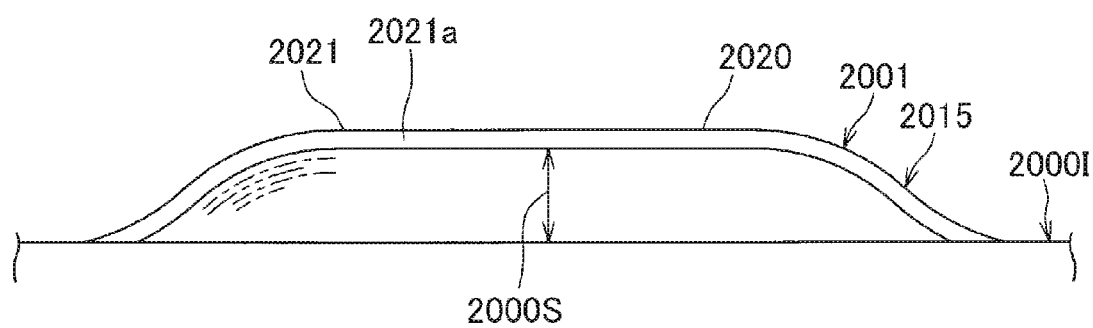
FIG. 17 is a view of the vehicular display device illustrated in FIG. 16 viewed from the front of the vehicle.
Figure 18:
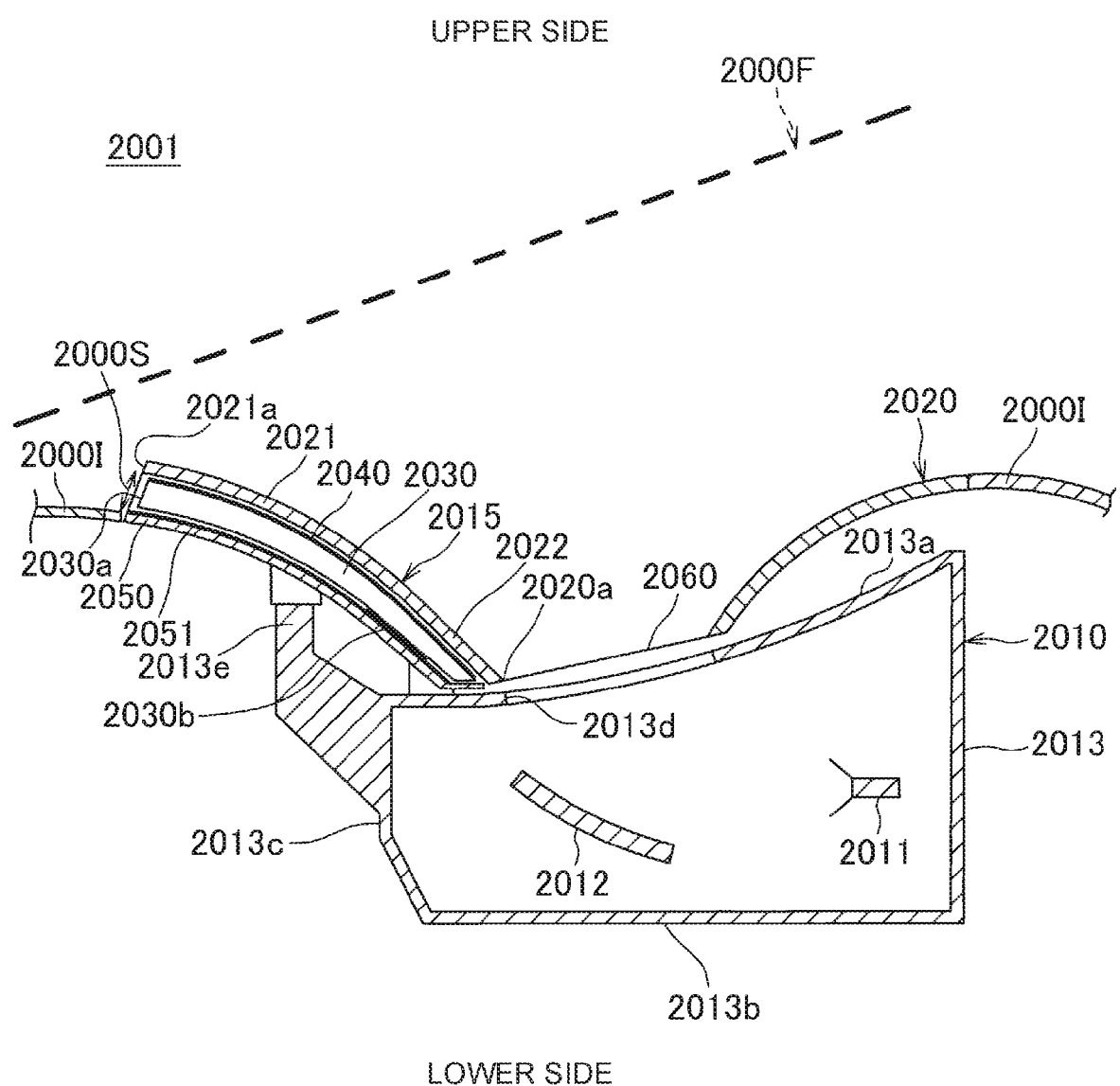
FIG. 18 is a sectional view along a line 2000II-2000II of the vehicular display device illustrated in FIG. 16.
Figure 19:
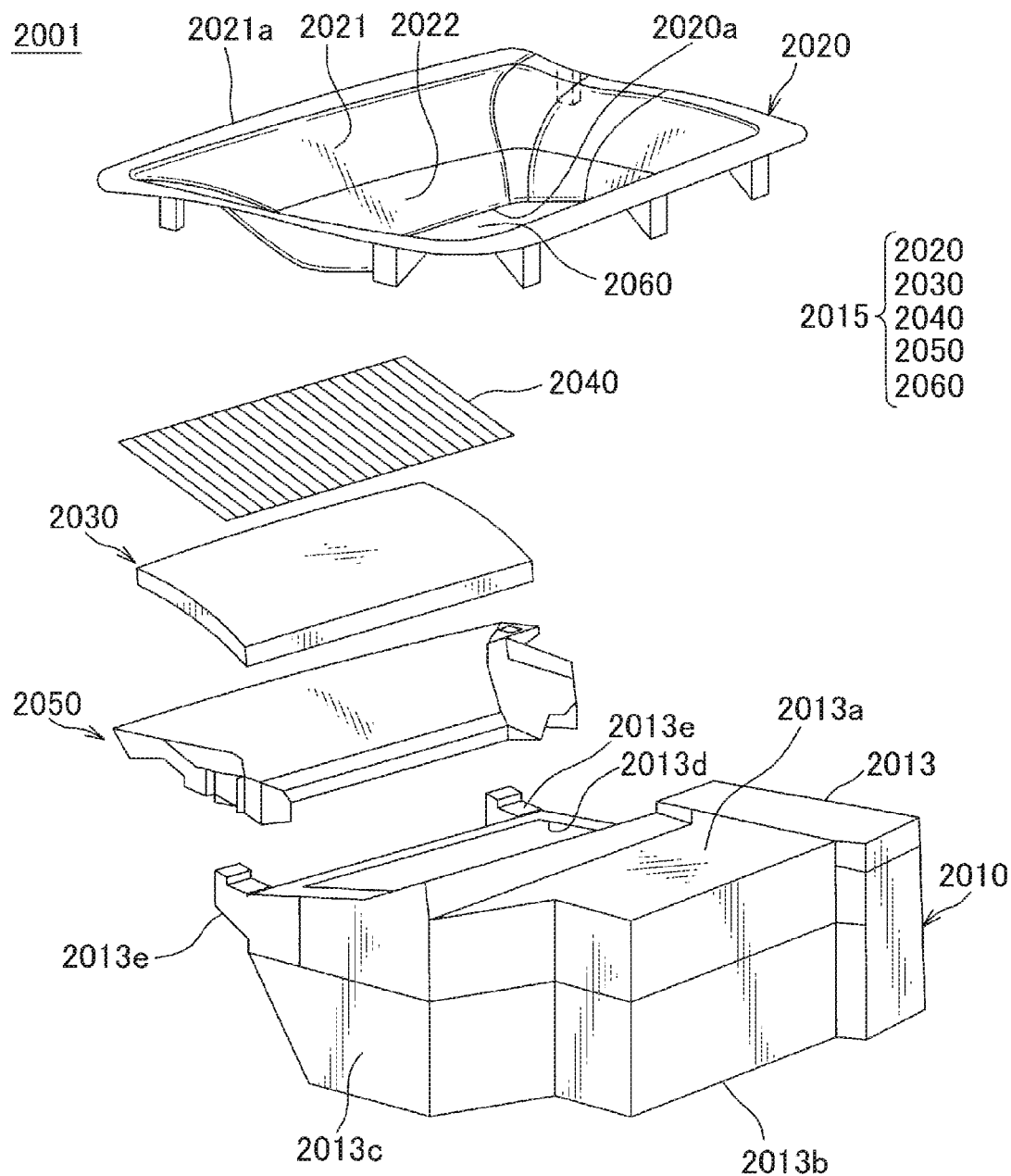
FIG. 19 is an exploded perspective view of the vehicular display device illustrated in FIG. 16.
Figure 20A:
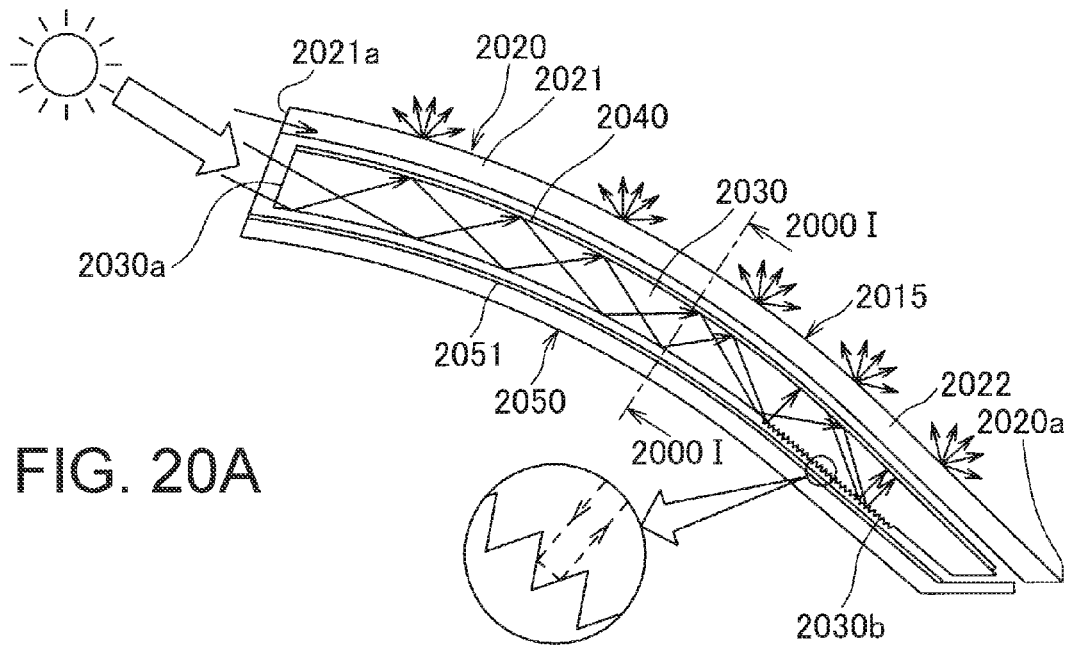
FIG. 20A is an enlarged sectional view for describing the progress of light in the light guide member of the vehicular display device illustrated in FIG. 16.
Figure 20B:
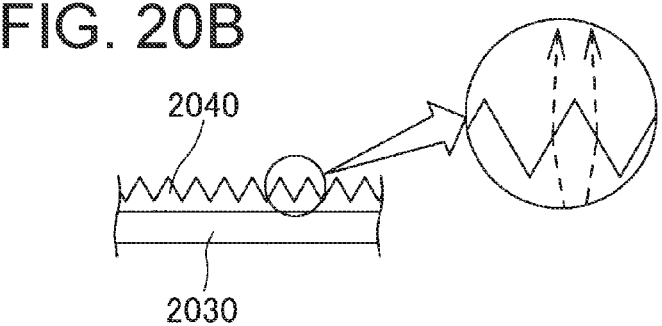
FIG. 20B is a sectional view along a line 2000I-2000I in FIG. 20A.

A bezel body and a vehicular display device according to one embodiment of the present invention will be described with reference to FIGS. 16 to 21. FIG. 16 is a perspective view illustrating that a vehicular display device according to one embodiment of the present invention is assembled to an instrument panel. FIG. 17 is a view of the vehicular display device illustrated in FIG. 16 viewed from the front of the vehicle. FIG. 18 is a sectional view along a line 2000II-2000II of the vehicular display device illustrated in FIG. 16. FIG. 19 is an exploded perspective view of the vehicular display device illustrated in FIG. 16. FIG. 20A is an enlarged sectional view for describing the progress of light in a light guide member of the vehicular display device illustrated in FIG. 16, and FIG. 20B is a sectional view along a line 2000I-2000I in FIG. 20A. FIG. 22 is a perspective view illustrating the back surface of the light guide member illustrated in FIG. 16. As illustrated in FIGS. 16 to 18, a vehicular display device 2001 according to the present embodiment is used as a head-up display device that is mounted to an instrument panel 2000I of a vehicle 2000V for projecting an image onto a windshield 2000F. Note that a front and rear direction, a right and left direction, a front side and a rear side in the front and rear direction, an upper side, and a lower side of the vehicle 2000V according to the present embodiment are as illustrated in FIGS. 16 and 18.

As illustrated in FIGS. 18 and 19, the vehicular display device 2001 includes an image projector 2010 provided in the instrument panel 2000I of the vehicle 2000V and a bezel body 2015 provided to the instrument panel 2000I.

As illustrated in FIG. 18, the image projector 2010 includes a display source 2011 for projecting an image, a reflection portion 2012 for reflecting an image from the display source 2011, and a housing 2013 that is formed from a synthetic resin for storing the display source 2011 and the reflection portion 2012. The housing 2013 includes a top wall 2013a, a bottom wall 2013b facing the top wall 2013a, and a peripheral wall 2013c continuously formed on the perimeter of the top wall 2013a and the bottom wall 2013b. An opening 2013d that is disposed to be overlapped with an opening 2020a on a later-described bezel member 2020 is formed on the top wall 2013a. The image projector 2010 reflects an image projected by the display source 2011 on the reflection portion 2012, and projects the image onto the windshield 2000F through the opening 2013d. Thus, a passenger in the vehicle 2000V can visually recognize the image displayed on the windshield 2000F.

As illustrated in FIGS. 18 and 19, the bezel body 2015 includes a bezel member 2020, a light guide member 2030, a brightness increasing film. 2040, a support member 2050 serving as a case member, and a cover 2060.

The bezel member 2020 is formed from a semi-translucent (transparent) synthetic resin and has an annular shape with an opening 2020a formed at the center in a plan view. The bezel member 2020 gradually descends from the outer peripheral edge toward the inner peripheral edge, and is curved such that the tilt is increased toward the inner peripheral edge. The bezel member 2020 is fitted to a hole formed on the instrument panel 2000I to constitute the entire perimeter of the opening 2020a from which an image is projected onto the windshield 2000F by the image projector 2010 disposed in the instrument panel 2000I.

A forward bezel portion 2021 of the bezel member 2020 disposed at the front side of the vehicle 2000V with respect to the opening 2020a is disposed such that an end 2021a at the front side of the vehicle 2000V is located above the instrument panel 2000I so as to form a gap 2000S with the instrument panel 2000I. In addition, the forward bezel portion 2021 has a descending wall 2022 that gradually descends from the front side toward the rear side of the vehicle 2000V to reach the opening 2020a and is curved such that the tilt is increased toward the opening 2020a.

When being fitted to the instrument panel 2000I, the bezel member 2020 is disposed such that a part of the outer peripheral edge of the bezel member 2020 at the front side (i.e., the end 2021a of the forward bezel portion 2021 at the front side of the vehicle 2000V) is located above the instrument panel 2000I (FIG. 17), and the other part of the outer peripheral edge other than the part is disposed to be smoothly contiguous to the instrument panel 2000I (FIG. 16). Further, in this case, the opening 2020a of the bezel member 2020 and the opening 2013d of the image projector 2010 are disposed to be overlapped with each other in the vertical direction. In addition, a tint control or a surface treatment to make the bezel member 2020 look alike the instrument panel 2000I is performed to the bezel member 2020 in order to make the difference in reflection onto the windshield 2000F between the bezel member 2020 and the instrument panel 2000I less visible.

The light guide member 2030 is formed from a material having high transparency, such as a glass or a synthetic resin including acryl and polycarbonate, and is formed into a shape of a substantially rectangular plate in a plan view (FIG. 19). The light guide member 2030 is disposed below the forward bezel portion 2021, and guides light incident from the above-mentioned gap 2000S to illuminate the forward bezel portion 2021 (i.e., the descending wall 2022). The light guide member 2030 is formed such that the thickness thereof is decreased toward the rear side from the front side as illustrated in FIGS. 20A and 20B.

Further, the top surface of the light guide member 2030 is formed to have a shape along the lower surface of the forward bezel portion 2021 having the descending wall 2022. More specifically, the top surface of the light guide member 2030 gradually descends from the front side to the rear side of the vehicle 2000V and is curved to be greatly tilted toward the rear side, as in the lower surface of the forward bezel portion 2021. In addition, the distance between the top surface of the light guide member 2030 and the lower surface of the descending wall 2022 is set as small as possible.

Figure 21:
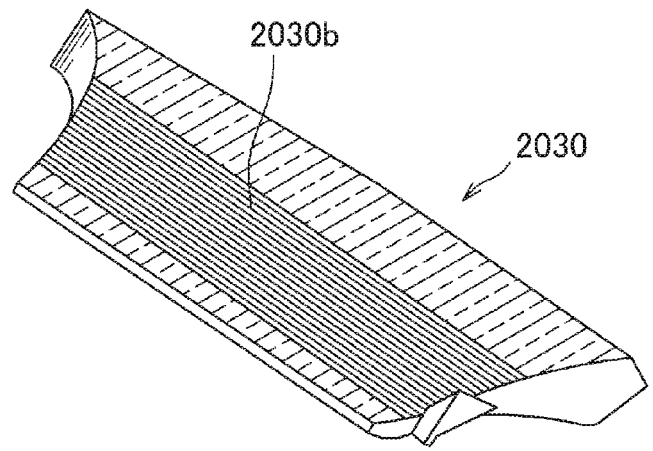
FIG. 21 is a perspective view illustrating the back surface of the light guide member illustrated in FIG. 16.

As illustrated in FIGS. 20A, 20B, 21, and other figures, a reflection portion 2030b on which multiple prisms with a wedge-shaped cross-section are arranged to extend in the right and left direction of the vehicle 2000V is formed in a predetermined area on the lower surface of the light guide member 2030 at the rear side. The multiple prisms of the reflection portion 2030b are arranged along the front and rear direction of the vehicle 2000V. Light reaching the reflection portion 2030b is reflected with its advancing direction being changed to the thickness direction of the light guide member 2030. It should be noted that the reflection portion 2030b is only necessarily formed in at least an appropriate area at the rear side according to the refractive index or shape of the light guide member 2030, and it may be formed on the entire lower surface.

The brightness increasing film 2040 is applied on the top surface of the light guide member 2030. The brightness increasing film 2040 is provided with multiple microprisms with a wedge-shaped cross-section on its top surface, the microprisms extending in the front and rear direction of the vehicle 2000V. The multiple prisms of the brightness increasing film 2040 are arranged along the right and left direction of the vehicle 2000V. Light incident from the lower surface of the brightness increasing film 2040 and emitted from the top surface is refracted with the advancing direction being changed to the thickness direction of the light guide member 2030.

The support member 2050 is disposed below the light guide member 2030 to support the light guide member 2030. A gloss-finished reflection portion 2051 is provided on the top surface of the support member 2050 to reflect light from above. Further, the support member 2050 is disposed such that the end at the front side is on substantially the same level as the top surface of the instrument panel 2000I, and an end face 2030a of the light guide member 2030 at the front side is disposed to face the gap 2000S. According to this, external light emitted from the front side through the windshield 2000F can be introduced from the end face 2030a of the light guide member 2030 at the front side through the gap 2000S. The support member 2050 is fixed to a pair of legs 2013e projecting forward from the peripheral wall 2013c of the housing 2013.

The cover 2060 is formed into a thin plate using a material having high transparency, such as a glass or a synthetic resin including acryl and polycarbonate, and mounted to be fixed to the perimeter of the opening 2020a of the bezel member 2020 to close the opening 2020a. The cover 2060 is disposed to extend upward from the front side toward the rear side of the vehicle 2000V (FIG. 18). This configuration prevents light impinged on the cover 2060 from directly advancing to the eyepoint of the passenger.

Next, the process of emitting external light introduced into the light guide member 2030 toward the forward bezel portion 2021 will be described with reference to FIGS. 20A and 20B. Firstly, external light entering from the gap 2000S through the windshield 2000F is incident on the end face 2030a of the light guide member 2030 at the front side. After reaching the top surface or the lower surface of the light guide member 2030, this light is emitted from the top surface or the lower surface, if the incidence angle is smaller than a predetermined value. If the incidence angle is equal to or smaller than the predetermined value, this light is totally reflected, and advances in the light guide member 2030 toward the rear side. The light emitted from the top surface is refracted by the prisms formed on the brightness increasing film 2040 and changes its advancing direction to the thickness direction as illustrated in FIG. 20B.

The light emitted from the lower surface is reflected upward by the reflection portion 2051 on the support member 2050 and again enters the light guide member 2030. When reaching the reflection portion 2030b on the lower surface, the light advancing in the light guide member 2030 toward the rear side is reflected by the prisms on the reflection portion 2030b to change the advancing direction to the thickness direction, and emitted from the top surface, as illustrated in FIG. 20A.

As described above, external light is guided from the front side toward the rear side by the light guide member 2030, and emitted toward the upper forward bezel portion 2021. Light reaching the descending wall 2022 of the forward bezel portion 2021 passes through the descending wall 2022 to be directed to the windshield 2000F, and thus, causes the reflection of the descending wall 2022.

According to the embodiment described above, the end 2021a of the forward bezel portion 2021 at the front side is disposed above the instrument panel 2000I so as to form the gap 2000S with the instrument panel 2000I, and the light guide member 2030 is disposed below the forward bezel portion 2021, whereby the light guide member 2030 can guide the light incident from the gap 2000S through the windshield 2000F to illuminate the descending wall 2022. Further, since the top surface of the light guide member 2030 has the shape along the lower surface of the descending wall 2022, the distance between the top surface of the light guide member 2030 and the lower surface of the descending wall 2022 becomes constant to reduce color unevenness on the descending wall 2022. Therefore, this configuration makes the reflection of the descending wall 2022 onto the windshield 2000F less visible and effectively reduces a sense of discomfort provided to the passenger. In addition, since the distance between the top surface of the light guide member 2030 and the lower surface of the descending wall 2022 is as small as possible, loss of light directed from the light guide member 2030 toward the descending wall 2022 in the air can be suppressed.

In addition, according to the above embodiment, since the reflection portion 2030b which reflects light by changing the advancing direction to the thickness direction of the light guide member 2030 is formed in the predetermined area on the lower surface of the light guide member 2030 at the rear side of the vehicle 2000V, the guided external light is easy to reflect toward the descending wall 2022, whereby light can efficiently be emitted from the light guide member 2030 toward the descending wall 2022. Therefore, this configuration makes the reflection of the descending wall 2022 onto the windshield 2000F much less visible and effectively reduces a sense of discomfort provided to the passenger.

In addition, according to the above embodiment, the brightness increasing film 2040 on which multiple prisms are arranged is formed on the top surface of the light guide member 2030, whereby light can more efficiently be emitted from the light guide member 2030 toward the descending wall 2022.

In addition, according to the above embodiment, the prisms on the reflection portion 2030b extend in the right and left direction of the vehicle 2000V, and the prisms on the brightness increasing film 2040 extend in the front and rear direction of the vehicle 2000V. That is, the extending direction of the prisms on the brightness increasing film 2040 is rotated by 90 degrees with respect to the extending direction of the prisms on the reflection portion 2030b. Thus, the advancing direction of light spreading in the front and rear direction can be changed to the thickness direction by the reflection portion 2030b (FIG. 20A), and the advancing direction of light spreading in the right and left direction can be changed to the thickness direction by the brightness increasing film 2040 (FIG. 20B). Accordingly, light spreading in the right and left direction and the front and rear direction of the vehicle can be efficiently emitted toward the descending wall 2022 by changing its advancing direction to the thickness direction of the light guide member.

It is to be noted that, although the light guide member 2030 is provided with the reflection portion 2030b or the brightness increasing film 2040 in the above embodiment, it is not limited thereto. It is only necessary that the top surface of the light guide member 2030 is along the lower surface of the descending wall 2022, and the light guide member 2030 may not be provided with the reflection portion 2030b or the brightness increasing film 2040. Alternatively, the light guide member 2030 may be provided with only one of the reflection portion 2030b and the brightness increasing film 2040.

In addition, according to the present embodiment, the prisms on the brightness increasing film 2040 are provided along the front and rear direction. However, they are not limited thereto. The prisms may be provided along the right and left direction.

In addition, in the above embodiment, the bezel member 2020 has an annular shape in a plan view, and the forward bezel portion 2021 is a part of the bezel member 2020. However, it is not limited thereto. For example, the bezel member 2020 may be composed of only the forward bezel portion 2021 to constitute only the perimeter of the opening 2020a at the front side of the vehicle 2000V, and the remaining perimeter of the opening 2020a may be constituted by the instrument panel 2000I.

In addition, in the above embodiment, the bezel member 2020 is entirely formed from a translucent synthetic resin. However, it is not limited thereto. It is only necessary that at least the descending wall 2022 is translucent.

In addition, the above embodiment illustrates only the representative form of the present invention, and the present invention is not limited to the embodiment. Specifically, the present invention can be embodied by being modified in various ways without departing from the spirit of the present invention.

Third Invention

Figure 28:
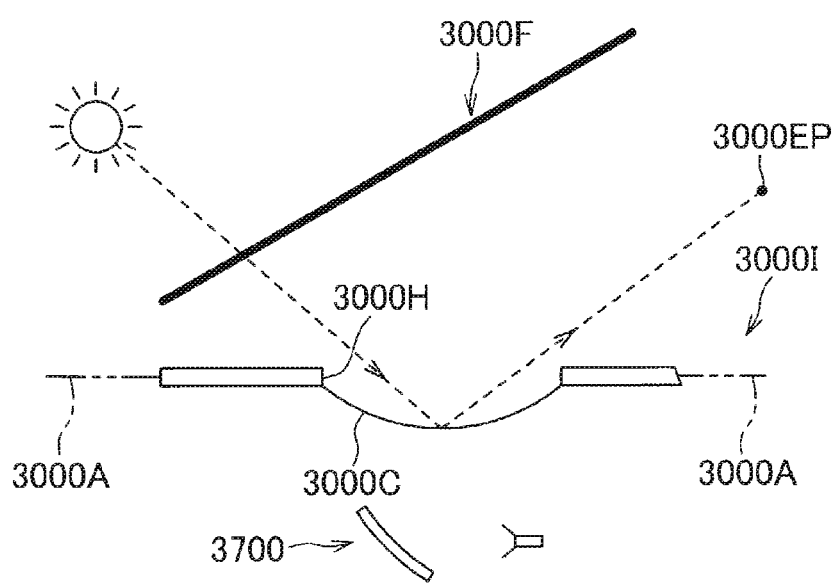
FIG. 28 is a sectional view illustrating a vehicular display device according to a conventional art concerning the third invention.

The third invention will be described below. Conventionally, a vehicular display device serving as ahead-up display device for projecting an image onto a windshield of a vehicle has been mounted in an instrument panel (see JP 2007-148092 A, for example). As illustrated in FIG. 28, a vehicular display device 3700 described in this patent literature is mounted in an instrument panel 3000I which has an opening 3000H formed on an opposed wall 3000A facing a windshield 3000F so as to project an image onto the windshield 3000F through the opening 3000H. The vehicular display device 3700 described above may have a transparent cover 3000C that closes the opening 3000H in order to prevent intrusion of dust or water into the opening 3000H. However, external light such as the sunlight is reflected on the cover 3000C to be directed to an eyepoint 3000EP of a passenger, which may provide a sense of discomfort.

Figure 29:
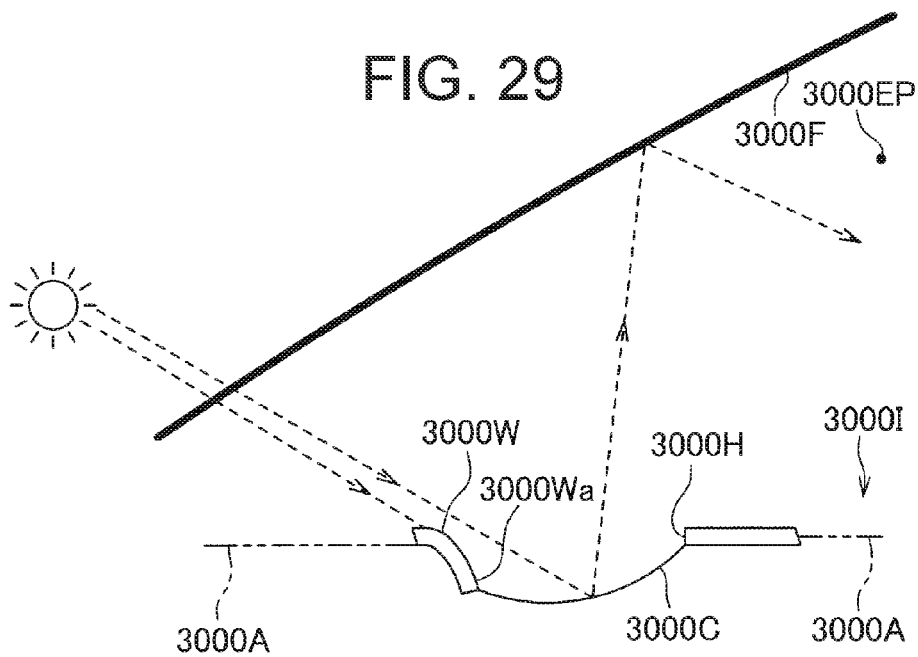
FIG. 29 is a sectional view illustrating a vehicular display device according to another conventional art concerning the third invention.

In view of this, a vehicular display device 3800 illustrated in FIG. 29 is considered as the configuration for preventing external light from being directed to the eyepoint 3000EP. The vehicular display device 3800 is mounted in an instrument panel 3000I. The instrument panel 3000I has an opening 3000H formed on an opposed wall 3000A facing a windshield 3000F, and a forward bezel portion 3000W formed at the front of the opening 3000H is provided with a translucent descending wall 3000Wa that gradually descends from the front side to the rear side of the vehicle (from left to right in FIG. 29). A cover 3000C that gradually ascends from the front side to the rear side of the vehicle is provided on the opening 3000H, and the vehicular display device 3800 projects an image on the windshield 3000F through the opening 3000H. The configuration in which the descending wall 3000Wa is provided and the portion of the cover 3000C at the front side of the vehicle is lower than the portion thereof at the rear side makes it difficult to allow external light to reach the cover 3000C, and prevents external light reflected on the cover 3000C from being directed to the eyepoint 3000EP of the passenger.

In the above configuration, external light is not impinged on the vicinity of the descending wall 3000Wa of the forward bezel portion 3000W, so that the contrast is increased between the descending wall 3000Wa and its peripheral portion. Thus, the problem in which reflection on the windshield 3000F becomes visible may arise.

The object of the present invention is to provide a bezel body and a vehicular display device that effectively reduces a sense of discomfort provided to a passenger by making reflection on a windshield less visible.

In order to solve the above problem and achieve the object, the invention {6} of the present invention is a vehicular display device comprising: a substrate provided in an instrument panel of a vehicle and including a display source that generates display light; and a bezel member that is fitted to the instrument panel to constitute a part of or all of the perimeter of an opening through which display light from the display source is projected onto a windshield, the bezel member having a forward bezel portion disposed at the front side of the vehicle with respect to the opening, the forward bezel portion including a translucent descending wall that gradually descends toward the rear side of the vehicle to reach the opening, the vehicular display device further comprising: a first light guide member disposed below the descending wall; a light source mounted on the substrate; and a second light guide member that guides light from the light source toward the first light guide member.

The invention {7} is the vehicular display device described in the invention {6}, the vehicular display device comprising an illumination sensor that detects an illumination intensity outside, and a control unit that controls brightness of the light source on the basis of the detection result of the illumination sensor.

The invention {8} is the vehicular display device described in the invention {6} or {7}, wherein the forward bezel portion is disposed such that an end at the front side of the vehicle is located above the instrument panel so as to form a gap with the instrument panel, and the first light guide member guides light incident from the gap to illuminate the descending wall and guides light incident from the second light guide member to illuminate the descending wall.

As described above, according to the invention {6}, light from the light source is guided to the first light guide member disposed below the descending wall of the bezel member by the second light guide member. The guided light is emitted to the descending wall by the first light guide member, whereby the descending wall can be illuminated. Further, the light source can be mounted on the substrate on which the display source is mounted, and this can eliminate the need to separately provide a substrate for the display source and a substrate for the light source. Therefore, this configuration makes the reflection of the descending wall onto the windshield less visible and effectively reduces a sense of discomfort provided to the passenger with low cost.

According to the invention {7}, the brightness of the light source can be controlled according to the brightness outside, and this can make the reflection onto the windshield much less visible and effectively reduce a sense of discomfort provided to the passenger.

According to the invention {8}, the end of the forward bezel portion at the front side is located above the instrument panel to form a gap with the instrument panel, and the first light guide member is disposed below the forward bezel portion, whereby external light emitted to the inside of the vehicle from the front side through the windshield is introduced from the end face of the first light guide member at the front side, and this external light can be emitted toward the descending wall by the first light guide member. Thus, reflection can be made mush less visible in combination of light from the light source.

Figure 24:
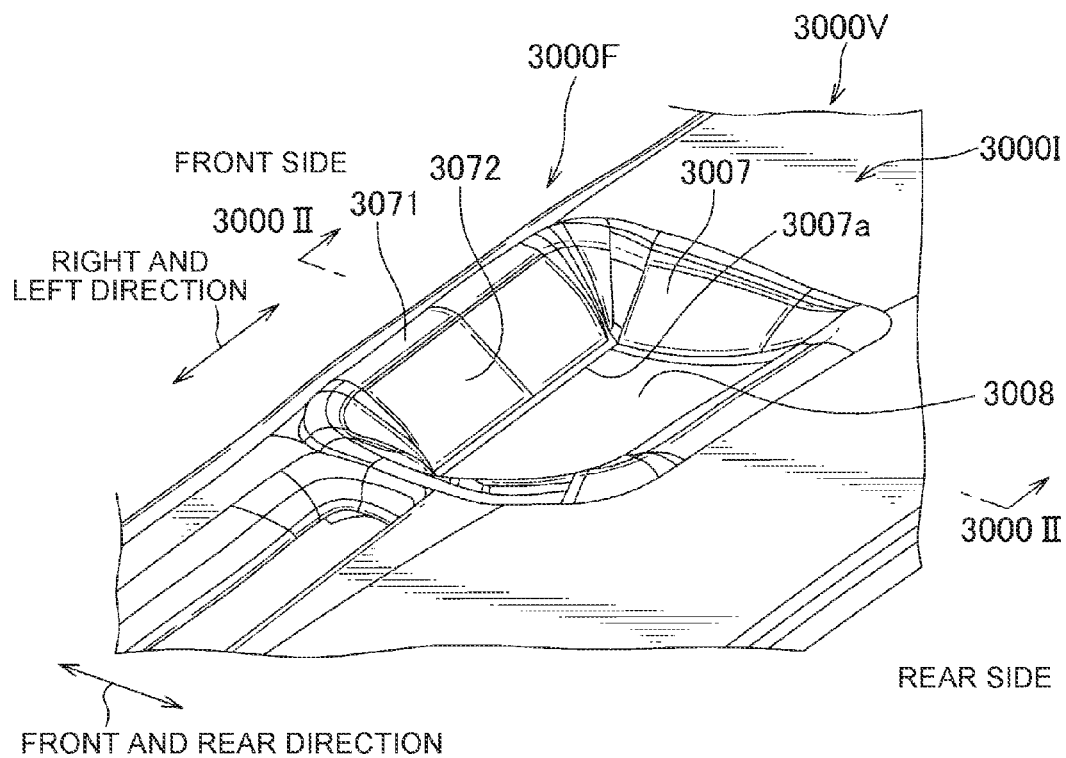
FIG. 24 is a perspective view illustrating a vehicular display device according to an embodiment of the third invention.
Figure 25:
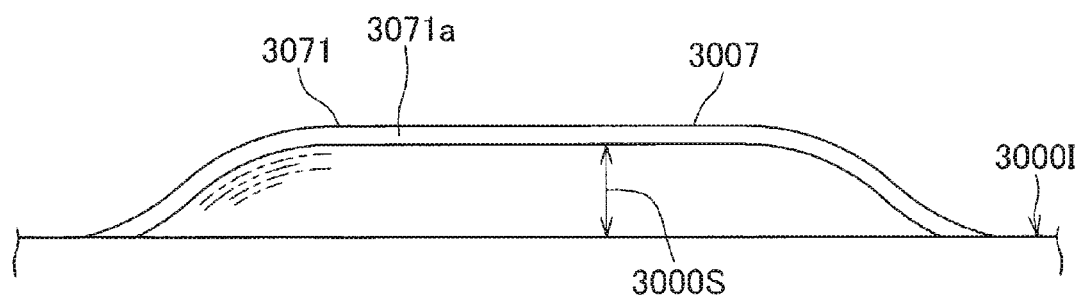
FIG. 25 is a view of the vehicular display device illustrated in FIG. 24 viewed from the front of the vehicle.
Figure 26:
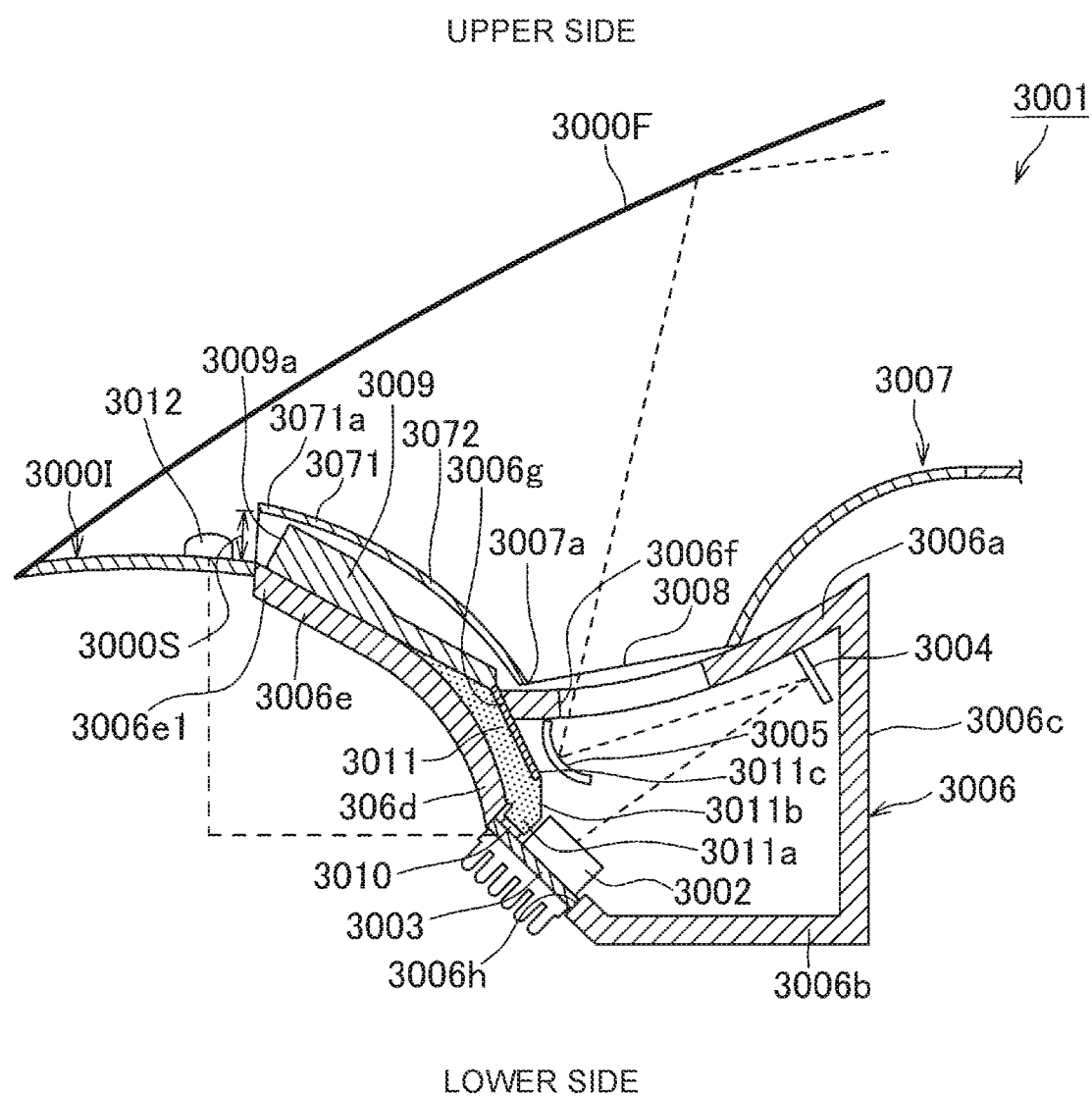
FIG. 26 is a sectional view along a line 3000II-3000II of the vehicular display device.
Figure 27:
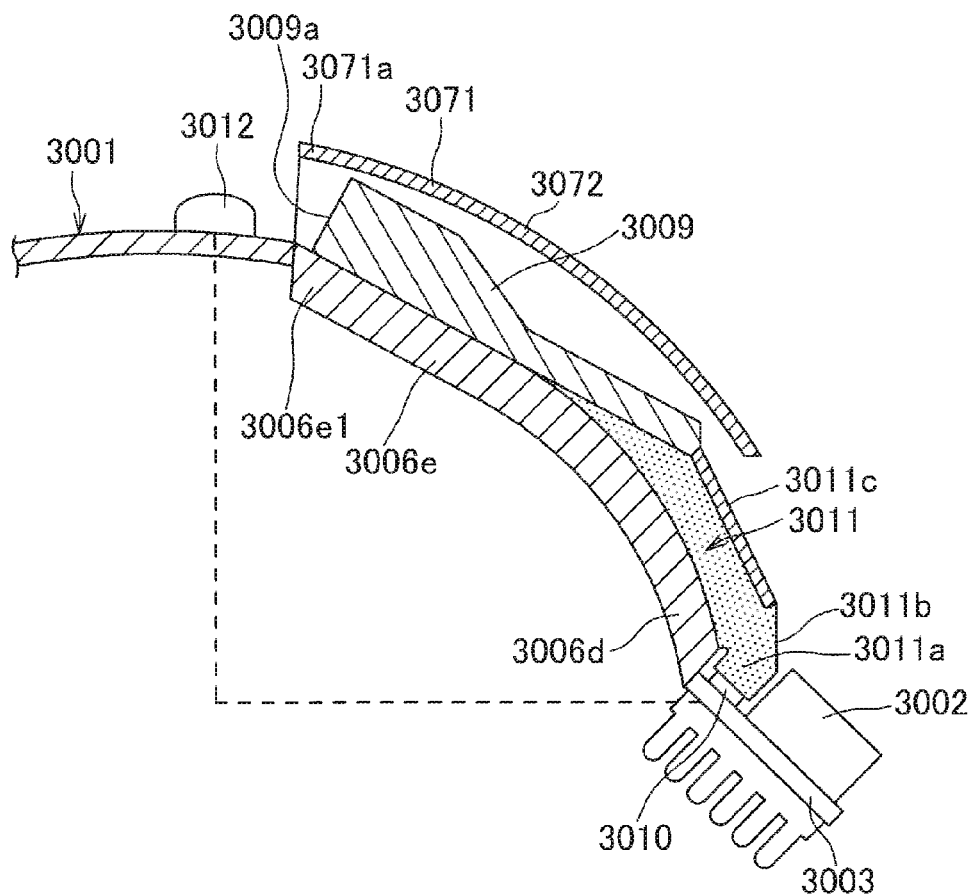
FIG. 27 is an enlarged sectional view illustrating a main part of the vehicular display device as enlarged.

A vehicular display device according to one embodiment of the present invention will be described with reference to FIGS. 24 to 27. FIG. 24 is a perspective view illustrating the vehicular display device according to the embodiment of the present invention. FIG. 25 is a view of the vehicular display device illustrated in FIG. 24 viewed from the front of the vehicle. FIG. 26 is a sectional view along a line 3000II-3000II of the vehicular display device. FIG. 27 is an enlarged sectional view illustrating a main part of the vehicular display device as enlarged. As illustrated in FIGS. 24 to 27, a vehicular display device 3001 according to the present embodiment is used as a head-up display device that is mounted to an instrument panel 3000I of a vehicle 3000V for projecting an image onto a windshield 3000F. Note that a front and rear direction, a right and left direction, a front side and a rear side in the front and rear direction, an upper side, and a lower side of the vehicle 3000V according to the present embodiment are as illustrated in FIGS. 24 and 26.

As illustrated in FIG. 26, the vehicular display device 3001 includes a substrate 3003 on which a display device 3002 serving as a display source for generating display light is mounted, a reflection mirror 3004 and an aspherical mirror 3005 that reflect light from the display device 3002 and project the light onto the windshield 3000F, and a housing 3006 that stores the substrate 3003 and the mirrors 3004 and 3005.

The vehicular display device 3001 also includes a bezel member 3007 that is fitted to the instrument panel 3000I to constitute all of the perimeter of the opening 3007a from which display light from the display device 3002 is projected onto the windshield 3000F, a cover 3008 covering the opening 3007a, a first light guide member 3009 disposed below the bezel member 3007, a light source 3010 mounted on the substrate 3003, a second light guide member 3011 that guides light from the light source 3010 toward the first light guide member 3009, and an illumination sensor 3012.

The substrate 3003 is provided with the display device 3002 and the light source 3010, and is disposed in the housing 3006 such that the display device 3002 and the light source 3010 face obliquely upward and rearward of the vehicle 3000V. The reflection mirror 3004 reflects display light from the display device 3002 to the aspherical mirror 3005. The aspherical mirror 3005 reflects light from the reflection mirror 3004 to the windshield 3000F through the opening 3007a. Thus, a passenger in the vehicle 3000V can visually recognize the image displayed on the windshield 3000F.

As illustrated in FIG. 26 and other figures, the housing 3006 has a top wall 3006a, a bottom wall 3006b opposite to the top wall 3006a, a peripheral wall 3006c continuously formed on the peripheral edge of the top wall 3006a and the bottom wall 3006b, and a case portion 3006e projecting from the forward peripheral wall 3006d of the peripheral wall 3006c located at the front side of the vehicle 3000V. An opening 3006f which is formed to be overlapped with a later-described opening 3007a of the bezel member 3007 is formed on the top wall 3006a at the center, and an opening 3006g into which the later-described second light guide member 3011 is inserted is formed on an end of the top wall 3006a at the front side.

An opening 3006h to which the substrate 3003 is fitted is formed at the lower part of the forward peripheral wall 3006d. Further, the forward peripheral wall 3006d extends upward and gradually forward to support the later-described second light guide member 3011 from below. The case portion 3006e also extends upward and gradually forward to support the later-described first light guide member 3009. Further, the end 3006e1 of the case portion 3006e at the front side is on substantially the same level as the top surface of the instrument panel 3000I.

The bezel member 3007 is formed from a semi-translucent (transparent) synthetic resin and has an annular shape with the opening 3007a formed at the center in a plan view. The bezel member 3007 gradually descends from the outer peripheral edge toward the inner peripheral edge, and is curved such that the tilt is increased toward the inner peripheral edge. The bezel member 3007 is fitted to a hole formed on the instrument panel 3000I to constitute the entire perimeter of the opening 3007a from which an image is projected onto the windshield 3000F by the display device 3002 disposed in the instrument panel 3000I.

A forward bezel portion 3071 of the bezel member 3007 located at the front side of the vehicle 3000V with respect to the opening 3007a is disposed such that an end 3071a at the front side of the vehicle 3000V is located above the instrument panel 3000I to form a gap 3000S with the instrument panel 3000I. In addition, the forward bezel portion 3071 has a descending wall 3072 that gradually descends from the front side toward the rear side of the vehicle 3000V to reach the opening 3007a and is curved such that the tilt is increased toward the opening 3007a.

When being fitted to the instrument panel 3000I, the bezel member 3007 is disposed such that a part of the outer peripheral edge of the bezel member 3007 at the front side (i.e., the end 3071a of the forward bezel portion 3071 at the front side of the vehicle 3000V) is located above the instrument panel 3000I (FIG. 25), and the other part of the outer peripheral edge other than the part is disposed to be smoothly contiguous to the instrument panel 3000I (FIG. 24). Further, in this case, the opening 3007a of the bezel member 3007 and the opening 3006f of the housing 3006 storing the display device 3002 are disposed to be overlapped with each other in the vertical direction. In addition, a tint control or a surface treatment to make the bezel member 3007 look alike the instrument panel 3000I is performed to the bezel member 3007 in order to make the difference in reflection onto the windshield 3000F between the bezel member 3007 and the instrument panel 3000I less visible.

The cover 3008 is formed into a thin plate using a material having high transparency, such as a glass or a synthetic resin including acryl and polycarbonate, and mounted to be fixed to the perimeter of the opening 3007a of the bezel member 3007 to close the opening 3007a. The cover 3008 is disposed to extend upward from the front side toward the rear side of the vehicle (FIG. 26). This prevents light impinged on the cover 3008 from directly advancing to the eyepoint of the passenger.

The first light guide member 3009 is formed into a shape of a substantially rectangular plate in a plan view by using a material having high transparency, such as a glass or a synthetic resin including acryl and polycarbonate. The first light guide member 3009 is disposed below the forward bezel portion 3071, guides light incident from the above-mentioned gap 3000S, and emits the light toward the forward bezel portion 3071 (i.e., the descending wall 3072), whereby the forward bezel portion 3071 is illuminated. The first light guide member 3009 is formed such that the front portion is thick and the rear portion is thin, and the portion between the thick portion and the thin portion is formed to be gradually thinner from the front portion toward the rear portion as illustrated in the cross-sectional view (FIG. 27) in the front and rear direction. Specifically, the surface of the first light guide member 3009 facing downward is flat, and the surface facing upward has a tilt surface that gradually descends from the front portion toward the rear portion at the middle in the front and rear direction.

The front portion of the first light guide member 3009 is supported by the above-described case portion 3006e from below, and the rear portion thereof is located above the case portion 3006e. As described above, the end 3006e1 of the case portion 3006e at the front side is on substantially the same level as the top surface of the instrument panel 3000I, and an end face 3009a of the first light guide member 3009 at the front side is disposed to face the gap 3000S. According to this, external light emitted from the front side through the windshield 3000F can be introduced from the end face 3009a of the first light guide member 3009 at the front side through the gap 3000S. The first light guide member 3009 guides the external light introduced from the end face 3009a toward the rear side and emits the light toward the descending wall 3072.

Like the first light guide member 3009, the second light guide member 3011 is formed into a plate-like shape by using a material having high transparency, such as a glass or a synthetic resin including acryl and polycarbonate. The second light guide member 3011 is formed to extend upward and gradually forward along the case portion 3006e and the forward peripheral wall 3006d. An incidence portion 3011a projecting toward the light source 3010 on the substrate 3003 is formed at the end of the second light guide member 3011 at the rear side. Light from the light source 3010 is incident on the second light guide member 3011 from the incidence portion 3011a.

In addition, a reflection surface 3011b that reflects light incident from the incidence portion 3011a forward is provided on the top surface at the end of the second light guide member 3011 at the rear side. The end of the second light guide member 3011 at the front side is located between the case portion 3006e and the first light guide member 3009, and light reflected forward by the reflection surface 3011b is guided to the first light guide member 3009. In addition, a light-shielding portion 3011c is formed on the top surface of the second light guide member 3011 other than the reflection surface 3011b and the portion overlapped with the lower surface of the first light guide member 3009 to prevent a leak of light toward the display device 3002.

The illumination sensor 3012 detects an illumination intensity outside, and is installed on the instrument panel 3000I at the front side of the vehicle 3000V. A controller not illustrated as a control unit to control brightness of the light source 3010 is also installed on the substrate 3003, and the detection result of the illumination sensor 3012 is input to the controller. The controller controls to increase the brightness of the light source 3010, if it is bright outside, and to decrease the brightness of the light source 3010, if it is dark outside, on the basis of the detection result from the illumination sensor 3012.

Next, the process of emitting external light introduced into the first light guide member 3009 toward the bezel member 3007 will be described with reference to FIG. 27. Firstly, external light entering from the gap 3000S through the windshield 3000F is incident on the end face 3009a of the first light guide member 3009 at the front side. After reaching the top surface or the lower surface, this light is emitted from the top surface or the lower surface, if the incidence angle is smaller than a predetermined value. If the incidence angle is equal to or larger than the predetermined value, this light is totally reflected, and advances in the first light guide member 3009 toward the rear side. The light emitted from the top surface is directed to the upper forward bezel portion 3071, and the light emitted from the lower surface is reflected by the case portion 3006e and is again incident on the first light guide member 3009. Accordingly, the amount of light emitted from the end of the first light guide member 3009 at the rear side can be ensured.

On the other hand, light emitted from the light source 3010 is incident on the second light guide member 3011 from the incidence portion 3011a, and reflected forward by the reflection surface 3011b. The light reflected by the reflection surface 3011b reaches the top surface, and when the incidence angle is equal to or larger than the predetermined value, this light is totally reflected and advances toward the first light guide member 3009, that is, toward the front side of the second light guide member 3011. The light having the incidence angle smaller than the predetermined value, out of the light reaching the top surface, is absorbed or reflected by the light-shielding portion 3011c and again incident on the second light guide member 3011.

When reaching the lower surface, the light reflected by the reflection surface 3011b is totally reflected and advances toward the first light guide member 3009, i.e., toward the front side of the second light guide member 3011, if the incidence angle is equal to or larger than the predetermined value. The light having the incidence angle smaller than the predetermined value, out of the light reaching the lower surface, is reflected by the forward peripheral wall 3006d and again incident on the first light guide member 3009. Accordingly, the light emitted from the light source 3010 is guided by the second light guide member 3011 to be incident on the rear end of the first light guide member 3009.

The light incident on the rear end of the first light guide member 3009 advances forward while being totally reflected on the top surface or the lower surface, and is emitted toward the forward bezel portion 3071 from the top surface of the first light guide member 3009, as in the external light.

According to the present embodiment described above, light from the light source 3010 is guided to the first light guide member 3009 disposed below the descending wall 3072 of the bezel member 3007 by the second light guide member 3011. The guided light can be emitted to the descending wall 3072 by the first light guide member 3009. Further, the light source 3010 can be mounted on the substrate 3003 on which the display device 3002 is mounted, and this can eliminate the need to separately provide the substrate 3003 for the display device 3002 and the substrate 3003 for the light source 3010. Therefore, this configuration makes the reflection of the descending wall 3072 onto the windshield 3000F less visible and effectively reduces a sense of discomfort provided to the passenger with low cost.

According to the embodiment of the present invention, the unillustrated controller mounted on the substrate 3003 controls the brightness of the light source 3010 on the basis of the detection result of the illumination sensor 3012. According to this, the brightness of the light source 3010 can be controlled according to the brightness outside, and this can make the reflection onto the windshield 3000F much less visible and effectively reduce a sense of discomfort provided to the passenger.

In addition, according to the embodiment described above, the end 3071a of the forward bezel portion 3071 at the front side is located above the instrument panel 3000I to form the gap 3000S with the instrument panel 3000I, and the first light guide member 3009 is disposed below the forward bezel portion 3071, whereby external light emitted to the inside of the vehicle from the front side through the windshield 3000F is introduced from the end face 3009a of the first light guide member 3009 at the front side, and this external light can be emitted to the descending wall 3072 by the first light guide member 3009. Thus, reflection can be made mush less visible in combination of light from the light source 3010.

In the above embodiment, the gap 3000S is formed between the end 3071a of the forward bezel portion 3071 at the front side and the instrument panel 3000I to allow the external light to be incident on the first light guide member 3009. However, the embodiment is not limited thereto. The gap 3000S may not be formed to prevent the external light from being incident on the first light guide member 3009.

In addition, although the first light guide member 3009 and the second light guide member 3011 are separately provided in the above embodiment, the configuration is not limited thereto. It is considered that the first light guide member 3009 and the second light guide member 3011 are integrally provided. In this case, the forward portion disposed below the forward bezel portion 3071 is specified as the first light guide member 3009, and the rearward portion on which the forward bezel portion 3071 is not provided is specified as the second light guide member 3011.

In addition, although the case portion 3006e is formed integral with the housing 3006, the configuration is not limited thereto. For example, the case portion 3006e may be provided separately from the housing 3006 and fixed on the housing 3006.

In addition, in the above embodiment, the bezel member 3007 has an annular shape in a plan view, and has the forward bezel portion 3071. However, it is not limited thereto. For example, the bezel member 3007 may be composed of only the forward bezel portion 3071 to constitute only the perimeter of the opening 3007a at the front side of the vehicle 3000V, and the remaining perimeter of the opening 3007a may be constituted by the instrument panel 3000I.

Further, in the above embodiment, the bezel member 3007 is entirely formed from a translucent synthetic resin. However, it is not limited thereto. It is only necessary that at least the descending wall 3072 is translucent.

In addition, in the above embodiment, the brightness of the light source 3010 is controlled according to the detection result of the illumination sensor 3012. However, the configuration is not limited thereto. For example, when a light switch is not turned on, it may be determined that it is bright at daytime, and the brightness of the light source 3010 may be increased. When the light switch is turned on, it may be determined that it is dark at night, and the light source 3010 may be turned off or the brightness of the light source 3010 may be decreased.

In addition, the above embodiment illustrates only the representative form of the present invention, and the present invention is not limited to the embodiment. Specifically, the present invention can be embodied by being modified in various ways without departing from the spirit of the present invention.

Fourth Invention

Figure 35:
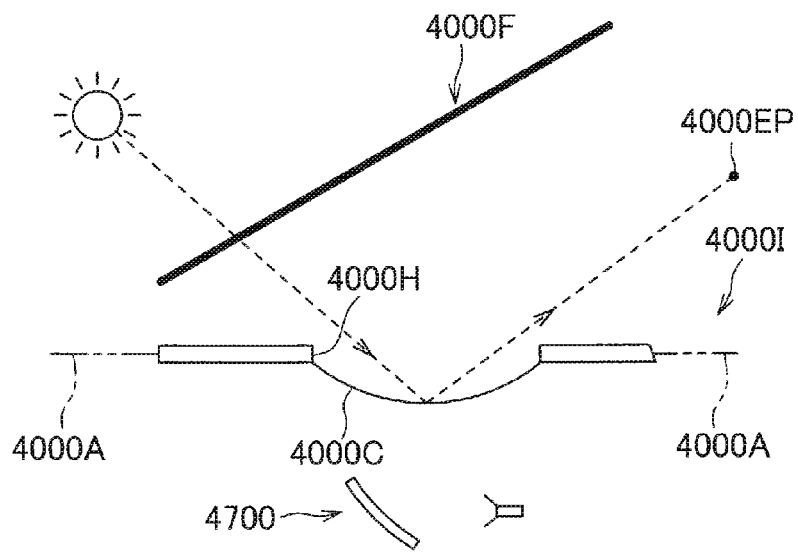
FIG. 35 is a sectional view illustrating a vehicular display device according to a conventional art concerning the fourth invention.

The fourth invention will be described below. Conventionally, a vehicular display device serving as ahead-up display device for projecting an image onto a windshield of a vehicle has been mounted in an instrument panel (see JP 2008-87733 A, for example). As illustrated in FIG. 35, a vehicular display device 4700 described in this patent literature is mounted in an instrument panel 4000I which has an opening 4000H formed on an opposed wall 4000A facing a windshield 4000F so as to project an image onto the windshield 4000F through the opening 4000H. The vehicular display device 4700 described above may have a transparent cover 4000C that closes the opening 4000H in order to prevent intrusion of dust or water into the opening 4000H. However, external light such as the sunlight is reflected on the cover 4000C to be directed to an eyepoint 4000EP of a passenger, which may provide a sense of discomfort.

Figure 36:
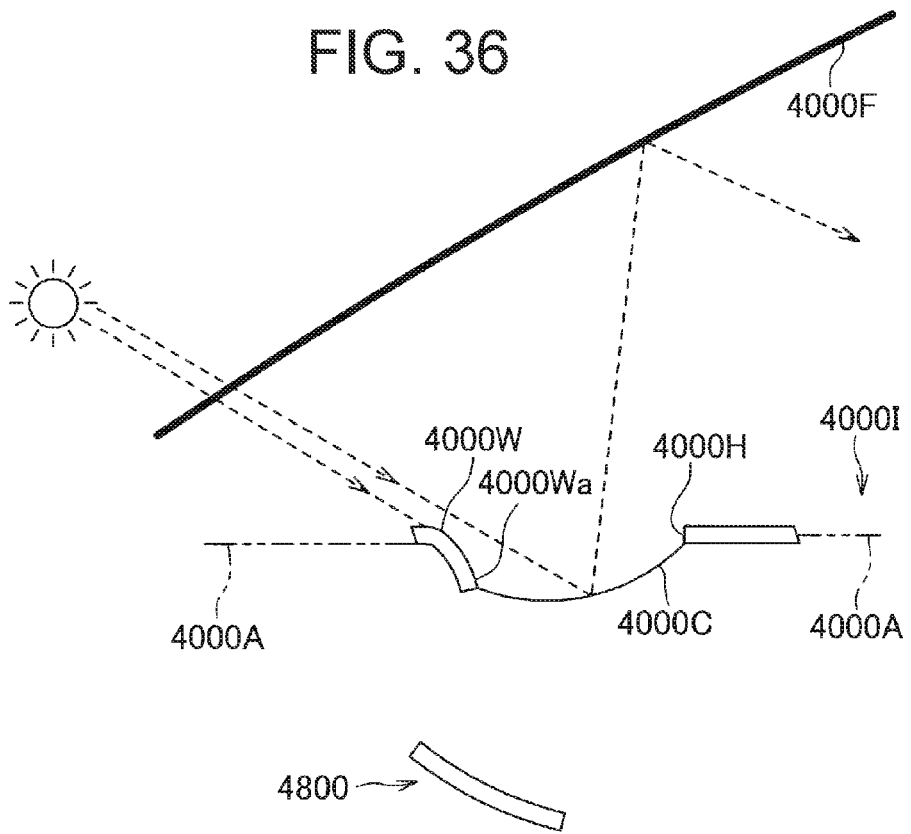
FIG. 36 is a sectional view illustrating a vehicular display device according to another conventional art concerning the fourth invention.

In view of this, a vehicular display device 4800 illustrated in FIG. 36 is considered as the configuration for preventing external light from being directed to the eyepoint 4000EP. The vehicular display device 4800 is mounted in an instrument panel 4000I. The instrument panel 4000I has an opening 4000H formed on an opposed wall 4000A facing a windshield 4000F, and a forward bezel portion 4000W formed at the front of the opening 4000H is provided with a translucent descending wall 4000Wa that gradually descends from the front side to the rear side of the vehicle (from left to right in FIG. 36). A cover 4000C that gradually ascends from the front side to the rear side of the vehicle is provided on the opening 4000H, and the vehicular display device 4800 projects an image on the windshield 4000F through the opening 4000H. The configuration in which the descending wall 4000Wa is provided and the portion of the cover 4000C at the front side of the vehicle is lower than the portion thereof at the rear side makes it difficult to allow external light to reach the cover 4000C, and prevents external light reflected on the cover 4000C from being directed to the eyepoint 4000EP of the passenger.

In the above configuration, external light is not impinged on the vicinity of the descending wall 4000Wa of the forward bezel portion 4000W, so that the contrast is increased between the descending wall 4000Wa and its peripheral portion. Thus, the problem in which reflection on the windshield 4000F becomes visible may arise. In view of this, it is considered that the descending wall 4000Wa is formed from a translucent material, and the end of the forward bezel portion 4000W at the front side is disposed above the opposed wall 4000A to introduce external light from the gap between the end of the forward bezel portion 4000W at the front side and the opposed wall 4000A so as to illuminate the descending wall 4000Wa from the inner surface. This configuration makes the reflection less visible because light passing through the descending wall 4000Wa is directed to the windshield 4000F, thereby being capable of reducing a sense of discomfort provided to the passenger.

However, according to the configuration described above, the descending wall 4000Wa may be illuminated with light from an oncoming vehicle or light on the street at night, and this may make the reflection of the descending wall 4000Wa on the windshield visible.

The object of the present invention is to provide a bezel body and a vehicular display device that effectively reduces a sense of discomfort provided to a passenger by making reflection on a windshield less visible.

In order to solve the above problem and achieve the object, the invention {9} of the present invention is a bezel body including a bezel member that is fitted to an instrument panel of a vehicle to constitute a part of or all of the perimeter of an opening through which an image is projected onto a windshield by an image projector provided in the instrument panel, the bezel member including a forward bezel portion disposed at the front side of the vehicle with respect to the opening, wherein the forward bezel portion is disposed such that an end at the front side of the vehicle is disposed above the instrument panel to form a gap with the instrument panel, and the forward bezel portion includes a translucent descending wall that gradually descends from the front side to the rear side of the vehicle to reach the opening to illuminate the descending wall with light incident from the gap, the bezel member comprising a light control unit that controls an amount of light incident from the gap.

The invention {10} is the bezel body described in the invention {9}, wherein the light control unit controls an amount of light according to the detection result of an illumination sensor that detects an illumination intensity outside or an on/off state of a light switch.

The invention {11} is a vehicular display device comprising: an image projector that is disposed in an instrument panel of a vehicle; and a bezel body including a bezel member that is fitted to the instrument panel to constitute a part of or all of the perimeter of an opening through which an image is projected onto a windshield by the image projector, wherein the bezel body is composed of the bezel body described in the invention {9} or the invention {10}.

As described above, according to the invention {9} or {11}, the end of the forward bezel portion at the front side is disposed above the instrument panel so as to form the gap with the instrument panel, whereby the descending wall can be illuminated with external light incident from the gap. Further, according to the light control unit, the amount of light (external light) incident from the gap is increased at daytime when it is bright outside and light incidence from the gap is prevented at night when it is dark outside. This configuration can prevent the descending wall from being illuminated with light from an oncoming vehicle or light on the street. Accordingly, this configuration makes the reflection of the descending wall onto the windshield less visible and effectively reduces a sense of discomfort provided to the passenger.

According to the invention {10}, the light control unit controls an amount of light according to the detection result of the illumination sensor or the on/off state of the light switch, whereby the amount of light incident from the gap can be controlled according to brightness outside.

Figure 30:
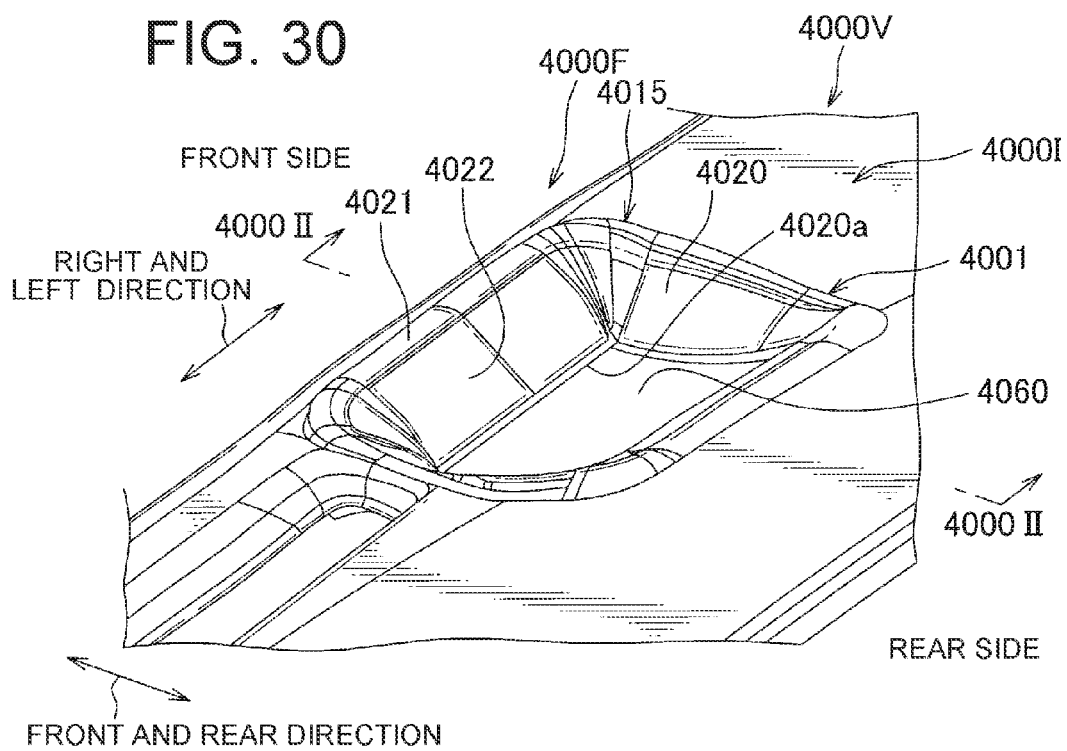
FIG. 30 is a perspective view illustrating that a vehicular display device according to one embodiment of the fourth invention is assembled to an instrument panel.
Figure 31:
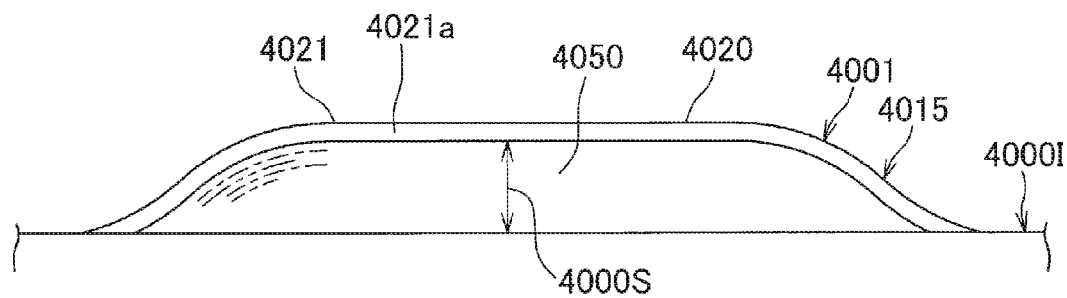
FIG. 31 is a view of the vehicular display device illustrated in FIG. 30 viewed from the front of the vehicle.
Figure 32:
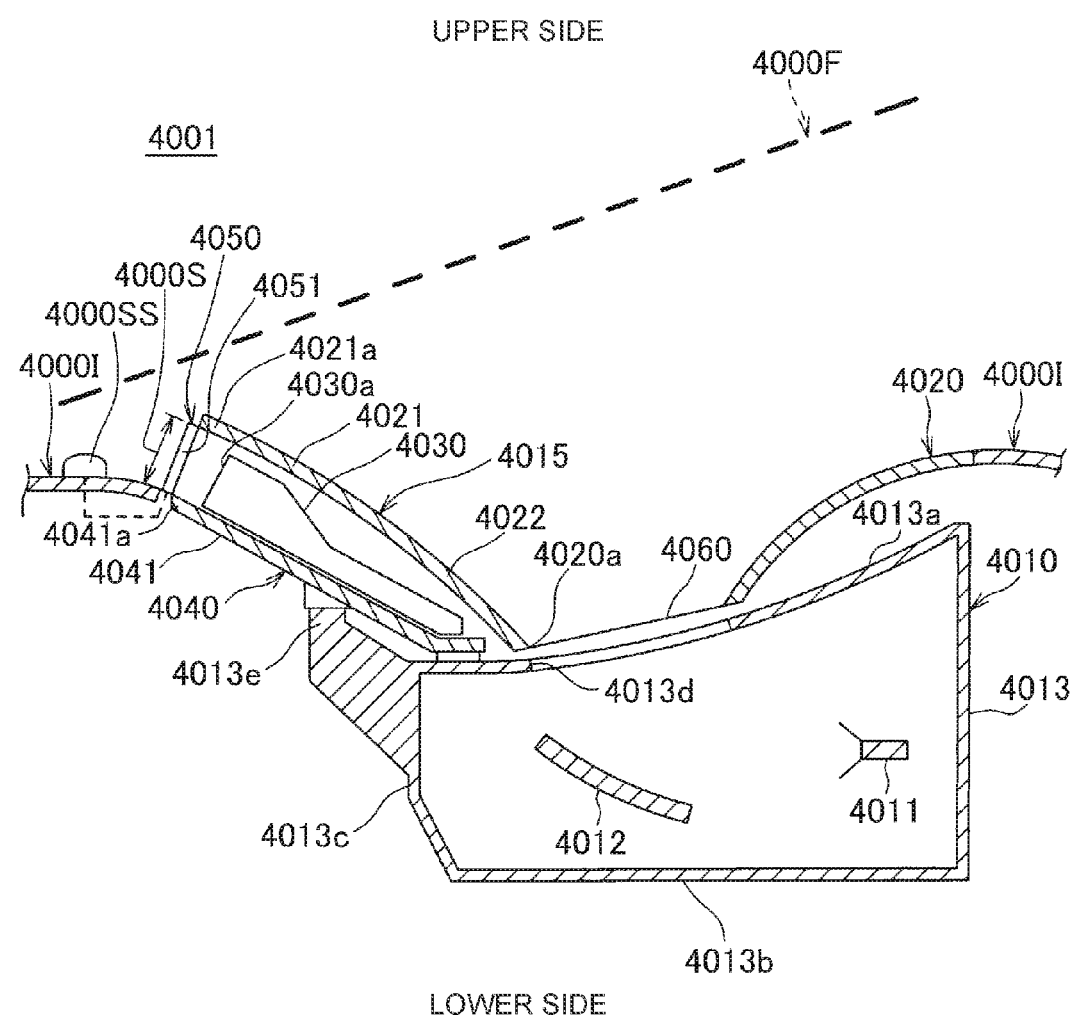
FIG. 32 is a sectional view along a line 4000II-4000II of the vehicular display device illustrated in FIG. 30.
Figure 33:
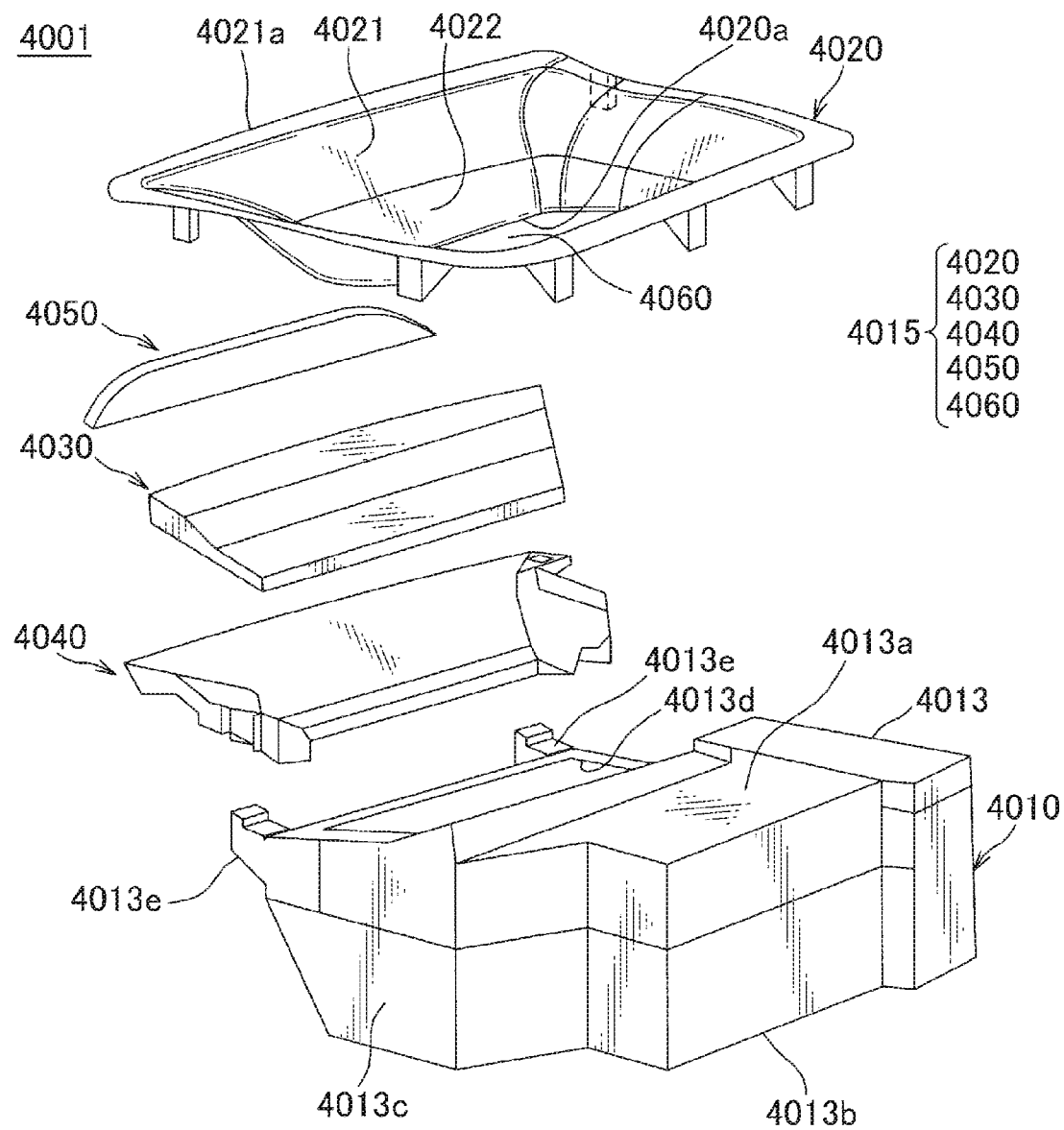
FIG. 33 is an exploded perspective view of the vehicular display device illustrated in FIG. 30.
Figure 34A:
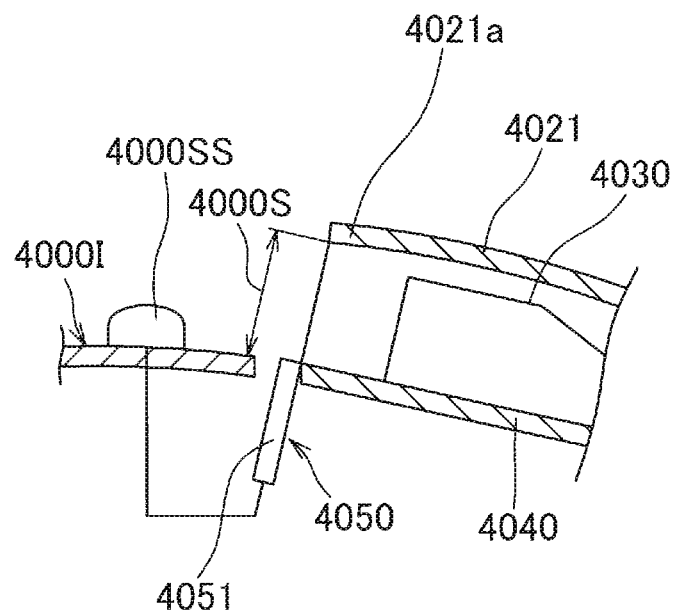
FIG. 34A is an enlarged partial sectional view illustrating the vehicular display device illustrated in FIG. 32 in the state in which a shutter is opened.
Figure 34B:
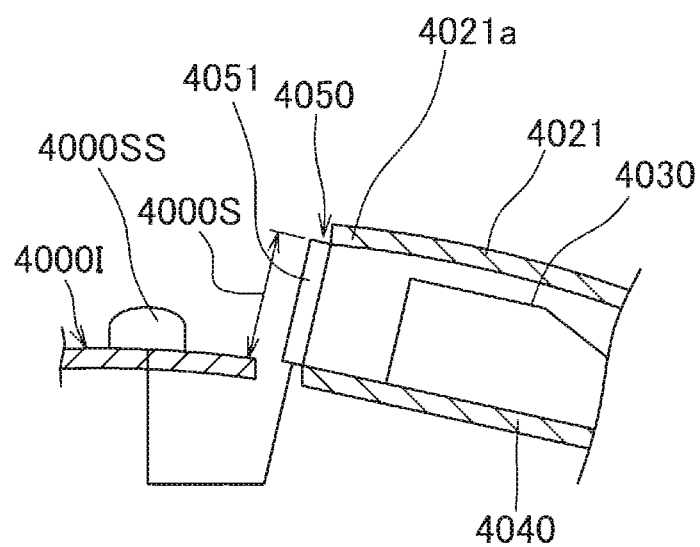
FIG. 34B is an enlarged partial sectional view illustrating the vehicular display device illustrated in FIG. 32 in the state in which a shutter is closed.

A bezel body and a vehicular display device according to one embodiment of the present invention will be described with reference to FIGS. 30 to 34B. FIG. 30 is a perspective view illustrating that a vehicular display device according to one embodiment of the present invention is assembled to an instrument panel. FIG. 31 is a view of the vehicular display device illustrated in FIG. 30 viewed from the front of the vehicle. FIG. 32 is a sectional view along a line 4000II-4000II of the vehicular display device illustrated in FIG. 30. FIG. 33 is an exploded perspective view of the vehicular display device illustrated in FIG. 30. FIG. 34A is an enlarged partial sectional view illustrating the vehicular display device illustrated in FIG. 32 in the state in which a shutter is opened, and FIG. 34B is an enlarged partial sectional view illustrating the vehicular display device illustrated in FIG. 32 in the state in which a shutter is closed. As illustrated in FIGS. 30 to 34B, a vehicular display device 4001 according to the present embodiment is used as a head-up display device that is mounted to an instrument panel 4000I of a vehicle 4000V for projecting an image onto a windshield 4000F. Note that a front and rear direction, a right and left direction, a front side and a rear side in the front and rear direction, an upper side, and a lower side of the vehicle 4000V according to the present embodiment are as illustrated in FIGS. 30 and 32.

As illustrated in FIGS. 32 and 33, the vehicular display device 4001 includes an image projector 4010 provided in the instrument panel 4000I of the vehicle 4000V and a bezel body 4015 provided to the instrument panel 4000I.

As illustrated in FIG. 32, the image projector 4010 includes a display source 4011 for projecting an image, a reflection portion 4012 for reflecting an image from the display source 4011, and a housing 4013 that is formed from a synthetic resin for storing the display source 4011 and the reflection portion 4012. The housing 4013 includes a top wall 4013a, a bottom wall 4013b facing the top wall 4013a, and a peripheral wall 4013c continuously formed on the perimeter of the top wall 4013a and the bottom wall 4013b. An opening 4013d that is disposed to be overlapped with an opening 4020a on a later-described bezel member 4020 is formed on the top wall 4013a. The image projector 4010 reflects an image projected by the display source 4011 on the reflection portion 4012, and projects the image onto the windshield 4000F through the opening 4013d. Thus, a passenger in the vehicle 4000V can visually recognize the image displayed on the windshield 4000F.

As illustrated in FIGS. 32 and 33, the bezel body 4015 includes a bezel member 4020, a light guide member 4030, a support member 4040 serving as a case member, a shutter mechanism 4050 serving as a light control unit, an illumination sensor 4000SS, and a cover 4060.

The bezel member 4020 is formed from a semi-translucent (transparent) synthetic resin and has an annular shape with the opening 4020a formed at the center in a plan view. The bezel member 4020 gradually descends from the outer peripheral edge toward the inner peripheral edge, and is curved such that the tilt is increased toward the inner peripheral edge. The bezel member 4020 is fitted to a hole formed on the instrument panel 4000I to constitute the entire perimeter of the opening 4020a from which an image is projected onto the windshield 4000F by the image projector 4010 disposed in the instrument panel 4000I.

A forward bezel portion 4021 of the bezel member 4020 located at the front side of the vehicle 4000V with respect to the opening 4020a is disposed such that an end 4021a at the front side of the vehicle 4000V is located above the instrument panel 4000I to form a gap 4000S with the instrument panel 4000I. In addition, the forward bezel portion 4021 has a descending wall 4022 that gradually descends from the front side toward the rear side of the vehicle 4000V to reach the opening 4020a and is curved such that the tilt is increased toward the opening 4020a.

When being fitted to the instrument panel 4000I, the bezel member 4020 is disposed such that a part of the outer peripheral edge of the bezel member 4020 at the front side (i.e., the end 4021a of the forward bezel portion 4021 at the front side of the vehicle 4000V) is located above the instrument panel 4000I (FIG. 31), and the other part of the outer peripheral edge other than the part is disposed to be smoothly contiguous to the instrument panel 4000I (FIG. 30). Further, in this case, the opening 4020a of the bezel member 4020 and the opening 4013d of the image projector 4010 are disposed to be overlapped with each other in the vertical direction. In addition, a tint control or a surface treatment to make the bezel member 4020 look alike the instrument panel 4000I is performed to the bezel member 4020 in order to make the difference in reflection onto the windshield 4000F between the bezel member 4020 and the instrument panel 4000I less visible.

The light guide member 4030 is formed from a material having high transparency, such as a glass or a synthetic resin including acryl and polycarbonate, and is formed into a shape of a substantially rectangular plate in a plan view. The light guide member 4030 is disposed below the forward bezel portion 4021, guides light incident from the above-mentioned gap 4000S, and emits the light toward the forward bezel portion 4021 (i.e., the descending wall 4022), whereby the forward bezel portion 4021 is illuminated. The light guide member 4030 is formed such that the front portion is thick and the rear portion is thin, and the portion between the thick portion and the thin portion is formed to be gradually thinner from the front portion toward the rear portion as illustrated in the cross-sectional view (FIG. 32) in the front and rear direction. Specifically, the surface of the light guide member 4030 facing downward is flat, and the surface facing upward has a tilt surface that gradually descends from the front portion toward the rear portion at the middle in the front and rear direction.

The support member 4040 is disposed below the light guide member 4030 to support the light guide member 4030. The support member 4040 is disposed such that the end at the front side is on substantially the same level as the top surface of the instrument panel 4000I, and an end face 4030a of the light guide member 4030 at the front side is disposed to face the gap 4000S. According to this, external light emitted from the front side through the windshield 4000F can be introduced from the end face 4030a of the light guide member 4030 at the front side through the gap 4000S. The support member 4040 is fixed to a pair of legs 4013e projecting forward from the peripheral wall 4013c of the housing 4013.

The shutter mechanism 4050 includes a mechanical shutter 4051 disposed anterior to the end 4021a of the forward bezel portion 4021 at the front side, a drive unit which is not illustrated and drives the shutter 4051, and a controller which is not illustrated and controls the drive unit.

The shutter 4051 is composed of a light-shielding material. The shutter 4051 is provided to be movable between an open position (FIG. 34A) where the shutter 4051 is located below the gap 4000S for allowing incidence of light from the gap 4000S and a close position (FIG. 34B) where the shutter 4051 closes the gap 4000S to shield light incident from the gap 4000S. The amount of light incident from the gap 4000S can be controlled by adjusting the position of the shutter 4051.

The illumination sensor 4000SS detects brightness outside, and is installed on the instrument panel 4000I at the front side of the vehicle 4000V. The detection result of the illumination sensor 4000SS is input to the controller in the shutter mechanism 4050. The controller controls the drive unit on the basis of the detection result from the illumination sensor 4000SS to adjust the open/close position of the shutter 4051.

The cover 4060 is formed into a thin plate using a material having high transparency, such as a glass or a synthetic resin including acryl and polycarbonate, and mounted to be fixed to the perimeter of the opening 4020a of the bezel member 4020 to close the opening 4020a. The cover 4060 is disposed to extend upward from the front side toward the rear side of the vehicle 4000V (FIG. 32). This prevents light impinged on the cover 4060 from directly advancing to the eyepoint of the passenger.

Next, the operation of the vehicular display device 4001 thus configured will be described. When determining that it is at daytime and bright outside on the basis of the detection result from the illumination sensor 4000SS, the controller in the shutter mechanism 4050 drives the shutter 4051 to the open position as illustrated in FIG. 34A. Thus, external light can be introduced from the gap 4000S through the windshield 4000F. The external light entering from the gap 4000S through the windshield 4000F is incident on the end face 4030a of the light guide member 4030 at the front side. This light advances toward the rear side while being reflected on the top surface or the lower surface of the light guide member 4030. A part of the external light reaching the top surface is emitted toward the forward bezel portion 4021, whereby the forward bezel portion 4021 is illuminated.

On the other hand, when determining that it is at night and dark outside on the basis of the detection result from the illumination sensor 4000SS, the controller in the shutter mechanism 4050 drives the shutter 4051 to the close position as illustrated in FIG. 34B. Thus, the light incident from the gap 4000S is shielded by the shutter 4051, and according to this, the forward bezel portion 4021 is not illuminated with light from an oncoming vehicle or light on the street, for example.

According to the above embodiment, the end 4021a of the forward bezel portion 4021 at the front side is disposed above the instrument panel 4000I so as to form the gap 4000S with the instrument panel 4000I, whereby the descending wall 4022 can be illuminated with external light incident from the gap 4000S. Further, according to the shutter mechanism 4050, the amount of light (external light) incident from the gap 4000S is increased at daytime when it is bright outside and light incidence from the gap 4000S is prevented at night when it is dark outside, and this configuration can prevent the descending wall 4022 from being illuminated with light from an oncoming vehicle or light on the street. Accordingly, this configuration makes the reflection of the descending wall 4022 onto the windshield 4000F less visible and effectively reduces a sense of discomfort provided to the passenger.

In addition, according to the above embodiment, the shutter mechanism 4050 controls an amount of light according to the detection result of the illumination sensor 4000SS, whereby the amount of light incident from the gap 4000S can be controlled according to brightness outside.

In the above embodiment, the forward bezel portion 4021 is efficiently illuminated with external light incident from the gap 4000S by using the light guide member 4030. However, the configuration is not limited thereto. The light guide member 4030 is not essential, and may be eliminated. In addition, in place of the light guide member 4030, a reflection plate that reflects light incident from the gap 4000S toward the forward bezel portion 4021 may be provided.

Further, although the above embodiment uses the shutter mechanism 4050 having the mechanical shutter 4051 as the light control unit, the configuration is not limited thereto. For example, liquid crystal for controlling an amount of passing light may be used in place of the shutter 4051. In this case, the control unit controls the liquid crystal such that light can be incident from the gap 4000S at daytime when it is bright outside and light incidence from the gap 4000S is prevented at night when it is dark outside.

In addition, photochromic may be used in place of the shutter mechanism 4050. The photochromic is a material that changes its color according to incident light. The photochromic used in the present embodiment becomes dark in color concentration, as the incident light is weak, so that light incident from the gap 4000S is shielded. On the other hand, the photochromic becomes light in color concentration and becomes transparent, as incident light is strong, so that a lot of light can be incident from the gap 4000S.

In addition, according to the above embodiment, the unillustrated controller in the shutter mechanism 4050 controls the shutter 4051 to the open position or the close position. However, the configuration is not limited thereto. For example, it may be controlled such that, the higher the illumination detected by the illumination sensor 4000SS is, the more the opening degree of the shutter 4051 is increased, and the lower the illumination is, the more the opening degree of the shutter 4051 is decreased.

Further, according to the above embodiment, the unillustrated controller in the shutter mechanism 4050 controls the open/close of the shutter 4051 on the basis of the detection result of the illumination sensor 4000SS. However, the configuration is not limited thereto. It is considered that the shutter 4051 is opened or closed on the basis of an on/off state of a light switch that turns on or off a headlight of the vehicle, in place of the illumination sensor 4000SS. In this case, if the light switch is turned off, the controller determines that it is at daytime and bright outside, and controls the shutter 4051 to the open position as illustrated in FIG. 34A. On the other hand, if the light switch is turned on, the controller determines that it is at night and dark outside, and controls the shutter 4051 to the close position as illustrated in FIG. 34B.

In addition, in the above embodiment, the bezel member 4020 has an annular shape in a plan view, and has the forward bezel portion 4021. However, it is not limited thereto. For example, the bezel member 4020 may be composed of only the forward bezel portion 4021 to constitute only the perimeter of the opening 4020a at the front side of the vehicle 4000V, and the remaining perimeter of the opening 4020a may be constituted by the instrument panel 4000I.

Further, in the above embodiment, the bezel member 4020 is entirely formed from a translucent synthetic resin. However, it is not limited thereto. It is only necessary that at least the descending wall 4022 is translucent.

In addition, the above embodiment illustrates only the representative form of the present invention, and the present invention is not limited to the embodiment. Specifically, the present invention can be embodied by being modified in various ways without departing from the spirit of the present invention.

Fifth Invention

Figure 44:
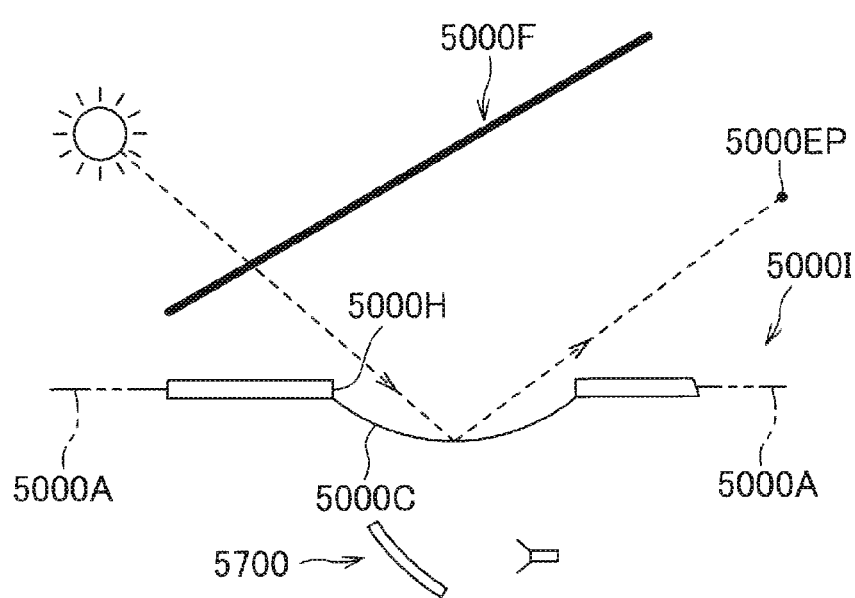
FIG. 44 is a sectional view schematically illustrating a conventional vehicular display device concerning the fifth invention.

The fifth invention will be described below. Conventionally, a vehicular display device serving as ahead-up display device for projecting an image onto a windshield of a vehicle has been mounted in an instrument panel (see JP 2007-148092 A, for example). As illustrated in FIG. 44, a vehicular display device 5700 described in this patent literature is mounted in an instrument panel 5000I which has an opening 5000H formed on an opposed wall 5000A facing a windshield 5000F so as to project an image onto the windshield 5000F through the opening 5000H. The vehicular display device 5700 described above may have a transparent cover 5000C that closes the opening 5000H in order to prevent intrusion of dust or water into the opening 5000H. However, external light such as the sunlight is reflected on the cover 5000C to be directly directed to an eyepoint 5000EP of a passenger, which may provide a sense of discomfort.

Figure 45:
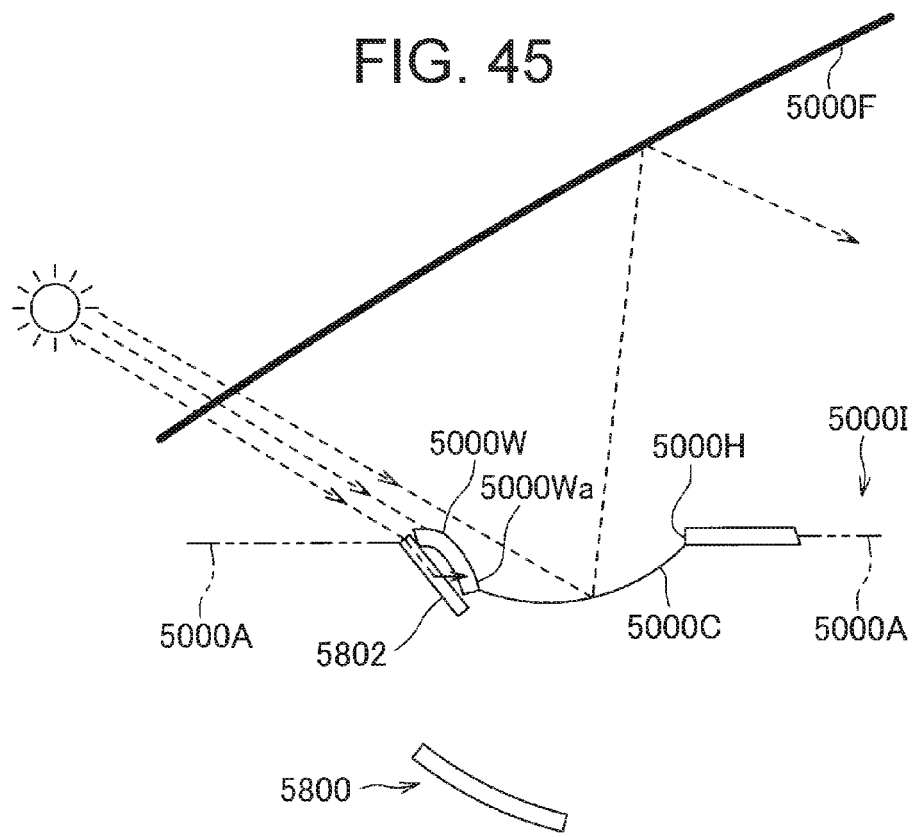
FIG. 45 is a sectional view schematically illustrating another conventional vehicular display device concerning the fifth invention.

In view of this, a vehicular display device 5800 illustrated in FIG. 45 is considered as the configuration for preventing external light from being directed to the eyepoint 5000EP. The vehicular display device 5800 is mounted in an instrument panel 5000I. The instrument panel 5000I has, on an opposed wall 5000A facing a windshield 5000F, a descending wall 5000W that gradually descends from the front side to the rear side of the vehicle (from left to right in FIG. 45) and an opening 5000H adjacent to the lower end of the descending wall 5000W. A cover 5000C that gradually ascends from the front side to the rear side of the vehicle is provided on the opening 5000H, and the vehicular display device 5800 projects an image on the windshield 5000F through the opening 5000H. The configuration in which the descending wall 5000W is provided and the portion of the cover 5000C at the front side of the vehicle is lower than the portion thereof at the rear side makes it difficult to allow external light to reach the cover 5000C, and prevents external light reflected on the cover 5000C from being directly directed to the eyepoint 5000EP of the passenger.

In the above configuration, external light is not impinged on a portion 5000Wa of the descending wall 5000W which is in the vicinity of the opening 5000H on the instrument panel 5000I, so that the portion 5000Wa becomes dark and the contrast with the cover 5000C is increased. Thus, the reflection on the windshield 5000F may become visible. In view of this, it is considered that the descending wall 5000W is formed from a translucent material, and a plate-like light guide member 5802 is disposed to face the inner surface of the descending wall 5000W to guide external light to the portion 5000Wa of the descending wall 5000W in the vicinity of the opening 5000H by the light guide member 5802 so as to illuminate the descending wall 5000W from the inner surface. According to this configuration, the descending wall 5000W is illuminated to reduce the contrast, whereby the reflection on the windshield 5000F is made less visible, and thus, a sense of discomfort provided to the passenger can be reduced.

Figure 46:
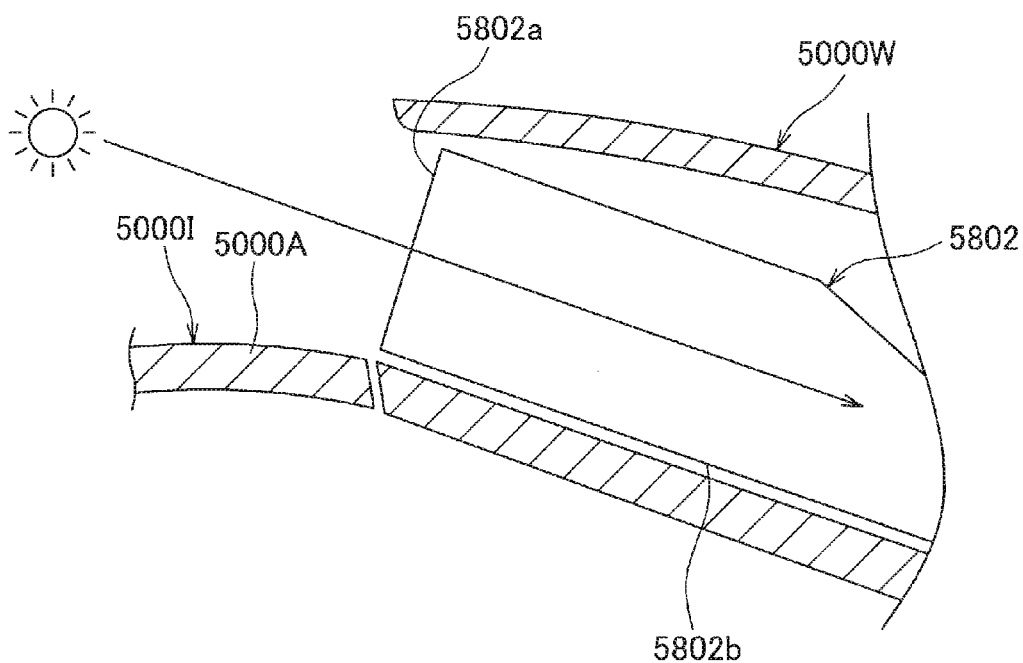
FIG. 46 is an enlarged sectional view for describing the progress of light in the light guide member of the vehicular display device illustrated in FIG. 45.

However, in the vehicular display device 5800, an end face (light incidence surface 5802a) of the light guide member 5802 at the front side of the vehicle is exposed from the instrument panel 5000I in order to allow external light to be incident on the light guide member 5802 as illustrated in FIG. 46. Therefore, the light guide function may be deteriorated due to the deposition of dust on the light guide member 5802, resulting in that the amount of light guided to the descending wall 5000W by the light guide member 5802 may be reduced. In view of this, it is considered that the light guide member 5802 is moved to the inner side (to the rear side of the vehicle) in order that the end face is not exposed from the instrument panel 5000I, and the exposure hole of the instrument panel 5000I is closed by a dust prevention window. However, due to the movement of the light guide member 5802 to the inner side, light is difficult to reach the light incidence surface 5802a of the light guide member 5802, resulting in that the amount of incident light may be reduced. If the amount of light incident on the light guide member 5802 is reduced, the amount of light guided to the descending wall 5000W is reduced, resulting in that it is impossible to make the descending wall 5000W bright to reduce the contrast, and thus, the reflection on the windshield 5000F may not be sufficiently made less visible.

In view of this, the present invention focuses on the problem described above, and aims to provide a bezel body that effectively makes reflection on a windshield less visible, and a vehicular display device provided with the bezel body.

In order to solve the above object, the invention {12} of the present invention is a bezel body including a bezel member that is fitted to an opposed wall, which faces a windshield, of an instrument panel of a vehicle to constitute a part of or all of the perimeter of an opening through which an image is projected onto the windshield by an image projector provided in the instrument panel, wherein the bezel member has a forward bezel portion disposed at the front side of the vehicle with respect to the opening, the forward bezel portion is disposed such that an end at the front side of the vehicle is located above the opposed wall to form a gap with the opposed wall, the forward bezel portion including a translucent descending wall that gradually descends from the front side to the rear side of the vehicle to reach the opening, the bezel body comprising: a light guide member that is formed into a plate-like shape, disposed to be along an inner surface of the forward bezel portion, and guides light entering an end face at the front side of the vehicle toward the descending wall; a case member that is disposed with a space from the inner surface of the forward bezel portion so as to form a storage space for the light guide member between the forward bezel portion and the case member, the storage space being open at the gap; and a lighting window member that is provided between the forward bezel portion and the case member so as to close the opening of the storage space and to introduce light from the gap into the storage space, the light guide member being stored in the storage space with the end face at the front side of the vehicle facing the lighting window member, the lighting window member being formed into a lens shape to change the advancing direction of light introduced from the gap toward the end face of the light guide member.

The invention {13} is characterized in that, in the invention {12}, the lighting window member converges light introduced from the gap in the thickness direction of the light guide member.

The invention {14} is characterized in that, in the invention {12}, the lighting window member diverges light introduced from the gap in the thickness direction of the light guide member.

The invention {15} is characterized in that, in the invention {14}, the end face of the light guide member is formed into a lens shape in order that light passing through the lighting window member advances in the light guide member in the direction parallel to the direction from the end face of the light guide member at the front side of the vehicle toward the end thereof at the rear side.

In order to achieve the object described above, the invention {16} is a vehicular display device comprising: an image projector that is disposed in an instrument panel of a vehicle; and a bezel body including a bezel member that is fitted to an opposed wall, which faces a windshield, of the instrument panel to constitute a part of or all of the perimeter of an opening through which an image is projected onto the windshield by the image projector, wherein the bezel body is composed of the bezel body described in any one of the inventions {12} to {15}.

According to the inventions {12} and {16}, the storage space that is open at the gap between the opposed wall of the instrument panel and the forward bezel portion of the bezel member for storing the light guide member is formed between the forward bezel portion and the case portion. The lighting window member is provided between the forward bezel portion and the case member to close the opening of the storage space and to introduce light from the gap into the storage space. The light guide member is stored in the storage space in the state in which the end at the front side of the vehicle faces the lighting window member, and the lighting window member is formed into a lens shape so as to change an optical path of light, which is introduced from the gap, to be directed to the end face of the light guide member, i.e., formed into a convex shape having a convergence function or a concave shape having a divergence function. Since the lighting window member is formed into the lens shape as described above, the optical path of light introduced from the gap is changed to be directed to the end face of the light guide member at the front side of the vehicle, and the light introduced from the gap is surely incident on the end face. Accordingly, an amount of light reaching the end of the light guide member at the rear side of the vehicle can be ensured. Accordingly, the reduction in the amount of light guided to the descending wall is suppressed, whereby the descending wall can be made bright to reduce the contrast, and thus, the reflection on the windshield can be effectively made less visible.

According to the invention {13}, the lighting window member converges light, which is introduced from the gap between the opposed wall of the instrument panel and the forward bezel portion of the bezel member, in the thickness direction of the light guide member, whereby the light can more surely be incident on the end face of the light guide member.

According to the invention {14}, the lighting window member diverges light, which is introduced from the gap between the opposed wall of the instrument panel and the forward bezel portion of the bezel member, in the thickness direction of the light guide member, whereby the light can be incident on the entire end face of the light guide member.

According to the invention {15}, the end face of the light guide member is formed into a lens shape in order that light passing through the lighting window member advances in the light guide member in the direction parallel to the direction from the end face of the light guide member at the front side of the vehicle toward the end thereof at the rear side. Therefore, light passing through the lighting window member advances in the light guide member from the end face at the front side of the vehicle toward the end at the rear side without being attenuated, whereby the amount of light reaching the end of the light guide member at the rear side of the vehicle can be ensured.

A bezel body and a vehicular display device according to one embodiment of the present invention will be described with reference to FIGS. 37 to 41.

Figure 37:
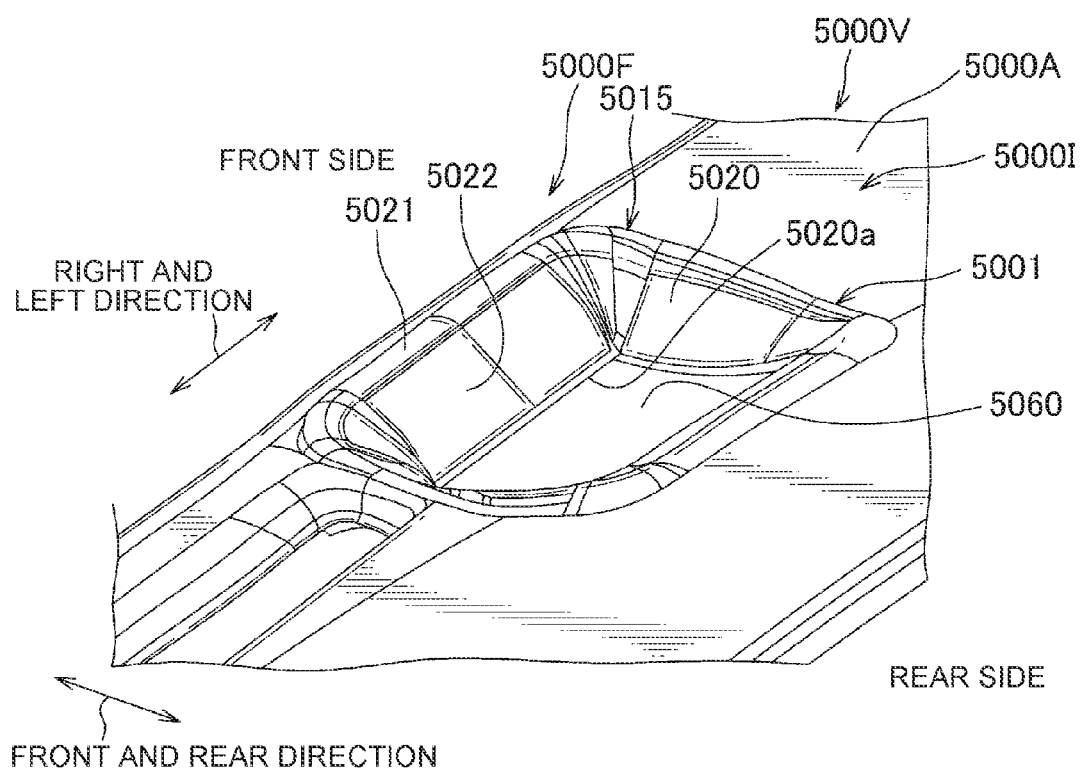
FIG. 37 is a perspective view illustrating that a vehicular display device according to one embodiment of the fifth invention is assembled to an instrument panel.
Figure 38:
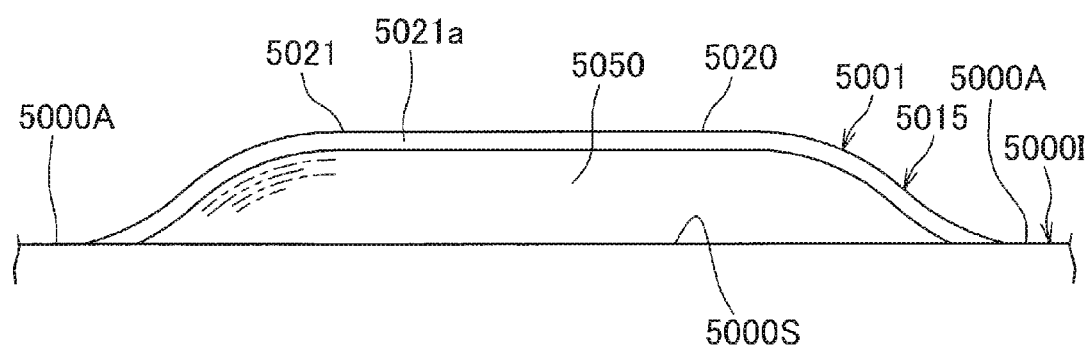
FIG. 38 is a view of the vehicular display device illustrated in FIG. 37 viewed from the front of the vehicle.
Figure 39:
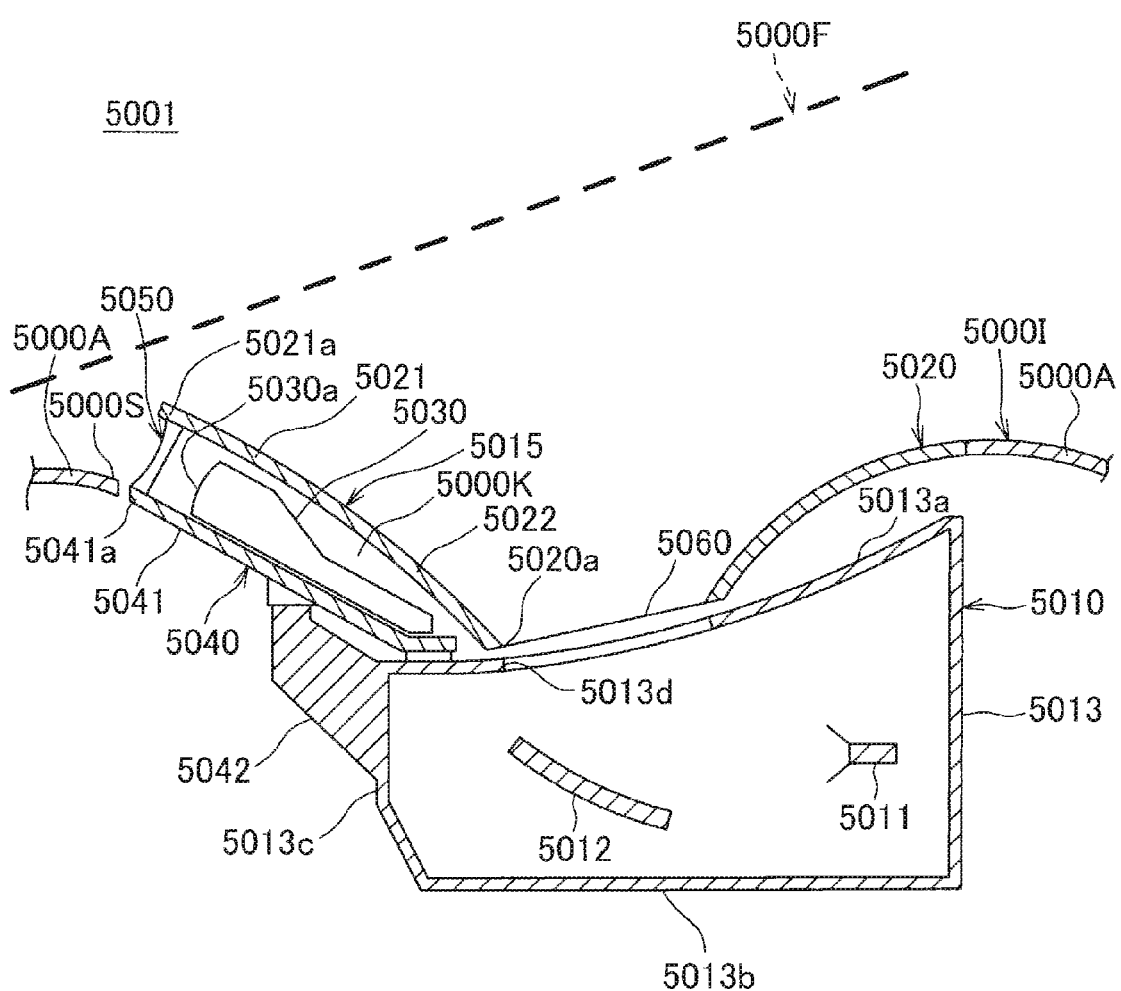
FIG. 39 is a sectional view of the vehicular display device illustrated in FIG. 37.
Figure 40:
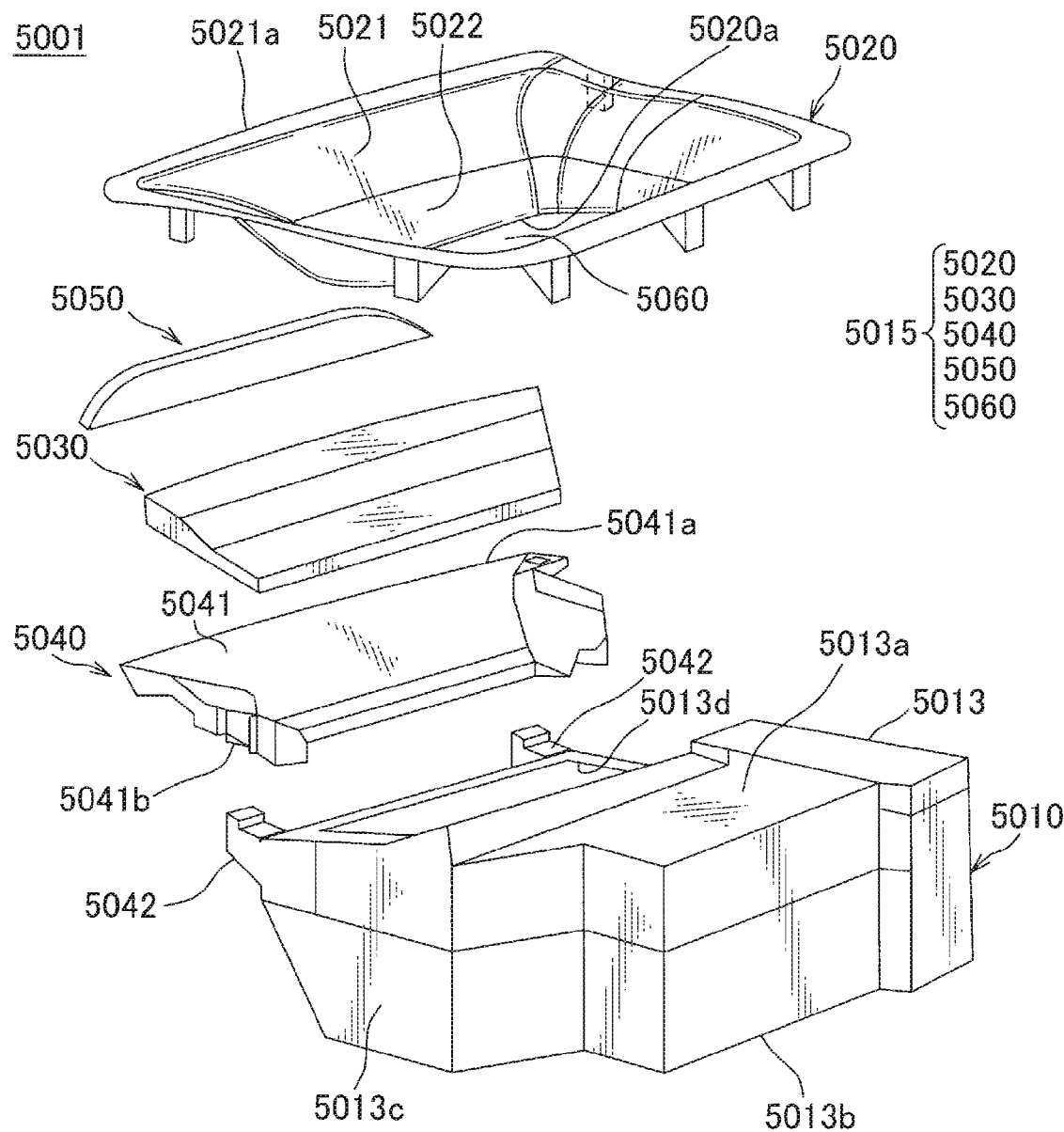
FIG. 40 is an exploded perspective view of the vehicular display device illustrated in FIG. 37.
Figure 41:
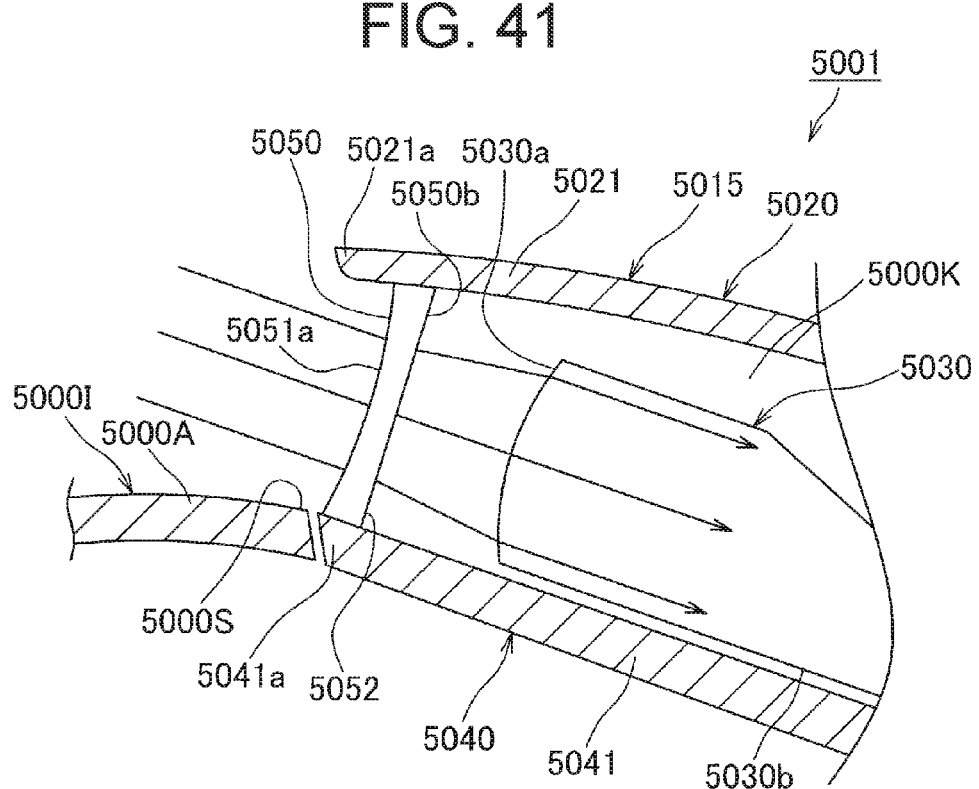
FIG. 41 is an enlarged sectional view for describing the progress of light in the vehicular display device illustrated in FIG. 37.

FIG. 37 is a perspective view illustrating that a vehicular display device according to one embodiment of the present invention is assembled to an instrument panel. FIG. 38 is a view of the vehicular display device illustrated in FIG. 37 viewed from the front of the vehicle. FIG. 39 is a sectional view of the vehicular display device illustrated in FIG. 37. FIG. 40 is an exploded perspective view of the vehicular display device illustrated in FIG. 37. FIG. 41 is an enlarged sectional view for describing the progress of light in the vehicular display device illustrated in FIG. 37. In the description below, "front, rear, top, bottom, left, and right" correspond to the front, rear, top, bottom, left, and right of a vehicle V.

As illustrated in FIGS. 37 and 38, a vehicular display device 5001 according to the present embodiment is used as a head-up display device that is mounted to an instrument panel 5000I of a vehicle 5000V for projecting an image onto a windshield 5000F.

As illustrated in FIGS. 39 and 40, the vehicular display device 5001 includes an image projector 5010 and a bezel body 5015.

The image projector 5010 includes a display source 5011 for projecting an image, a reflection portion 5012 for reflecting an image from the display source 5011, and a housing 5013 that is formed from a synthetic resin for storing the display source 5011 and the reflection portion 5012. The housing 5013 includes a top wall 5013a, a bottom wall 5013b facing the top wall 5013a, and a peripheral wall 5013c continuously formed on the perimeter of the top wall 5013a and the bottom wall 5013b. An opening 5013d that is disposed to be overlapped with an opening 5020a on a later-described bezel member 5020 is formed on the top wall 5013a. The image projector 5010 reflects an image projected by the display source 5011 on the reflection portion 5012, and projects the image onto the windshield 5000F through the opening 5013d. Thus, an occupant in the vehicle 5000V can visually recognize the image displayed on the windshield 5000F.

The bezel body 5015 includes a bezel member 5020, a light guide member 5030, a support member 5040 serving as a case member, a lighting window member 5050, and a cover 5060.

The bezel member 5020 is formed from a semi-translucent (transparent) synthetic resin, has an annular shape with an opening 5020a formed at the center in a plan view, and gradually descends from an outer peripheral edge to an inner peripheral edge. In other words, the bezel member 5020 has a shape formed by turning upside down substantially a hollow frustum of square pyramid having an open upper end face and an open lower end face. The bezel member 5020 is fitted into a hole formed on an opposed wall 5000A of the instrument panel 5000I facing the windshield 5000F. Specifically, the bezel member 5020 is fitted to the opposed wall 5000A to constitute the entire perimeter of the opening 5020a from which an image is projected onto the windshield 5000F by the image projector 5010 disposed in the instrument panel 5000I.

The bezel member 5020 has a forward bezel portion 5021 that is disposed at the front side of the vehicle 5000V when being fitted to the opposed wall 5000A. The forward bezel portion 5021 is disposed such that an end 5021a at the front side of the vehicle 5000V is lifted upward from the opposed wall 5000A (that is, disposed above the opposed wall 5000A) to form a gap 5000S between the forward bezel portion 5021 and the opposed wall 5000A. In addition, the forward bezel portion 5021 has a descending wall 5022 that gradually descends from the front side toward the rear side of the vehicle 5000V to reach the opening 5020a.

When being fitted to the opposed wall 5000A, the bezel member 5020 is disposed such that a part of the outer peripheral edge of the bezel member 5020 at the front side (i.e., the end 5021a of the forward bezel portion 5021 at the front side of the vehicle 5000V) is lifted upward from the opposed wall 5000A (FIG. 38), and the other part of the outer peripheral edge other than the part is disposed such that the outer surface (top surface) of the bezel member 5020 and the outer surface of the opposed wall 5000A are smoothly contiguous (FIG. 37). Further, in this case, the opening 5020a of the bezel member 5020 and the opening 5013d of the image projector 5010 are disposed to be overlapped with each other in the vertical direction. In addition, a tint control or a surface treatment to make the bezel member 5020 look alike the opposed wall 5000A is performed to the bezel member 5020 in order to make the difference in reflection onto the windshield 5000F between the bezel member 5020 and the opposed wall 5000A of the instrument panel 5000I less visible.

For example, the light guide member 5030 is formed from a material having high transparency, such as a glass or a synthetic resin including acryl and polycarbonate, formed into a shape of a substantially rectangular plate in a plan view (FIG. 40), and disposed to be overlapped with the inner surface of the forward bezel portion 5021 with a little space therefrom (that is, disposed along the inner surface of the forward bezel portion 5021). Further, the light guide member 5030 is formed such that the front portion is thick and the rear portion is thin, and the portion between the thick portion and the thin portion is formed to be gradually thinner from the front portion toward the rear portion as illustrated in the cross-sectional view (FIG. 39) in the front and rear direction. Specifically, the surface of the light guide member 5030 facing downward is flat, and the surface facing upward and facing the descending wall 5022 has a tilt surface that gradually descends from the front portion toward the rear portion at the middle in the front and rear direction.

The light guide member 5030 is formed to guide light entering a light incidence surface 5030*a* that is an end face at the front side of the vehicle 5000V to an end at the rear side, and emit this light from the surface facing the descending wall 5022. Specifically, the light incidence surface 5030*a* of the light guide member 5030 is formed into a convex shape at any position in the right and left direction in the sectional view (FIG. 39) in the front and rear direction in order to guide light in the light guiding direction from the end where the light incidence surface 5030*a* is formed at the front side toward the end at the rear side opposite to the end at the front side. Thus, light can be guided toward the translucent descending wall 5022, thereby being capable of illuminating the vicinity of the opening 5020*a* on the descending wall 5022.

The support member 5040 includes a placing portion 5041 and a pair of legs 5042, which are formed from a synthetic resin.

The placing portion 5041 is a portion on which the light guide member 5030 is placed, and has a planar shape formed into a substantially plate shape slightly larger than the planar shape of the light guide member 5030. The placing portion 5041 is disposed with a space from the inner surface of the forward bezel portion 5021, and disposed such that an end 5041*a* at the front side of the vehicle 5000V and the end 5021*a* of the forward bezel portion 5021 are arranged substantially in a vertical direction with a space therebetween, and both ends opposite to each other in the right and left direction are in contact with the inner surface of the bezel member 5020. With this, the placing portion 5041 forms a storage space 5000K for storing the light guide member 5030 with the forward bezel portion 5021. The storage space 5000K is open at the gap 5000S. The light guide member 5030 is stored in the storage space 5000K in such a manner that the light incidence surface 5030*a* faces the gap 5000S through the opening of the storage space 5000K.

A pair of legs 5042 connects the placing portion 5041 and the housing 5013 of the image projector 5010, and extends forward and upward from both ends of the front surface of the peripheral wall 5013*c* of the housing 5013 in the right and left direction (FIG. 40). The base end of each of the legs 5042 is integrally fixed to the housing 5013, and a fixing portion 5041*b* formed on the lower surface of the placing portion 5041 is fixed on the tip.

The lighting window member 5050 is formed from a material having high transparency, such as a glass or a synthetic resin including acryl and polycarbonate. The lighting window member 5050 is provided to close (seal) the opening of the storage space 5000K and to introduce light from the gap 5000S into the storage space 5000K.

The lighting window member 5050 is formed into a substantially trapezoidal plate-like shape identical to the opening of the storage space 5000K in a plan view (FIGS. 38 and 40). The lighting window member 5050 is disposed between the end 5021*a* of the forward bezel portion 5021 at the front side and the end 5041*a* of the placing portion 5041 of the support member 5040 at the front side so as to close the opening of the storage space 5000K into which the light guide member 5030 is stored, and the end face of the lighting window member 5050 is in close contact with the inner surface of the bezel member 5020 and the top surface of the placing portion 5041 throughout the entire circumference. The lighting window member 5050 is formed such that the outer surface 5050*a* at the front side is concave at any position in the right and left direction and the inner surface 5050*b* at the rear side is flat in the sectional view (FIG. 39) in the front and rear direction. With this, the lighting window member 5050 refracts light incident on the outer surface 5050*a* and diverges the light in the thickness direction of the light guide member 5030, thereby allowing the light to be incident on the entire light incidence surface 5030*a* of the light guide member 5030.

The cover 5060 is formed on a thin plate using a material having high transparency, such as a glass or a synthetic resin including acryl and polycarbonate, and mounted to be fixed to the perimeter of the opening 5020*a* of the bezel member 5020 to close the opening 5020*a*. The cover 5060 is disposed to extend upward from the front side toward the rear side of the vehicle 5000V (FIG. 39). This prevents light impinged on the cover 5060 from directly advancing to the eyepoint of the passenger.

Next, one example of an operation of the vehicular display device 5001 described above will be described with reference to FIG. 41.

As illustrated in FIG. 41, when external light (parallel light) is incident on the outer surface 5050*a* of the lighting window member 5050 of the vehicular display device 5001 from a light source such as the sun, the external light is refracted on the outer surface 5050*a* as indicated by an arrow in the figure, and further diverged in the thickness direction of the light guide member 5030, thereby being incident on the entire light incidence surface 5030*a* of the light guide member 5030. Since the light incidence surface 5030*a* of the light guide member 5030 is formed to be convex at any position in the right and left direction, light incident on the light incidence surface 5030*a* passes through the light incidence surface 5030*a* and advances in the light guide member 5030 in parallel to the light guiding direction to reach the end of the light guide member 5030 at the rear side. Accordingly, the amount of light emitted from the end of the light guide member 5030 at the rear side can be ensured.

In the present embodiment, the lighting window member 5050 is formed such that the outer surface 5050*a* at the front side is concave at any position in the right and left direction in the sectional view (FIG. 39) in the front and rear direction. However, it is not limited thereto. The outer surface 5050*a* of the lighting window member 5050 may be formed to be convex at any position in the right and left direction.

Figure 42:
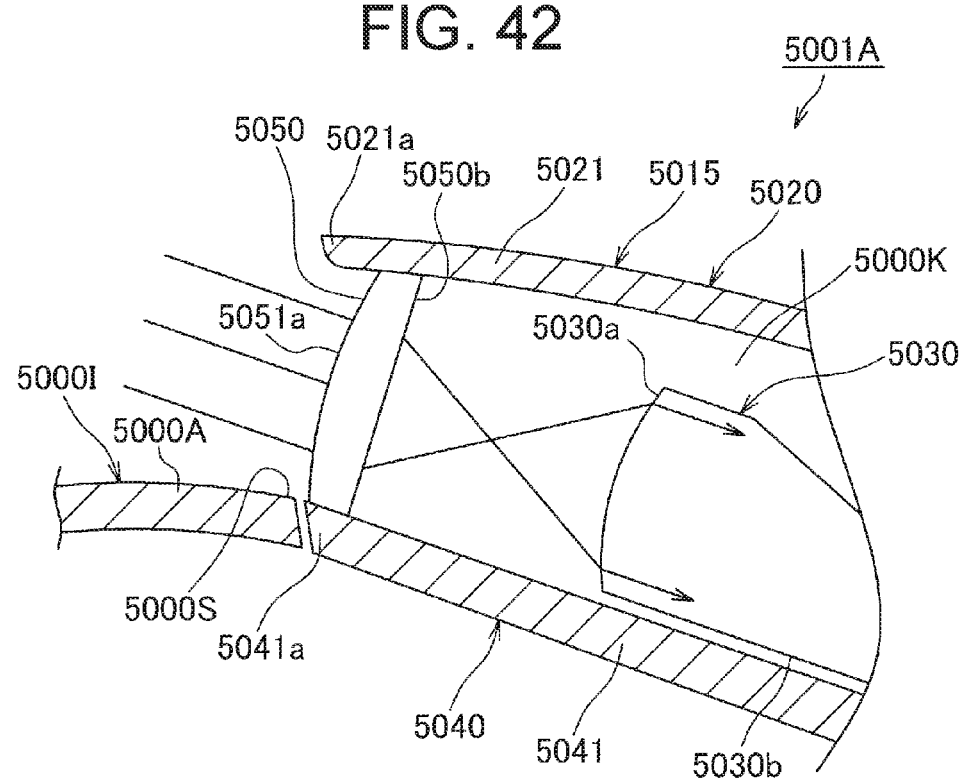
FIG. 42 is an enlarged sectional view for describing the progress of light in a modification of the vehicular display device illustrated in FIG. 37.

It is considered the case in which the outer surface 5050*a* of the lighting window member 5050 is formed to be convex at any position in the right and left direction in the sectional view (FIG. 39) in the front and rear direction. As illustrated in FIG. 42, when external light (parallel light) is incident on the outer surface 5050*a* of the lighting window member 5050 in a vehicular display device 5001A from a light source such as the sun, the light is refracted on the outer surface 5050*a* as indicated by an arrow in the figure to be converged in the thickness direction of the light guide member 5030, and concentrated on a focal point. Thereafter, the light is diverged in the thickness direction and incident on the light incidence surface 5030*a* of the light guide member 5030. Since the light incidence surface 5030*a* of the light guide member 5030 is formed to be convex at any position in the right and left direction in the sectional view (FIG. 39) in the front and rear direction, light incident on the light incidence surface 5030a passes through the light incidence surface 5030a and advances in the light guide member 5030 in parallel to the light guiding direction to reach the end of the light guide member 5030 at the rear side. Accordingly, the amount of light emitted from the end of the light guide member 5030 at the rear side can be ensured.

As described above, according to the present embodiment, the storage space 5000K that is open at the gap 5000S between the opposed wall 5000A of the instrument panel 5000I and the forward bezel portion 5021 of the bezel member 5020 for storing the light guide member 5030 is formed between the forward bezel portion 5021 and the placing portion 5041 of the support member 5040. The lighting window member 5050 is provided between the forward bezel portion 5021 and the placing portion 5041 to close the opening of the storage space 5000K and to introduce light from the gap 5000S into the storage space 5000K. The light guide member 5030 is stored in the storage space 5000K with the light incidence surface 5030a facing the lighting window member 5050, and the lighting window member 5050 has a lens shape for changing the optical path of light introduced from the gap 5000S toward the light incidence surface 5030a of the light guide member 5030. With this configuration, since the opening of the storage space 5000K for storing the light guide member 5030 is closed by the lighting window member 5050, intrusion of dust into the storage space 5000K can be prevented. Further, since the optical path of light introduced from the gap 5000S is refracted toward the light incidence surface 5030a of the light guide member 5030 by the lighting window member 5050, the light introduced from the gap 5000S is surely incident on the light incidence surface 5030a. Therefore, an amount of light reaching the end of the light guide member 5030 at the rear side of the vehicle 5000V can be ensured. Accordingly, the reduction in the amount of light guided to the descending wall 5022 is suppressed, whereby the descending wall 5022 can be made bright to reduce the contrast, and thus, the reflection on the windshield 5000F can be effectively made less visible.

In addition, the lighting window member 5050 diverges light, which is introduced from the gap 5000S between the opposed wall 5000A of the instrument panel 5000I and the forward bezel portion 5021 of the bezel member 5020, in the thickness direction of the light guide member 5030, whereby the light introduced from the gap 5000S can be incident on the entire light incidence surface 5030a of the light guide member 5030.

In addition, the light incidence surface 5030a of the light guide member 5030 is formed to be convex at any position in the right and left direction in order that light passing through the lighting window member 5050 advances in the light guide member 5030 in the direction parallel to the direction from the light incidence surface 5030a of the light guide member 5030 at the front side of the vehicle toward the end thereof at the rear side. Therefore, light passing through the lighting window member 5050 advances in the light guide member 5030 from the light incidence surface 5030a toward the end at the rear side without being attenuated, whereby the amount of light reaching the end of the light guide member 5030 at the rear side of the vehicle can be ensured.

In the present embodiment, the lighting window member 5050 is formed into a lens shape for diverging the external light (parallel light) incident on the outer surface 5050a in the thickness direction of the light guide member 5030, that is, for changing the optical path of the light. However, it is not limited thereto. The outer surface 5050a of the lighting window member 5050 may be formed to be convex at any position in the right and left direction so as to converge external light incident on the outer surface 5050a in the thickness direction of the light guide member 5030.

Figure 43:
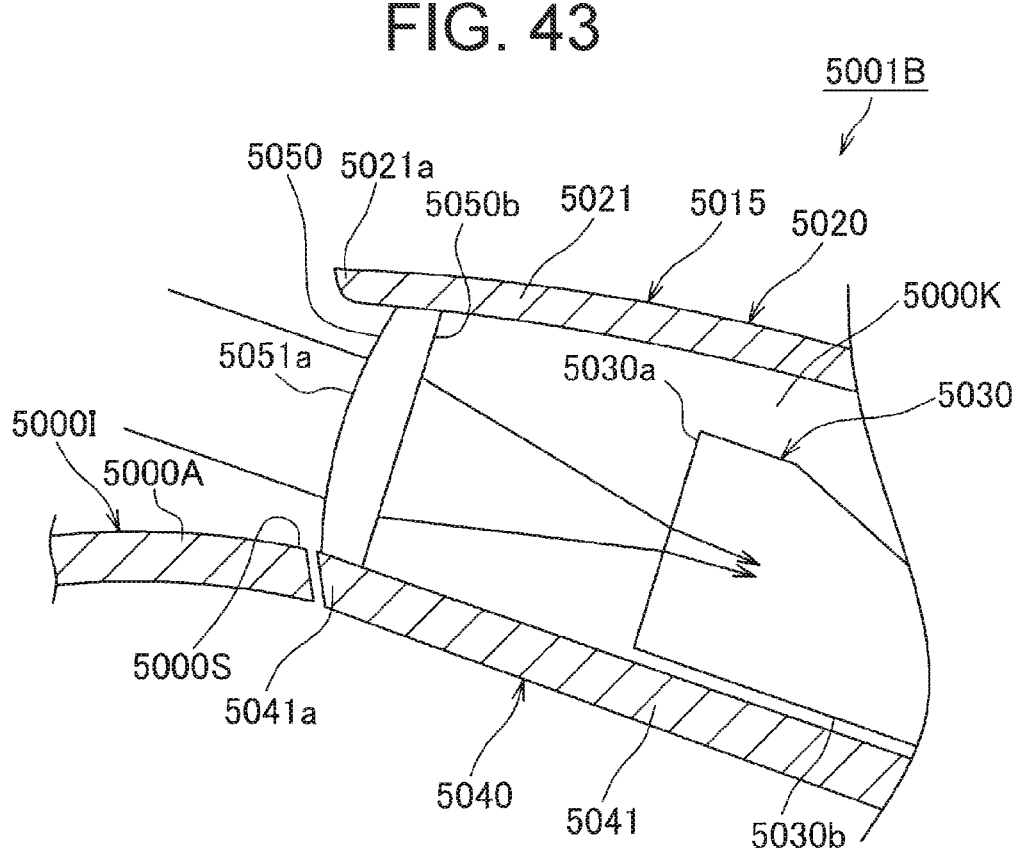
FIG. 43 is an enlarged sectional view for describing the progress of light in another modification of the vehicular display device illustrated in FIG. 37.

It is considered the case in which the outer surface 5050a of the lighting window member 5050 is formed to be convex at any position in the right and left direction in the sectional view (FIG. 39) in the front and rear direction. As illustrated in FIG. 43, when external light (parallel light) is incident on the outer surface 5050a of the lighting window member 5050 in a vehicular display device 5001B from a light source such as the sun, the light is refracted on the outer surface 5050a as indicated by an arrow in the figure to be converged in the thickness direction of the light guide member 5030, and incident on the light incidence surface 5030a of the light guide member 5030 near a focal point. However, when external light incident on the outer surface 5050a of the lighting window member 5050 is converged in the thickness direction of the light guide member 5030 and is incident on the light guide member 5030, only the portion of the light incidence surface 5030a of the light guide member 5030 where the converged light is incident may be deteriorated. In view of this, the lighting window member 5050 is preferably formed into a lens shape by which external light incident on the outer surface 5050a is diverged in the thickness direction of the light guide member 5030 and incident on the light guide member 5030.

In addition, as illustrated in FIG. 43, the light incidence surface 5030a of the light guide member 5030 may be formed into a flat shape. In this case, light passing through the lighting window member 5050 advances in the light guide member 5030 in the direction not parallel to the direction from the light incidence surface 5030a that is the end face at the front side of the vehicle toward the end at the rear side. However, so long as the amount of light emitted at the end of the light guide member 5030 at the rear side can be ensured, light passing through the lighting window member 5050 may not necessarily advance in the light guide member 5030 in the direction parallel to the direction from the end face at the front side of the vehicle toward the end at the rear side.

While the present invention has been described above with respect to the preferred embodiment thereof, the bezel body and the vehicular display device according to the present invention are not limited to the configuration of the above embodiment.

In the above embodiment, the bezel member 5020 has an annular shape in a plan view, and includes the forward bezel portion 5021. However, it is not limited thereto. For example, the bezel member 5020 may be composed of only the forward bezel portion 5021 to constitute only the perimeter of the opening 5020a at the front side of the vehicle 5000V, and the remaining perimeter of the opening 5020a may be constituted by the opposed wall of the instrument panel 5000I.

In addition, in the above embodiment, the bezel member 5020 is entirely formed from a translucent synthetic resin. However, it is not limited thereto. It is only necessary that at least the descending wall 5022 is translucent.

The above embodiment illustrates only the representative form of the present invention, and the present invention is not limited to the embodiment. Specifically, the present invention can be embodied by being modified in various ways without departing from the spirit of the present invention according to conventional known knowledge. Such modifications are naturally included in the scope of the present invention, so long as they provide the configurations of a bezel body and a vehicular display device according to the present invention.

Sixth Invention

Figure 52:
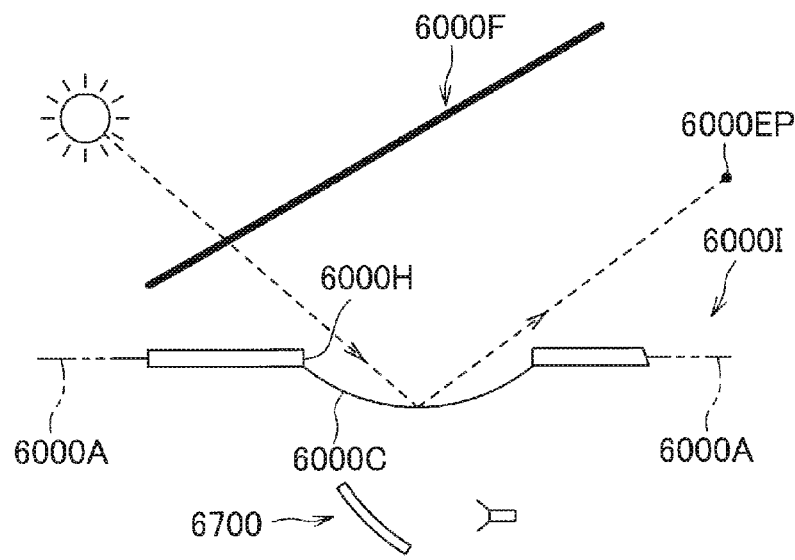
FIG. 52 is a sectional view illustrating a vehicular display device according to a conventional art concerning the sixth invention.

The sixth invention will be described below. Conventionally, a vehicular display device serving as ahead-up display device for projecting an image onto a windshield of a vehicle has been mounted in an instrument panel (see JP 2007-148092 A, for example). As illustrated in FIG. 52, a vehicular display device 6700 described in this patent literature is mounted in an instrument panel 6000I which has an opening 6000H formed on an opposed wall 6000A facing a windshield 6000F so as to project an image onto the windshield 6000F through the opening 6000H. The vehicular display device 6700 described above may have a transparent cover 6000C that closes the opening 6000H in order to prevent intrusion of dust or water into the opening 6000H. However, external light such as the sunlight is reflected on the cover 6000C to be directed to an eyepoint 6000EP of a passenger, which may provide a sense of discomfort.

Figure 53:
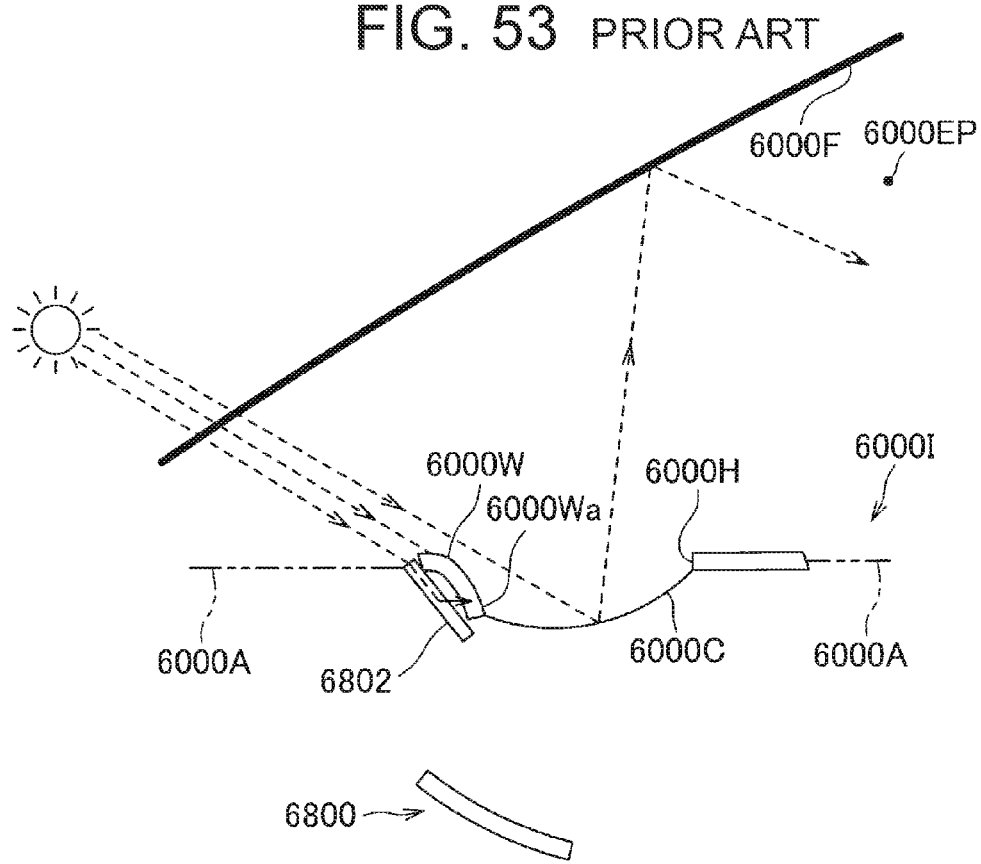
FIG. 53 is a sectional view illustrating a vehicular display device according to another conventional art concerning the sixth invention.

In view of this, a vehicular display device 6800 illustrated in FIG. 53 is considered as the configuration for preventing external light from being directed to the eyepoint 6000EP. The vehicular display device 6800 is mounted in an instrument panel 6000I. The instrument panel 6000I has an opening 6000H formed on an opposed wall 6000A facing a windshield 6000F, and a forward bezel portion 6000W formed at the front of the opening 6000H is provided with a translucent descending wall 6000Wa that gradually descends from the front side to the rear side of the vehicle (from left to right in FIG. 53). A cover 6000C that gradually ascends from the front side to the rear side of the vehicle is provided on the opening 6000H, and the vehicular display device 6800 projects an image on the windshield 6000F through the opening 6000H. The configuration in which the descending wall 6000W is provided and the portion of the cover 6000C at the front side of the vehicle is lower than the portion thereof at the rear side makes it difficult to allow external light to reach the cover 6000C, and prevents external light reflected on the cover 6000C from being directed to the eyepoint 6000EP of the passenger.

In the above configuration, external light is not impinged on the vicinity of the descending wall 6000Wa of the forward bezel portion 6000W, so that the contrast is increased between the descending wall 6000Wa and its peripheral portion. Thus, the problem in which reflection on the windshield 6000F becomes visible may arise. In view of this, it is considered that the descending wall 6000Wa is formed from a translucent material, and a light guide member 6802 is disposed below the descending wall 6000Wa to illuminate the descending wall 6000Wa from the inner surface. This configuration makes the reflection less visible because light passing through the descending wall 6000Wa is directed to the windshield, thereby being capable of reducing a sense of discomfort provided to the passenger.

However, in the vehicular display device 6800, the descending wall 6000Wa may be reflected more darkly than the peripheral portion due to insufficient intensity of light illuminating the descending wall 6000Wa. Further, since a black ceramic portion extending in the right and left direction is provided on the lower end of the windshield 6000F, external light may be shielded, resulting in that a sufficient amount of light may not be obtained. In view of this, the thickness of the plate-like light guide member 6802 is increased and the end of the forward bezel portion 6000W at the front side is located higher than the opposed wall 6000A in order to increase the amount of introduced light. However, with this configuration, the bezel body becomes large-sized, so that the bezel body becomes noticeable on the opposed wall 6000A. This deteriorates design performance. In addition, when an external light introducing member for introducing external light toward the light guide member 6802 is provided to the vehicle, the external light introducing member is easy to visually recognize by the passenger, since external light has to be introduced from the front side. Thus, the design performance is deteriorated.

An object of the present invention is to provide an external light introducing member and a vehicular display device that can increase an amount of introduced light while preventing deterioration in design performance.

In order to solve the above problem and achieve the object, the invention {17} of the present invention is an external light introducing member that introduces external light toward a bezel body which includes a bezel member that is fitted to an opposed wall, which faces a windshield, of an instrument panel of a vehicle to constitute a part of or all of the perimeter of an opening through which an image is projected onto the windshield by an image projector provided in the instrument panel, wherein a translucent forward bezel portion of the bezel member disposed at the front side of the vehicle with respect to the opening is lifted up from the opposed wall to form a lighting portion between the forward bezel portion and the opposed wall, the lighting portion introducing light for illuminating the forward bezel portion from an inner surface side, the external light introducing member comprising an introducing portion that is provided on a black ceramic portion formed on the lower end of the windshield for introducing external light into a compartment of the vehicle, the introducing portion being capable of guiding the external light toward the lighting portion.

The invention {18} is characterized in that, in the invention {17}, the introducing portion is configured such that a translucent layer that can transmit light and a non-translucent layer that cannot transmit light are alternately laminated in the front and rear direction of the vehicle, and the translucent layer and the non-translucent layer tilt downward toward the rear side of the vehicle.

The invention {19} is a vehicular display device comprising: an image projector that is disposed in an instrument panel of a vehicle; a bezel body including a bezel member that is fitted to an opposed wall, which faces a windshield, of the instrument panel to constitute a part of or all of the perimeter of an opening through which an image is projected onto the windshield by the image projector; and an external light introducing member that introduces external light toward the bezel body, wherein the external light introducing member is composed of the external light introducing member described in the invention {17} or {18}.

According to the invention {17}, the introducing portion is provided on the black ceramic portion to introduce external light into the compartment of the vehicle and guide the external light toward the lighting portion, whereby external light can be introduced even at the lower end of the windshield. Therefore, the amount of introduced light can be increased while the increase in size of the bezel body in the vertical direction is suppressed. In addition, since the introducing portion is provided on the black ceramic portion, the external light introducing member is unnoticeable by a passenger, whereby the deterioration in design performance can be suppressed.

According to the invention {18}, the introducing portion is configured such that the translucent layer and the non-translucent layer are alternately laminated and they tilt downward toward the rear side. With this, light passing through the translucent layer is less visible when the passenger sees the black ceramic portion. This can prevent the passenger from having a sense of discomfort, and make the external light introducing member hardly visually recognized to further suppress the deterioration in design performance.

Further, the sunlight or light on the street emitted from above can be transmitted by the translucent layer and external light (for example, light from the headlight of an oncoming vehicle, etc.) emitted from the front side can be shielded by the non-translucent layer, whereby the entrance of more than necessary light into the lighting portion can be prevented. Accordingly, the difference between the intensity of light reflected on the top surface of the bezel body to be directed to the windshield and the intensity of light introduced from the lighting portion and passing through the forward bezel portion to be directed to the windshield can be reduced, and this can prevent the reflection of the forward bezel portion from being visible.

According to the invention {19}, the introducing portion is provided on the black ceramic portion on the windshield, whereby the amount of introduced light can be increased while the deterioration in design performance can be suppressed as described above.

Figure 47:
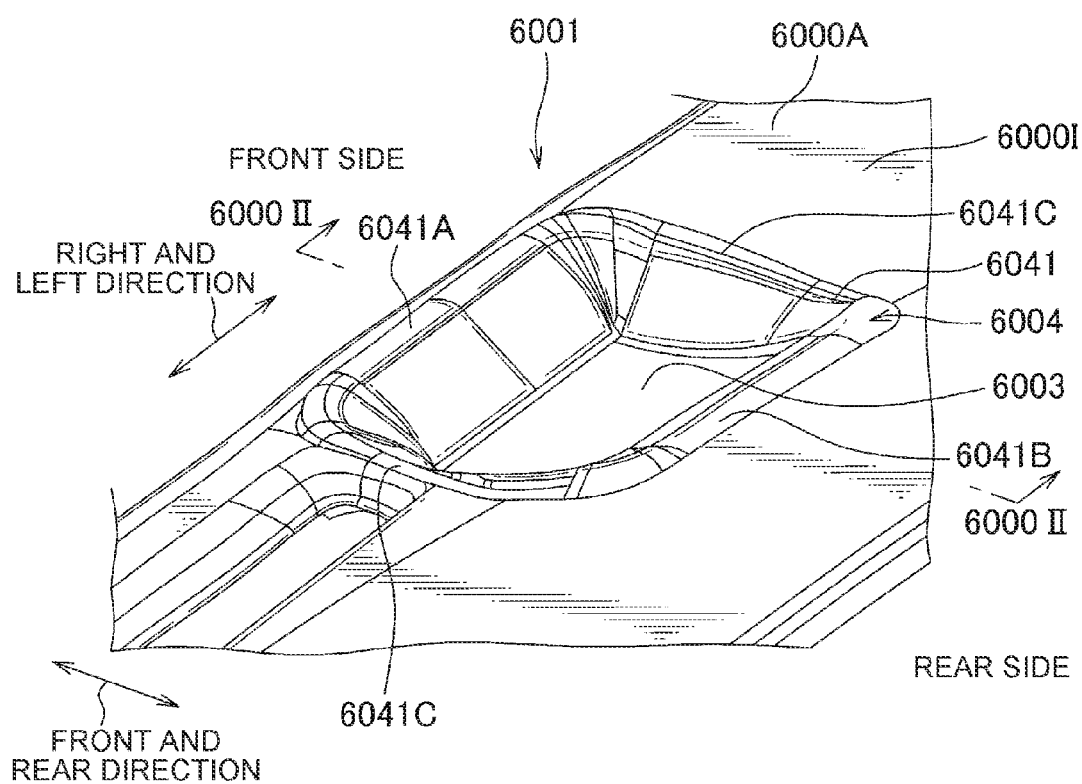
FIG. 47 is a perspective view illustrating a vehicular display device according to an embodiment of the sixth invention.
Figure 48:
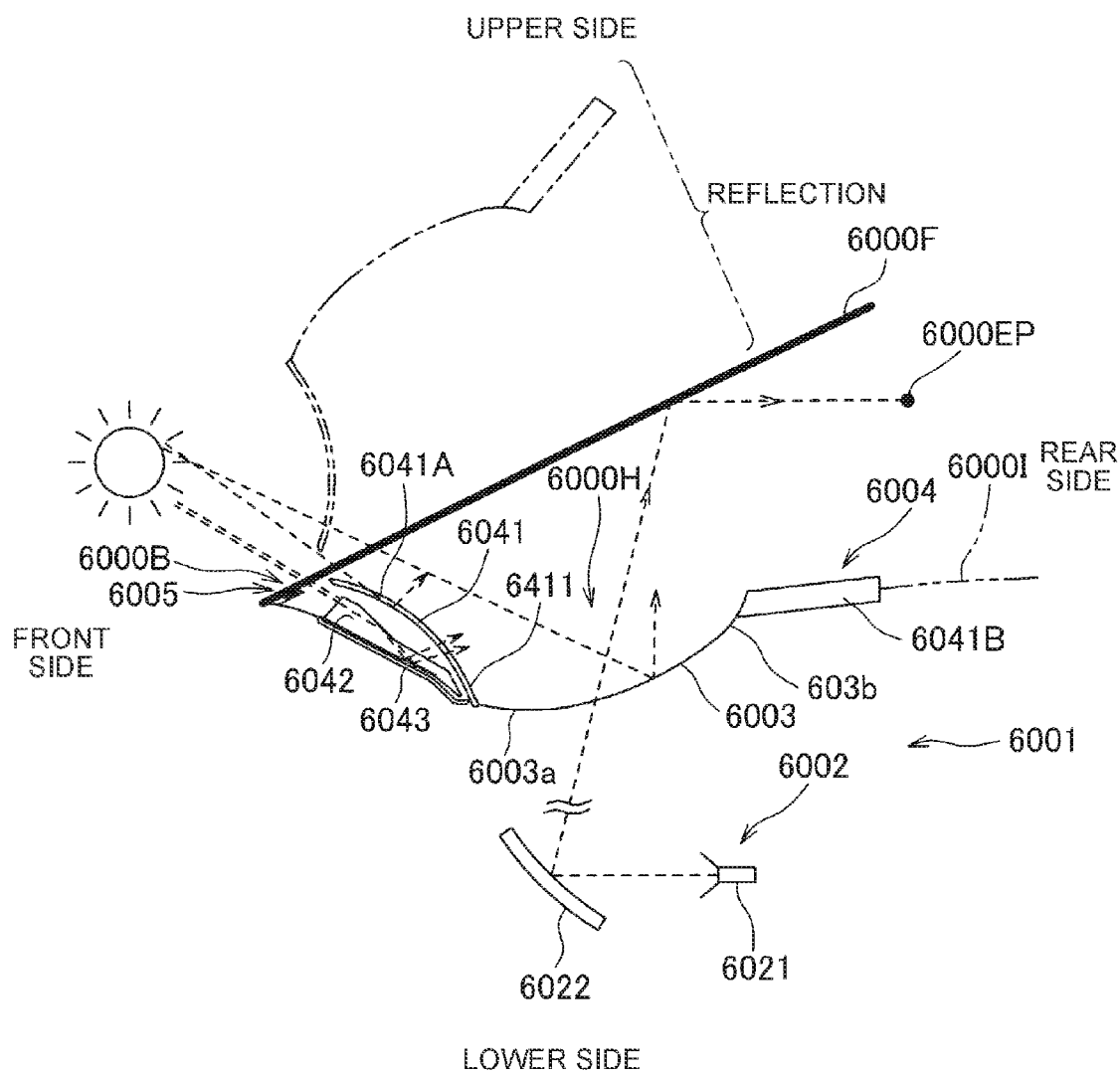
FIG. 48 is a sectional view along a line 6000II-6000II of the vehicular display device.
Figure 49:
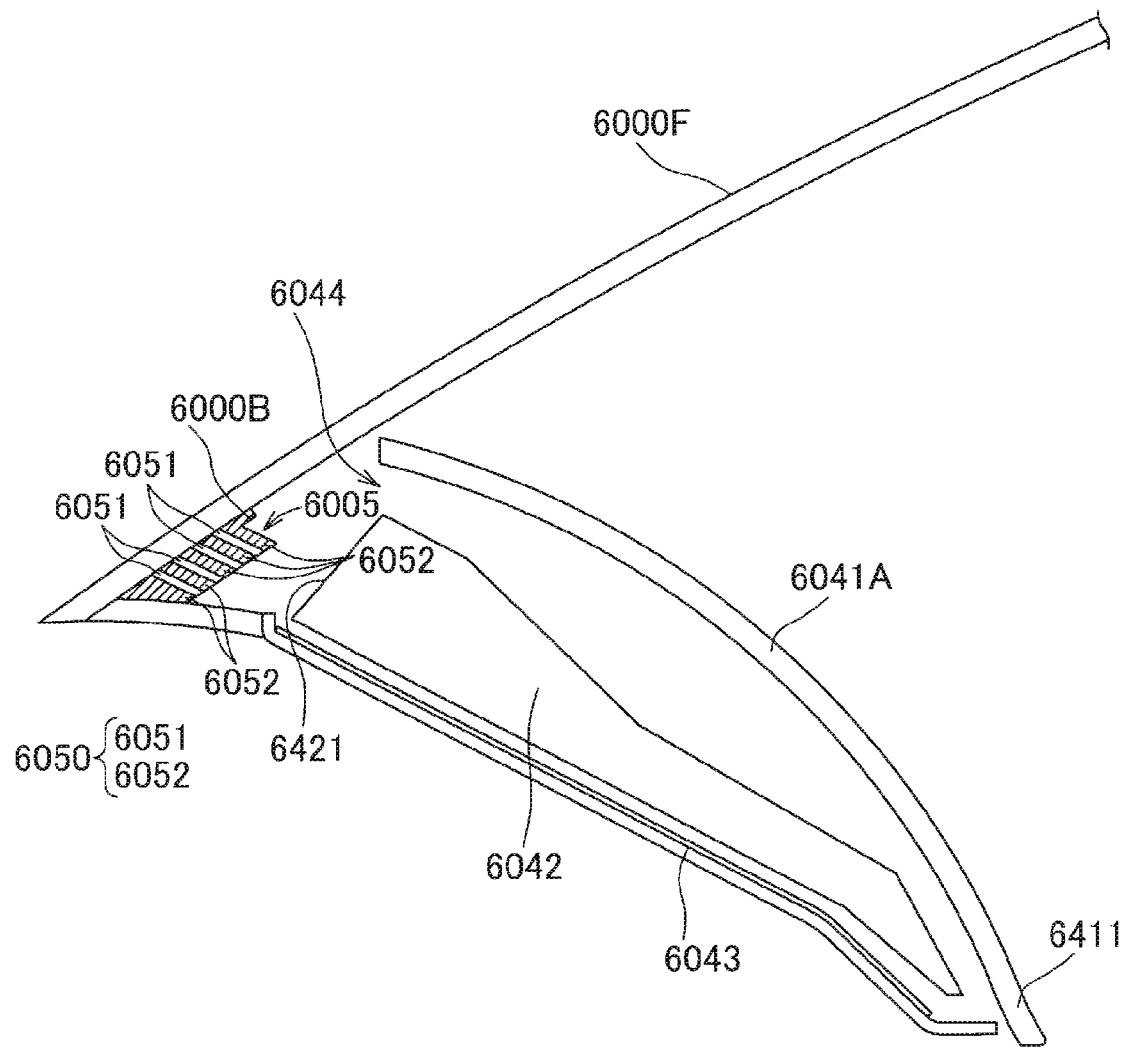
FIG. 49 is a sectional view illustrating a main part of the vehicular display device as enlarged.

An embodiment of the present invention will be described below with reference to the drawings. FIG. 47 is a perspective view illustrating the vehicular display device according to the embodiment of the present invention. FIG. 48 is a sectional view along a line 6000II-6000II of the vehicular display device. FIG. 49 is a sectional view illustrating a main part of the vehicular display device as enlarged. As illustrated in FIGS. 47 and 48, a vehicular display device 6001 according to the present embodiment includes an image projector 6002 disposed in an instrument panel 6000I of a vehicle, a cover 6003 provided on an opening 6000H formed on an opposed wall 6000A, facing a windshield 6000F, of the instrument panel 6000I, a bezel body 6004 provided around the cover 6003, and an external light introducing member 6005 provided on the windshield 6000F. The vehicular display device 6001 is a device for projecting a vehicle running state such as a speed or a road condition on the windshield 6000F as an image. Note that a front and rear direction, a right and left direction, a front side and a rear side in the front and rear direction, an upper side, and a lower side of the vehicle according to the present embodiment are as illustrated in FIGS. 47 and 48.

The image projector 6002 includes a projector body 6021 and a mirror 6022, and projects an image toward the windshield 6000F through the opening 6000H. In this case, the image projector 6002 forms an image at a distant location from a passenger in order that the passenger can naturally recognize the image even if he/she focuses on a distant location.

The cover 6003 is formed from a transparent resin or glass, for example. It transmits light radiated from the image projector 6002, and protects the image projector 6002 against dust or water. In addition, a forward end 6003a of the cover 6003 is located lower than a rearward end 6003b (that is, the cover 6003 is provided with its front part declining) to prevent external light from being reflected and reaching an eyepoint 6000EP of the passenger.

The bezel body 6004 includes a bezel member 6041 constituting the perimeter of the opening 6000H, a light guide member 6042 provided below a forward bezel portion 6041A described later, and a support member 6043 that supports the light guide member 6042 from below.

The bezel member 6041 is formed from a resin with a color substantially the same as the color of the opposed wall 6000A, includes the forward bezel portion 6041A at the front side, a rearward bezel portion 6041B at the rear side, and left and right bezel portions 6041C provided between the forward bezel portion 6041A and the rearward bezel portion 6041B at both ends in the right and left direction, is fitted to the opposed wall 6000A, and supports the cover 6003. Each of the bezel portions 6041A, 6041B, and 6041C may be separately formed, or may be integrally formed.

The forward bezel portion 6041A is disposed such that the end thereof at the front side is lifted from the opposed wall 6000A to form a gap with the opposed wall 6000A, and has a descending wall 6411 that gradually descends from the front side toward the rear side to reach the opening 6000H. That is, the forward bezel portion 6041A is configured to support a forward end 6003a of the cover 6003 at the lower end (rear end) of the descending wall 6411. The forward bezel portion 6041A has translucency, and its top surface has substantially the same color as the opposed wall 6000A. The forward bezel portion 6041A is configured to transmit light from below upward and configured such that the transmitted light has substantially the same color as the reflection light on the top surfaces of the opposed wall 6000A, the rearward bezel portion 6041B, and the left and right bezel portions 6041C.

The light guide member 6042 is formed from a material that is transparent and has high refractive index, such as a glass or quartz. As illustrated in FIG. 49 as enlarged, the light guide member 6042 is formed into a plate-like shape extending in the front and rear direction between the forward bezel portion 6041A and the support member 6043, and is configured such that light entering from the end face 6421 at the front side toward the rear is totally reflected on the inner side and is directed toward the rear side. In addition, the light guide member 6042 is formed such that the thickness thereof is decreased toward the rear side from the front side.

The support member 6043 is supported by the bezel member 6041 while supporting the light guide member 6042, and is configured to reflect light from above on the top surface. In addition, the end of the support member 6043 at the front side is on substantially the same level as the top surface of the opposed wall 6000A, and constitutes a lighting portion 6044 with the forward bezel portion 6041A at the front side. With this configuration, external light emitted from the front side through the windshield 6000F can be introduced into the end face 6421 of the light guide member 6042 at the front side through the lighting portion 6044. Note that the lighting portion 6044 may be provided with a window or the like that transmits light.

As illustrated in FIG. 49, the external light introducing member 6005 is provided on a black ceramic portion 6000B extending in the right and left direction at the lower end at the inner side of the windshield 6000F, and includes an introducing portion 6050 formed such that translucent layers 6051 that can transmit light and non-translucent layers 6052 that cannot transmit light are alternately laminated in the front and rear direction. External light, such as the sunlight or light on the street, emitted to the black ceramic portion 6000B passes through the translucent layers 6051 of the introducing portion 6050 and is introduced into the compartment of the vehicle.

The introducing portion 6050 is formed by laminating transparent resins and non-transparent resins, has substantially the same size as the forward bezel portion 6041A in the right and left direction, and is provided anterior to the forward bezel portion 6041A. The translucent layer 6051 and the non-translucent layers 6052 tilt downward toward the rear side. In addition, the black ceramic portion 6000B is configured such that the black ceramic member is removed at the portion adjacent to the translucent layer 6051 to allow light to pass therethrough. Further, the black ceramic portion 6000B and the non-translucent layer 6052 have substantially the same color.

Next, the process of introducing external light by the external light introducing member 6005 and allowing this external light to be guided to the light guide member 6042 and emitted from the forward bezel portion 6041A will be described. Firstly, external light emitted to the black ceramic portion 6000B passes through the translucent layers 6051 and is introduced into the compartment of the vehicle as described above. In this case, external light along the tilt angles of the translucent layer 6051 and the non-translucent layer 6052 passes, and external light along an angle other than the above angle, particularly external light emitted from the front side, is shielded by the non-translucent layers 6052.

External light introduced into the compartment of the vehicle passes through the lighting portion 6044, and enters the light guide member 6042 from the end face 6421 at the front side. This light is totally reflected on the top surface and the lower surface of the light guide member 6042, and advances to the rear side or is emitted from the top surface or the lower surface. When emitted from the lower surface, the light is reflected on the support member 6043 and is again incident on the light guide member 6042. When emitted from the top surface, the light is directed toward the upper forward bezel portion 6041A. Light reaching the forward bezel portion 6041A passes through the forward bezel portion 6041A to be directed to the windshield 6000F, and causes reflection thereon.

The present embodiment described above provides the following effects. Specifically, since the introducing portion 6050 is provided on the black ceramic portion 6000B to guide external light toward the lighting portion 6044 and the end face 6421 of the light guide member 6042, external light can be introduced even at the lower end of the windshield 6000F, whereby the amount of introduced light can be increased while the increase in size of the bezel body 6004 in the vertical direction is suppressed. In addition, since the introducing portion 6050 is provided on the black ceramic portion 6000B, the external light introducing member 6005 is unnoticeable by a passenger even if it is provided, whereby the deterioration in design performance can be suppressed.

Further, since the translucent layer 6051 and the non-translucent layer 6052 tilt downward toward the rear side, light passing through the translucent layer 6051 is less visible when the passenger sees the black ceramic portion 6000B, and this can prevent the passenger from having a sense of discomfort. In addition, since the non-translucent layer 6052 has substantially the same color as the color of the black ceramic portion 6000B, the introducing portion 6050 becomes more unnoticeable on the black ceramic portion 6000B. Therefore, the external light introducing member 6005 is less visible, whereby the deterioration in design performance can further be suppressed.

In addition, since external light emitted from the front side (for example, a headlight of an oncoming vehicle, etc.) is shielded by the non-translucent layer 6052, and external light along the tilt angles of the translucent layer 6051 and the non-translucent layer 6052 passes, the difference between the intensity of light reflected on the top surface of the bezel body 6004 to be directed to the windshield 6000F and the intensity of light introduced from the lighting portion 6044 and passing through the forward bezel portion 6041A to be directed to the windshield 6000F can be reduced. This configuration can prevent the reflection of the forward bezel portion 6041A from being visible.

Figure 50:
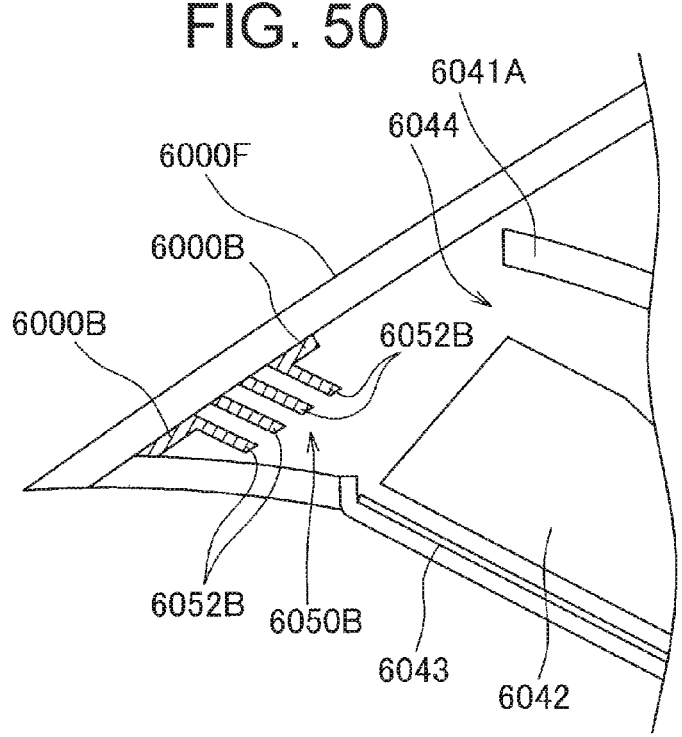
FIG. 50 is a sectional view illustrating a main part of the vehicular display device according to a modification of the sixth invention.

It is to be noted that the present invention is not limited to the above embodiment, and includes other configurations by which the object of the present invention is achieved, and the modifications described below are included in the present invention. For example, in the above embodiment, the introducing portion 6050 includes the translucent layers 6051 and the non-translucent layers 6052 which are alternately laminated. However, as illustrated in FIG. 50, an introducing portion 6050B may include a louver 6052B composed of a plurality of louver boards, wherein the louver 6052B may function as a non-translucent layer and the space between the louver boards may function as a translucent layer. With this configuration, the longitudinal size or an angle of each louver board may easily be set according to the angle of the windshield 6000F and the size and shape of the bezel body 6004, whereby external light can more efficiently be introduced.

Figure 51:
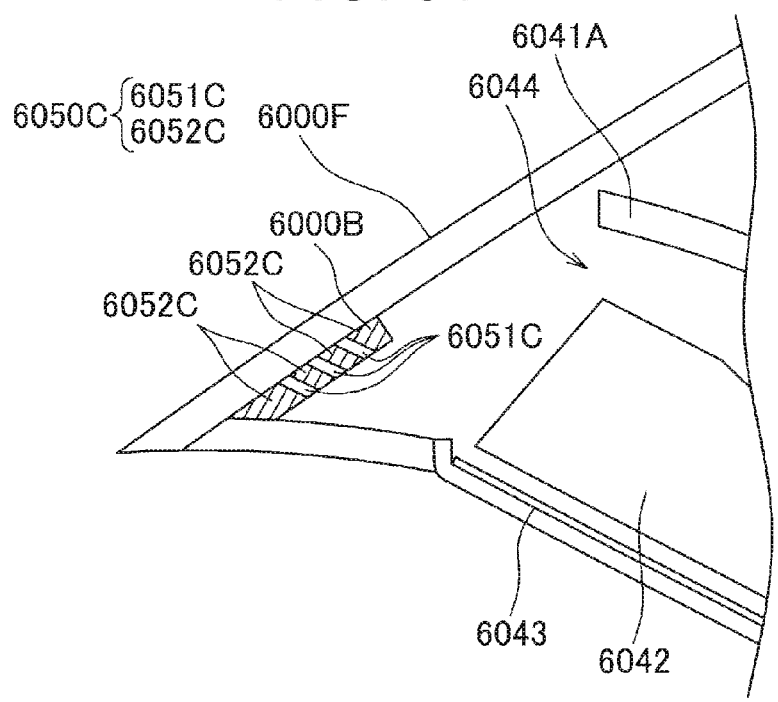
FIG. 51 is a sectional view illustrating a main part of the vehicular display device according to another modification of the sixth invention.

Further, as illustrated in FIG. 51, an introducing portion 5050C may be formed integral with the black ceramic portion 6000B having a predetermined thickness, wherein the black ceramic member constituting the black ceramic portion 6000B may be a non-translucent layer 6052C, and a translucent layer 6051C may be formed by removing the ceramic member. In this case, the translucent layer 6051C may be a space or a transparent resin may be formed as the translucent layer 6051C. According to this configuration, the increase in the number of components caused by the formation of the introducing portion 6050C can be prevented. In addition, the introducing portion may not be a laminated structure in which the translucent layer and the non-translucent layer are laminated. For example, the introducing portion may be configured such that a black ceramic member composing the black ceramic portion may be removed from an appropriate area to introduce external light into the compartment of a vehicle.

Further, in the above embodiment, the bezel body 6004 includes the light guide member 6042 and the support member 6043 that reflects light from above. However, so long as external light passing through the lighting portion 6044 is sufficiently guided to the descending wall 6411, the light guide member may be eliminated, and the support member may be configured to be unable to reflect light from above.

While the best configuration and method to carry out the present invention have been described above, the present invention is not limited thereto. Specifically, while the present invention has mainly been illustrated and described particularly with respect to the specific embodiment, various modifications in shapes, materials, quantities, and any other detailed configurations may be made to the above-described embodiment by those of ordinary skill in the art without departing from the technical scope and spirit of the present invention. Therefore, the description that limits the shapes, materials, and the like is only an example to facilitate the understanding of the present invention, and is not intended to limit the present invention, so that the present invention includes the description using a name without a part of or all of the limitation on the shapes, materials, etc.

REFERENCE SIGNS LIST

1 vehicular display device
2 image projector 4 bezel body
41A forward bezel portion
411 descending wall
42 light guide member
422 reflection portion
423 diffusion portion
43 support member
I instrument panel
A opposed wall
H opening
1001 vehicular display device
1010 image projector
1015 bezel body
1020 bezel member
1020a opening
1021 forward bezel portion
1022 descending wall
1030 light guide member
1030a light incidence surface
1040 support member (one example of cover member)
1050 lighting window member
1051 window body
1052 optical refraction portion (one example of optical deflection portion)
1053 projection
1060 cover
1000A opposed wall
1000F windshield
1000I instrument panel
1000K storage space
1000S gap
1000V vehicle

The invention claimed is:

1. A bezel body comprising:
a bezel member fitted to an opposed wall to a windshield in an instrument panel of a vehicle, to constitute a part of or all of the perimeter of an opening through which an image projector provided in the instrument panel projects an image onto the windshield; and
a plate-like light guide member, wherein
the bezel member including a forward bezel portion disposed in front of the vehicle with respect to the opening, the forward bezel portion disposed such that an end in front of the vehicle is lifted from the opposed wall to form a gap with the opposed wall, and including a translucent descending wall that gradually descends from front to rear of the vehicle to reach the opening, and
the light guide member is disposed below the forward bezel portion, guides light entering an end face in front of the vehicle toward the descending wall, and is provided with a reflection portion on a predetermined area on a lower surface at the rear side of the vehicle, the reflection portion changing and reflecting an advancing direction of light to a thickness direction.

2. The bezel body according to claim 1, wherein a diffusion portion that diffuses light emitted upward is provided on a top surface of the light guide member.

3. The bezel body according to claim 2, further comprising a support member that supports the light guide member from below and reflects light from above.

4. A vehicular display device comprising: an image projector that is disposed in an instrument panel of a vehicle; and a bezel body including a bezel member that is fitted to an opposed wall to a windshield in the instrument panel to constitute a part of or all of the perimeter of an opening through which the image projector projects an image onto the windshield,
wherein the bezel body includes the bezel body according to claim 3.

5. A vehicular display device comprising: an image projector that is disposed in an instrument panel of a vehicle; and a bezel body including a bezel member that is fitted to an opposed wall to a windshield in the instrument panel to constitute a part of or all of the perimeter of an opening through which the image projector projects an image onto the windshield,
wherein the bezel body includes the bezel body according to claim 2.

6. The bezel body according to claim 1, further comprising a support member that supports the light guide member from below and reflects light from above.

7. A vehicular display device comprising: an image projector that is disposed in an instrument panel of a vehicle; and a bezel body including a bezel member that is fitted to an opposed wall to a windshield in the instrument panel to constitute a part of or all of the perimeter of an opening through which the image projector projects an image onto the windshield,
wherein the bezel body includes the bezel body according to claim 6.

8. A vehicular display device comprising: an image projector that is disposed in an instrument panel of a vehicle; and a bezel body including a bezel member that is fitted to an opposed wall to a windshield in the instrument panel to constitute a part of or all of the perimeter of an opening through which the image projector projects an image onto the windshield,
wherein the bezel body includes the bezel body according to claim 1.

9. The bezel body according to claim 1, wherein the reflection portion has a wedge-shaped cross-section.

10. The bezel body according to claim 1, wherein the reflection portion includes a plurality of projections formed on a lower surface of the light guide member, the projections extend inwardly of the light guide member and from the lower surface of the light guide member.

11. The bezel body according to claim 1, wherein the end face of the light guide member is positioned within the gap between the opposed wall and the end of the forward bezel portion.

12. The bezel body according to claim 1, wherein the light guide member includes a top surface and a lower surface spaced away from the top surface in a thickness direction of the light guide member, and the end face extends from the top surface to the bottom surface in the thickness direction.

13. The bezel body according to claim 12, wherein the reflection portion changing and reflecting an advancing direction of light within the light guide member to the thickness direction such that light that entered the light guide member through the end face exits the top surface of the light guide member and passes through the descending wall.

14. The bezel body according to claim 1, wherein the light guide member is configured such that light entering from the gap between the forward bezel portion and the opposed wall into the end in the front side of the vehicle is totally reflected on an inner side of the light guide member and is directed toward the rear side of the vehicle, and wherein
a reflection portion changing and reflecting an advancing direction of light to a thickness direction of the light guide member is formed on a predetermined area on a lower surface of the light guide member at a read side of the vehicle.

15. A bezel body, comprising:
a bezel member that is fitted to an opposed wall to a windshield in an instrument panel of a vehicle to constitute a part of or all of the perimeter of an opening through which an image projector provided in the instrument panel projects an image onto the windshield, wherein the bezel member has a forward bezel portion disposed in front of the vehicle with respect to the opening, and the forward bezel portion is disposed such that an end in front of the vehicle is lifted from the opposed wall to form a gap with the opposed wall, and includes a translucent descending wall that gradually descends from front to rear of the vehicle to reach the opening, wherein the bezel body includes:
- a light guide member that is formed into a plate-like shape, disposed to be overlapped with an inner surface of the forward bezel portion, and guides light entering an end face in front of the vehicle toward the descending wall;
- a case member that is disposed with a space from the inner surface of the forward bezel portion so as to form with the forward bezel portion a storage space open toward the gap for the light guide member; and
- a lighting window member that is provided between the forward bezel portion and the case member so as to close the opening of the storage space and to introduce light from the gap into the storage space, wherein the light guide member is stored in the storage space with the end face in front of the vehicle facing the lighting window member, and wherein the lighting window member has an optical deflection portion that deflects light introduced from the gap to be directed to the end face of the light guide member in front of the vehicle.

16. The bezel body according to claim 15, wherein the lighting window member has a plate-like window body, and the optical deflection portion has multiple projections or recesses which are formed on either one of an inner surface and an outer surface of the window body to extend in the widthwise direction of the vehicle and have a wedge-shaped cross-section.

17. A vehicular display device comprising: an image projector that is disposed in an instrument panel of a vehicle; and a bezel body including a bezel member fitted to an opposed wall to a windshield in the instrument panel to constitute a part of or all of the perimeter of an opening through which the image projector projects an image onto the windshield,
wherein the bezel body is the bezel body according to claim 16.

18. A vehicular display device comprising: an image projector that is disposed in an instrument panel of a vehicle; and a bezel body including a bezel member fitted to an opposed wall to a windshield in the instrument panel to constitute a part of or all of the perimeter of an opening through which the image projector projects an image onto the windshield,
wherein the bezel body is the bezel body according to claim 15.

* * * * *